(12) United States Patent
Bankhead et al.

(10) Patent No.: US 7,385,707 B2
(45) Date of Patent: Jun. 10, 2008

(54) SURFACE PROFILING APPARATUS

(75) Inventors: Andrew Douglas Bankhead, Leicester (GB); Ivor McDonnell, Leicester (GB)

(73) Assignee: Taylor Hobson Limited, Leicester (GB)

( * ) Notice: Subject to any disclaimer, the term of this patent is extended or adjusted under 35 U.S.C. 154(b) by 267 days.

(21) Appl. No.: 10/507,837

(22) PCT Filed: Mar. 13, 2003

(86) PCT No.: PCT/GB03/01067

§ 371 (c)(1),
(2), (4) Date: May 23, 2005

(87) PCT Pub. No.: WO03/078925

PCT Pub. Date: Sep. 25, 2003

(65) Prior Publication Data

US 2005/0225769 A1    Oct. 13, 2005

(30) Foreign Application Priority Data

Mar. 14, 2002  (GB)  ................................. 0206023.4
Nov. 27, 2002  (GB)  ................................. 0227665.7

(51) Int. Cl.
*G01B 9/02*    (2006.01)
*G01B 11/02*   (2006.01)

(52) U.S. Cl. ........................ 356/497; 356/479; 356/511

(58) Field of Classification Search ................ 356/497, 356/499, 511, 512, 513, 516, 496, 479, 484, 356/485, 489, 495, 498
See application file for complete search history.

(56) References Cited

U.S. PATENT DOCUMENTS 4,387,994 A   6/1983   Balasubramanian (Continued)

FOREIGN PATENT DOCUMENTS

| EP | 0 244 781 A2 | 11/1987 |
| WO | WO-94/18523 | 8/1994 |
| WO | WO-95/33970 | 12/1995 |

OTHER PUBLICATIONS

Patrick Sandoz et al., "Processing of white light correlograms: simultaneous phase and envelope measurement by wavelet transformation," *SPIE*, vol. 3098, pp. 73-82.

(Continued)

*Primary Examiner*—Patrick Connolly
*Assistant Examiner*—Scott M Richey
(74) *Attorney, Agent, or Firm*—RatnerPrestia

(57) ABSTRACT

A surface profiling apparatus and method. Broadband light is directed along sample and reference paths such that light reflected by a region of a sample surface and light reflected by a reference surface interfere. A mover effects relative movement between the sample and reference surfaces along a scan path. A detector senses a series of light intensity values representing interference fringes produced by the region of the sample surface during the movement. A data processor processes the intensity values as they are received during a measurement operation to produce data indicating the position of a coherence peak, and, after completion of a measurement operation, uses this coherence peak position data to obtain data indicative of the height of the surface region. The data processor includes a correlator for correlating intensity values with a correlation function to provide correlation data to enable the position of a coherence peak to be identified.

36 Claims, 34 Drawing Sheets

U.S. PATENT DOCUMENTS

| | | | |
|---|---|---|---|
| 4,818,110 A | | 4/1989 | Davidson |
| 5,112,129 A | * | 5/1992 | Davidson et al. ............ 356/497 |
| 5,194,918 A | * | 3/1993 | Kino et al. ................. 356/497 |
| 5,355,221 A | * | 10/1994 | Cohen et al. ............... 356/497 |
| 5,390,023 A | * | 2/1995 | Biegen ....................... 356/497 |
| 5,398,113 A | | 3/1995 | de Groot |
| 5,402,234 A | | 3/1995 | Deck |
| 5,459,570 A | | 10/1995 | Swanson et al. |
| 5,469,261 A | | 11/1995 | Hellmuth et al. |
| 5,471,303 A | | 11/1995 | Ai et al. |
| 5,615,011 A | | 3/1997 | Boisrobert et al. |
| 5,633,715 A | | 5/1997 | Ai et al. |
| 5,706,085 A | | 1/1998 | Blossey et al. |
| 5,717,782 A | | 2/1998 | Denneau, Jr. |
| 5,953,124 A | * | 9/1999 | Deck .......................... 356/497 |
| 6,028,670 A | * | 2/2000 | Deck .......................... 356/497 |
| 6,084,671 A | | 7/2000 | Holcomb |
| 6,195,168 B1 | * | 2/2001 | De Lega et al. ............ 356/497 |
| 6,449,049 B1 | | 9/2002 | Lam et al. |
| 6,493,093 B2 | | 12/2002 | Harasaki et al. |
| 6,545,763 B1 | * | 4/2003 | Kim et al. .................. 356/503 |
| 6,552,806 B1 | * | 4/2003 | Swinford et al. ........... 356/512 |
| 6,734,978 B2 | * | 5/2004 | Adachi ....................... 356/512 |

OTHER PUBLICATIONS

Patrick Sandoz, "Wavelet transform as a processing tool in white-light interferometry," *Optics Letters*, vol. 22, No. 14, Jul. 15, 1997, pp. 1065-1067.

Timothy C. Strand et al., "Extended unambiguous range interferometry," *Applied Optics*, vol. 26, No. 19, Oct. 1, 1987, pp. 4274-4281.

J. William Dockrey et al., "The Application of Coherence Probe Microscopy for Submicron Critical Dimension Linewidth Measurement," *SPIE*, vol. 1087, Integrated Circuit Metrology, Inspection and Process Control III (1989), pp. 120-137.

G. T. Reid, "Automatic Fringe Pattern Analysis: A Review," *Optics and Lasers in Engineering*, vol. 7 (1986/7), pp. 37-68.

Kieran G. Larkin, "Efficient nonlinear algorithm for envelope detection in white light interferometry," *J. Opt. Soc. Am. A*, vol. 13, No. 4, Apr. 1996, pp. 832-843.

Bharat Bhushan et al., "Measurement of surface topography of magnetic tapes by Mirau interferometry," *Applied Optics*, vol. 24, No. 10, May 15, 1985, pp. 1489-1497.

Akiko Harasaki et al., "Fringe modulation skewing effect in white-light vertical scanning Interferometry," *Applied Optics*, vol. 39, No. 13, May 1, 2000, pp. 2101-2106.

Akiko Harasaki et al., "Improved vertical-scanning interferometry," *Applied Optics*, vol. 39, No. 13, pp. 2107-2115.

Paul F. Forman et al., "The Zygo interferometer system," *SPIE*, vol. 192, Interferometry (1979), pp. 41-48.

Stanley S. C. Chim, "Correlation microscope," *Optics Letters*, vol. 15, No. 10, May 15, 1990, pp. 579-581.

Paolo Tomassini et al., "Analyzing laser plasma interferograms with a continuous wavelet transform ridge extraction technique: the methhod," *Applied Optics*, vol. 40, No. 35, Dec. 10, 2001, pp. 6561-6568.

Kieran G. Larkin, "Topics in Multi-dimensional Signal Demodulation," A Thesis Submitted to the Faculty of Science in the University of Sydney, Dec. 2000.

Peter de Groot et al., "Three-Dimensional imaging by sub-Nyquist sampling of white-light interferograms," *Optics Letters*, vol. 18, No. 17, Sep. 1, 1993, pp. 1462-1463.

Byron S. Lee et al., "Profilometry with a coherence scanning microscope," *Applied Optics*, vol. 29, No. 26, Sep. 10, 1990, pp. 3784-3788.

* cited by examiner

| $I_1P_1$ | $I_1P_2$ | $I_1P_3$ |
|---|---|---|
| $I_1P_4$ | $I_1P_5$ | $I_1P_6$ |
| $I_1P_7$ | $I_1P_8$ | $I_1P_9$ |

F2

| $I_2P_1$ | $I_2P_2$ | $I_2P_3$ |
|---|---|---|
| $I_2P_4$ | $I_2P_5$ | $I_2P_6$ |
| $I_2P_7$ | $I_2P_8$ | $I_2P_9$ |

⋮

Fn

| $I_nP_1$ | $I_nP_2$ | $I_nP_3$ |
|---|---|---|
| $I_nP_4$ | $I_nP_5$ | $I_nP_6$ |
| $I_nP_7$ | $I_nP_8$ | $I_nP_9$ |

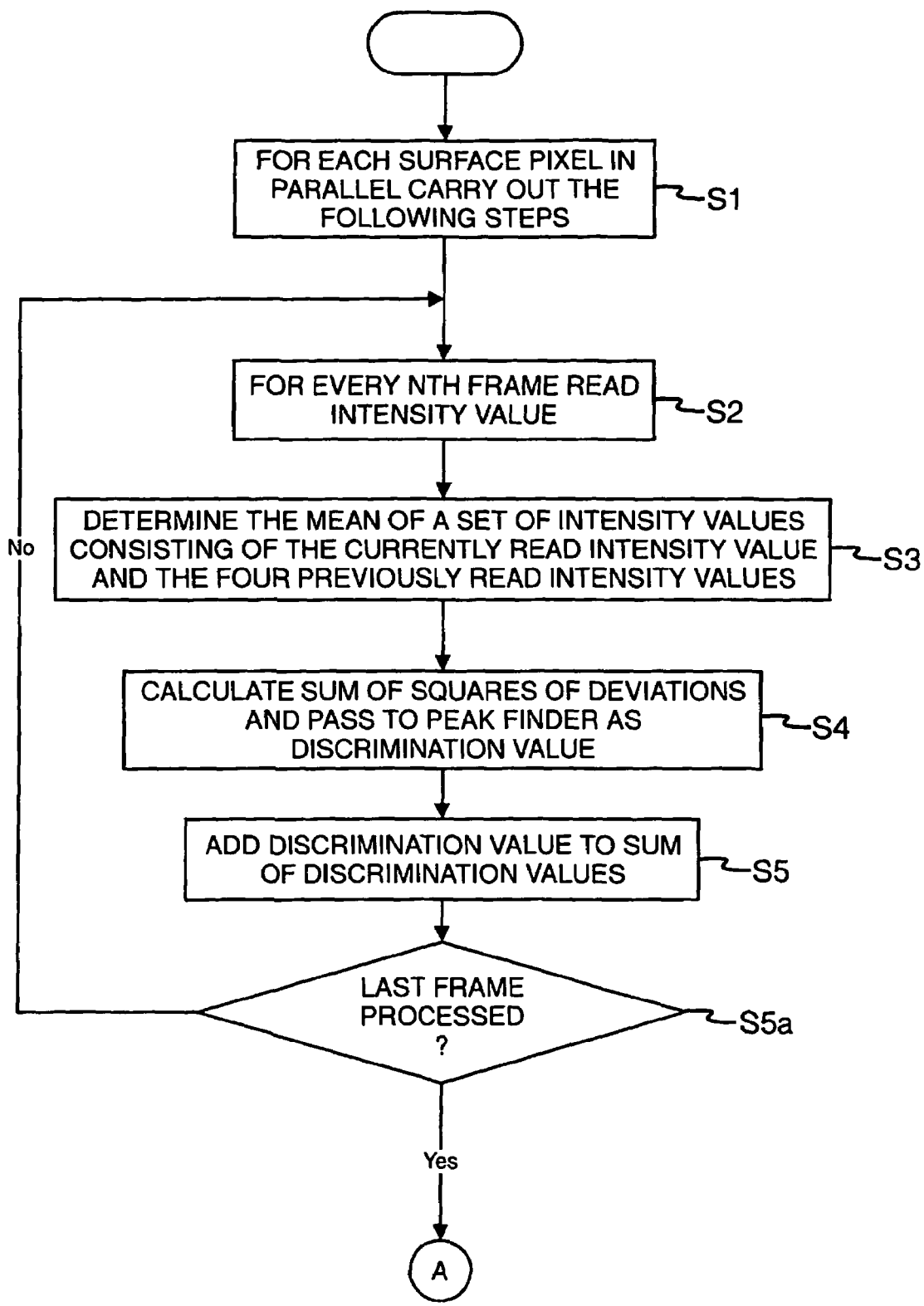

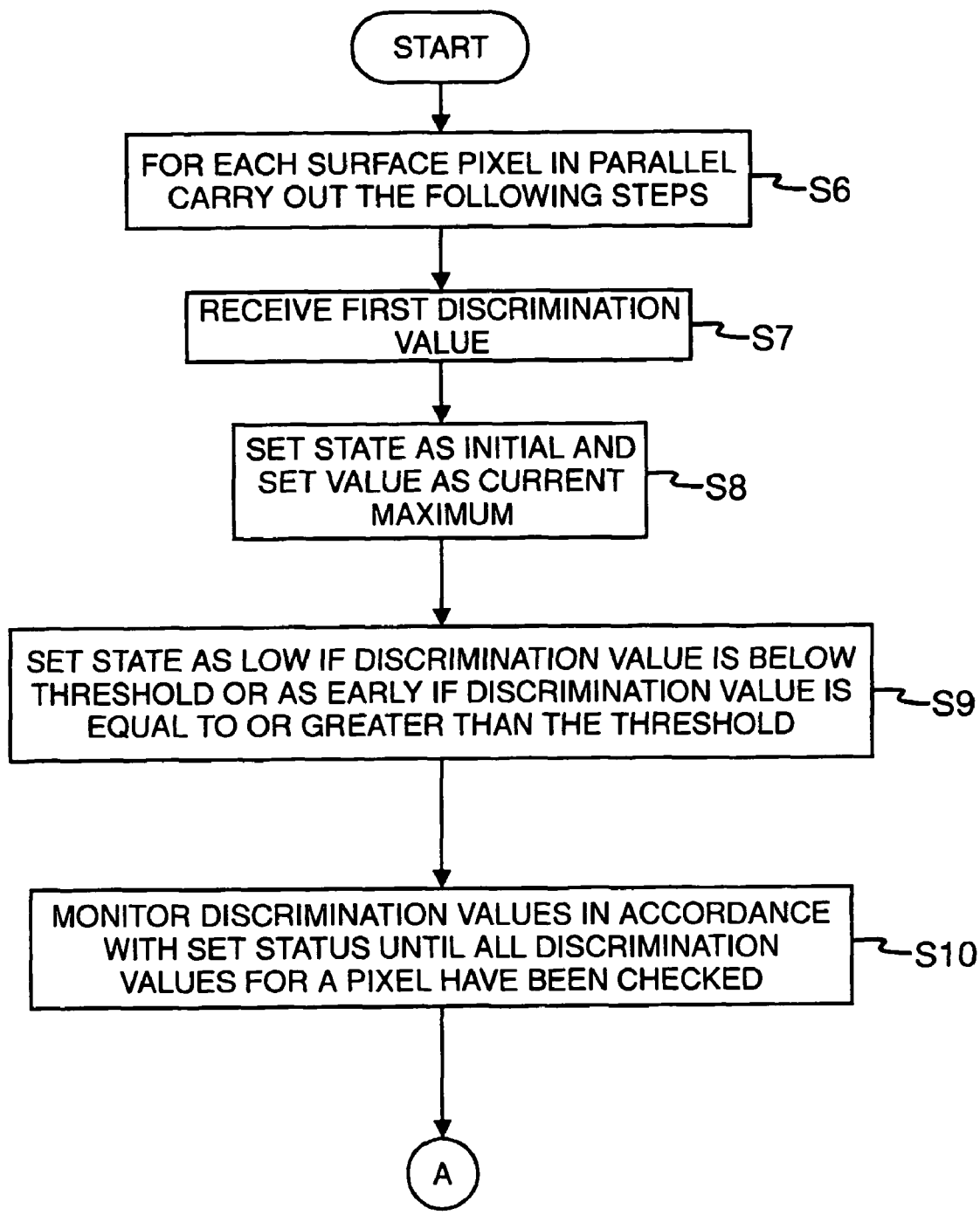

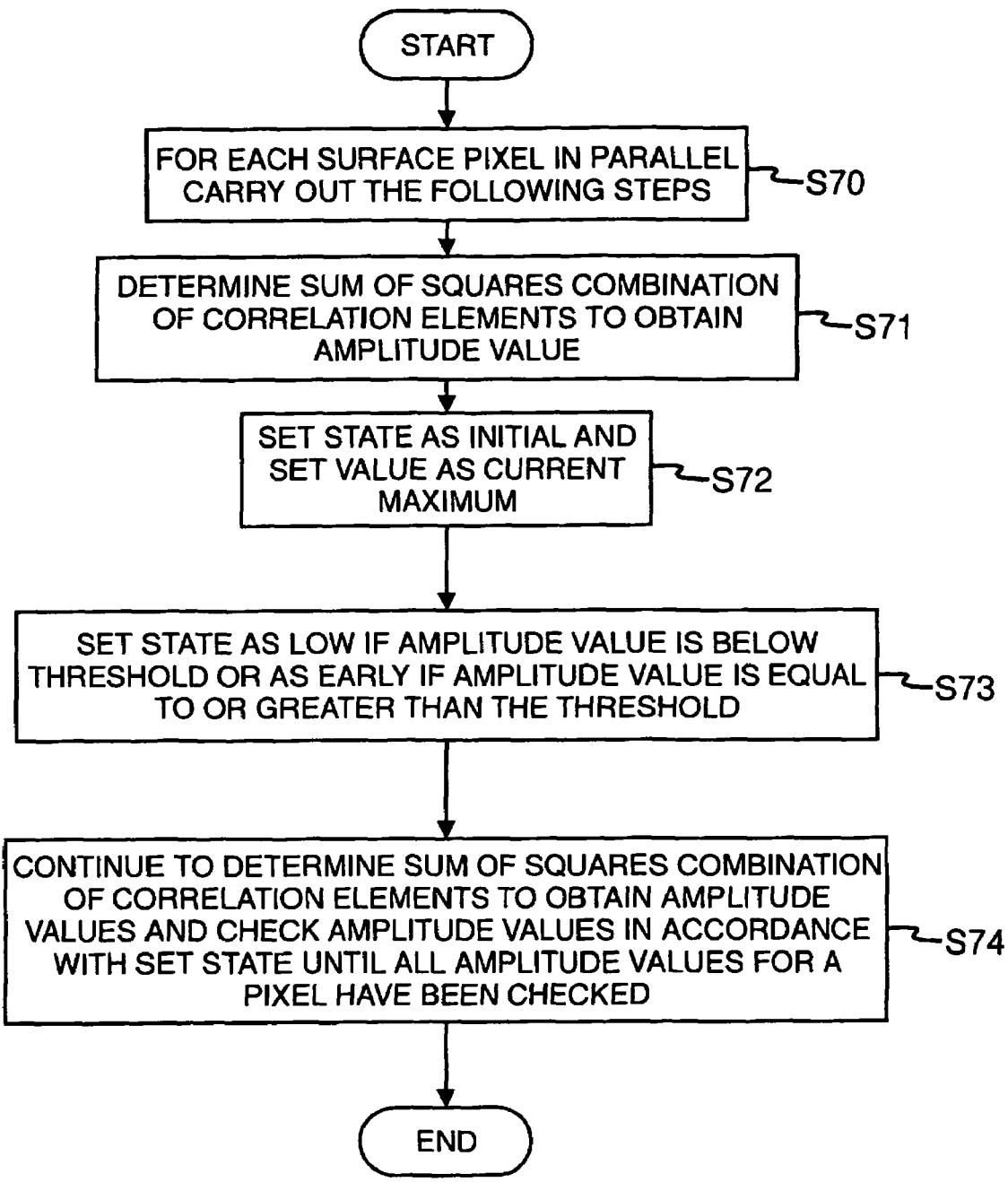

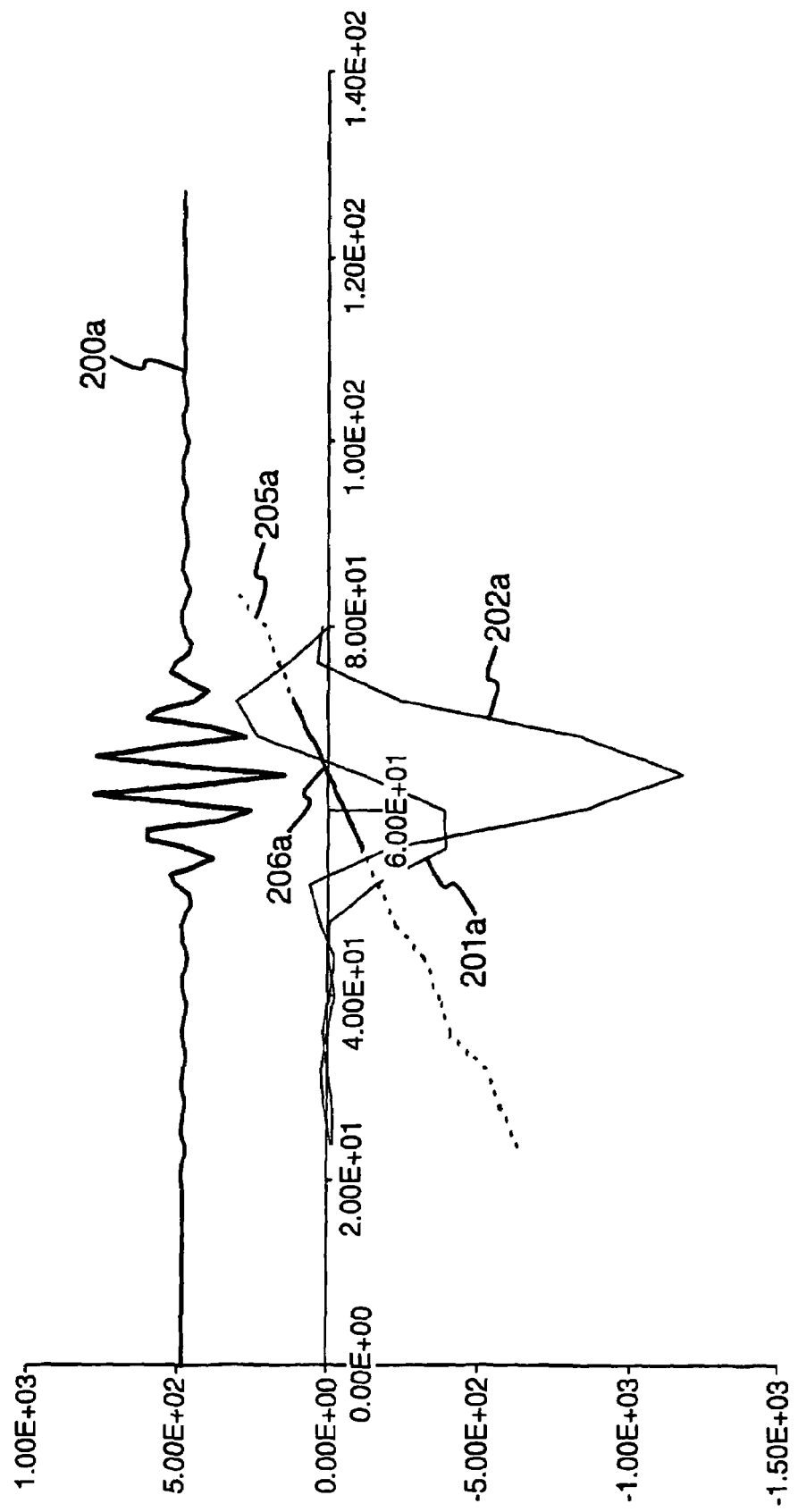

SURFACE PROFILING APPARATUS

This application is the U.S. national phase application of PCT International Application No. PCT/GB03/01067, and claims priority of British Patent Application Nos. 0206023.4 and 0227665.7.

This invention relates to a surface profiling apparatus, in particular surface profiling apparatus for determining surface profile data using interferometric techniques.

As discussed in a paper entitled "Profilometry with a Coherence Scanning Microscope" by Byron S. Lee and Timothy C Strand published in Applied Optics Volume 29, No. 26 10 Sep. 1990 at pages 3784 to 3788, as manufacturing tolerances have reduced, demands have increased on optical metrology techniques for improved lateral and vertical resolution. Conventional monochromatic interferometric surface profiling apparatus offers good vertical resolution in the nanometre to Angstrom range but phase ambiguity limits the measurement range to phase shifts of less than $2\pi$. Various techniques have been proposed to extend this measurement range including, for example, phase unwrapping, heterodyne interferometry and multi-wavelength interferometry. However, phase unwrapping generally requires a smooth continuous measurement surface if phase ambiguity errors are not to arise. Heterodyne interferometry involves mixing beams at two separate frequencies and uses the resultant beat frequency for interferometry measurements. Heterodyne interferometry has an unambiguous range based on the wavelength of the beat frequency and this range is therefore limited by the limit on how close the two frequencies used can be. Multi-wavelength interferometry produces at least two different interferometric profiles using different wavelengths and again the unambiguous range is determined by the wavelength of the difference in frequency between the at least two wavelengths used.

As discussed in the paper by Lee and Strand, these problems can be addressed by the use of coherence scanning or broadband scanning interferometry which can provide practical measurement ranges easily exceeding hundreds of micrometres.

Coherence scanning or broadband scanning interferometry uses a standard interferometer such as a Michelson interferometer with a broadband spatially incoherent light source such as a quartz halogen lamp. Generally, but not necessarily, the broadband source will be a white light source. One of the sample surface whose profile is to be determined and the reference mirror of the interferometer is moved relative to the other along a scan path to change the relative path length and a two dimensional image sensor such as a CCD camera is used to sense the resulting interference pattern which changes as the sample surface and reference mirror are moved relative to one another.

Each sensing element or pixel of the image sensor senses the portion of the interference pattern for a corresponding region or surface pixel of the sample surface and, as the sample surface and the reference mirror are moved relative to one another, the amount or intensity of light received by the sensing element will vary in accordance with the change in the interference fringes. The intensity of light received from a region of the sample surface will increase or decrease in amplitude in dependence upon the path length difference between the light paths from the reference mirror and the sensing surface and will have a coherence peak or extremum (maximum or minimum amplitude) at the position of zero path difference. Where different regions of the surface have different relative heights, then those different regions will have coherence peaks at different positions along the scan path. Accordingly, the relative positions of the coherence peaks can be used to provide surface profile data, that is data representing the relative height of the different regions of the sample surface.

In one aspect, the present invention provides surface profiling apparatus having a broadband scanning interferometer and a data processor for locating the coherence peak in the interference fringes produced for a region of a sample surface on-the-fly by multiplying at least some of the set of signals representing the interference fringes for that region as they are received by a correlation function to produce a set of correlation signals for that region and then identifying the coherence peak in the interference fringes for that region with the highest peak in the set of correlations signals for that region.

In one aspect, the present invention provides surface profiling apparatus having a broadband scanning interferometer and a data processor for locating the coherence peak in the interference fringes produced for a region of a sample surface by determining a sub-set of the signals likely to contain a coherence peak on-the-fly as the signals representing the interference fringes are received, and subsequently applying a correlation function to the signals of the sub-set to produce a set of correlation signals and using the correlation signals to identify the coherence peak.

In an embodiment, the correlation function comprises two reference wave packets that together have an amplitude and phase variation. In an embodiment, the reference wave packets are represented as a Gaussian envelope modulated by cosine and sine waves.

In an embodiment, the two reference wave packets are stored as an array of pairs.

In an embodiment, the position of the peak in the set of correlations signals is set as the height of the surface for that surface region. The peak may be found by fitting a Gaussian to the set of correlation signals.

As described above, the position of the peak in a set of correlation signals is set as the surface height for that region. In another embodiment or additionally, phase data in the correlation signals, that is correlation phase, is used to determine the position of a predetermined correlation phase, for example zero correlation phase, which is then used to determine the height data.

In another aspect, the present invention provides surface profiling apparatus that comprises a broadband scanning interferometer having control means for controlling triggering of sensing means of the interferometer in accordance with position data obtained from moving means for effecting relative movement between the sample surface and the reference of the interferometer so that the interference patterns are sensed at intervals determined in accordance with the position data. In this case, the moving means effects continuous movement. Alternatively, stepped movement may be effected.

In another aspect, the present invention provides a surface profiling apparatus having a broadband scanning interferometer having sensing means comprising a 2D array of sensing pixels arranged to receive light from an area larger than the area of the sample surface that is of interest and control means for processing the signals by doing at least one of combining the signals sensed by two or more adjacent pixels and selecting only a subset of the sensing pixels for use. This enables the range from maximum field of view to maximum lateral resolution to be covered without the need for a zoom lens or the provision of extra lenses to magnify or demagnify the image.

In another embodiment, the present invention provides surface profiling apparatus having a broadband scanning interferometer and a datum providing means for relating height and gradient data obtained for one area of a sample surface to that obtained for another area of a sample surface to enable surface profile data to be obtained over a sample surface area larger than the area that can be imaged by the sensing means of the interferometer by combining surface profile data obtained from surface profile measurements on different areas of the sample surface.

Embodiments of the present invention will now be described, by way of example, with reference to the accompanying drawings, in which:

FIG. 6b shows a diagrammatic perspective view of a broadband source suitable for use in the interferometer system of FIG. 6a;

FIG. 8 shows schematic representations of frames of data provided by an image sensor of the interferometer;

FIG. 9 shows a flow chart for illustrating steps carried out by one example of a discriminator shown in FIG. 7;

FIGS. 10a to 10d show flow charts for illustrating steps carried out by a peak finder shown in FIG. 7;

FIG. 17b shows a diagram for explaining the structure of a correlation buffer shown in FIG. 17a;

FIGS. 18a to 18f show diagrams representing part of the correlation buffer for explaining the operation of a correlator shown in FIG. 17a;

FIG. 18g shows a diagrammatic representation of a part of a correlation buffer status store shown in FIG. 17a;

FIG. 19a to 19f shows flow charts for illustrating steps carried out by a peak finder shown in FIG. 17a;

Figure 17A:
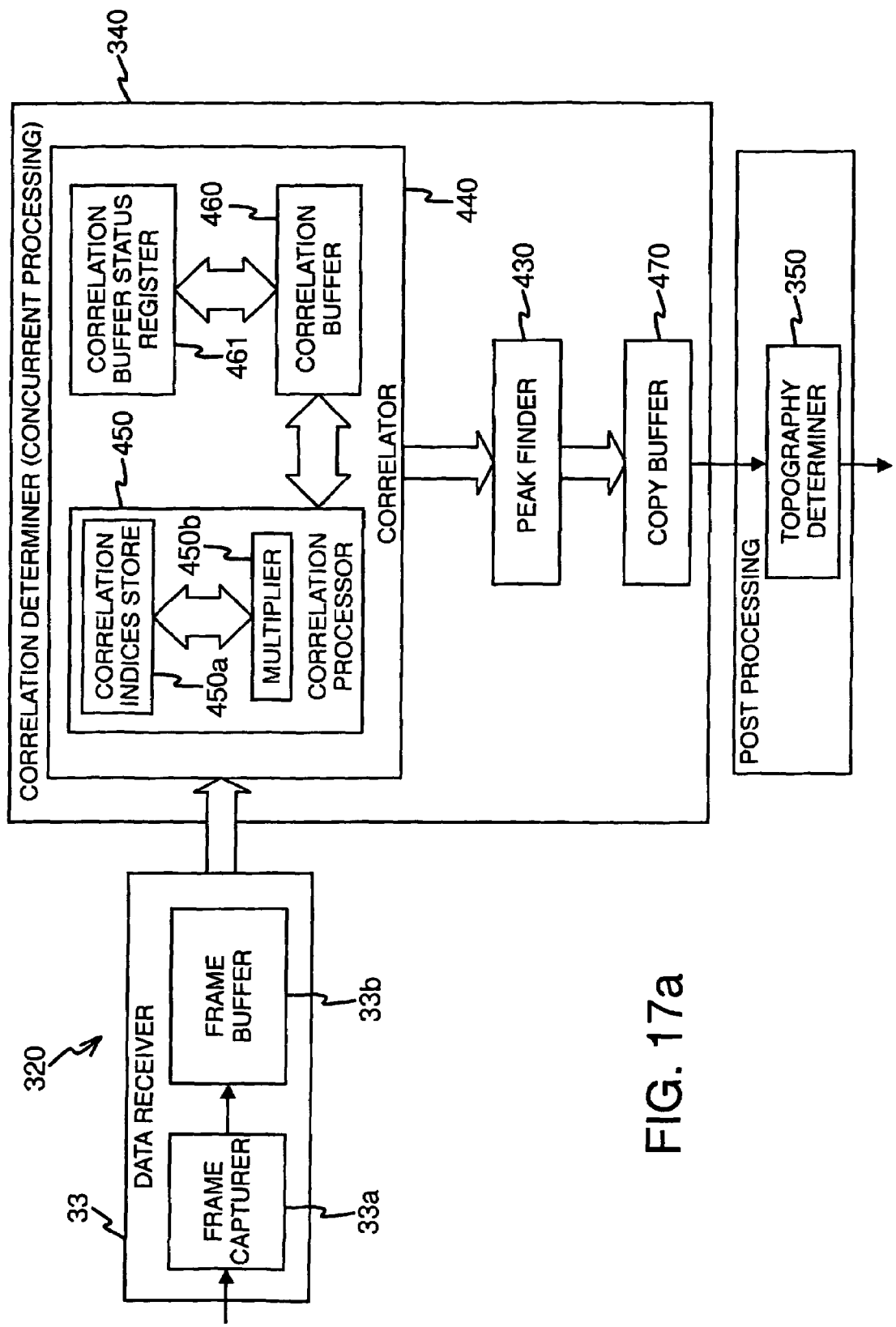
FIG. 17a shows a functional block diagram of another example of the data processor shown in FIG. 3.
Figure 17B:
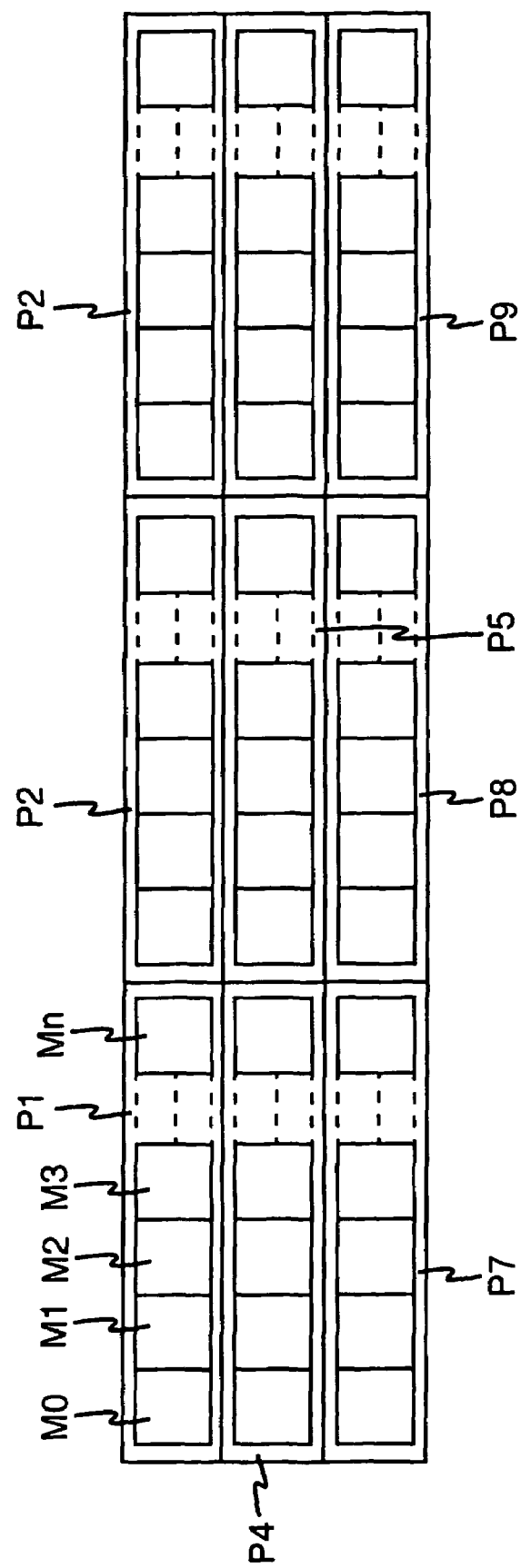
Figure 20A:
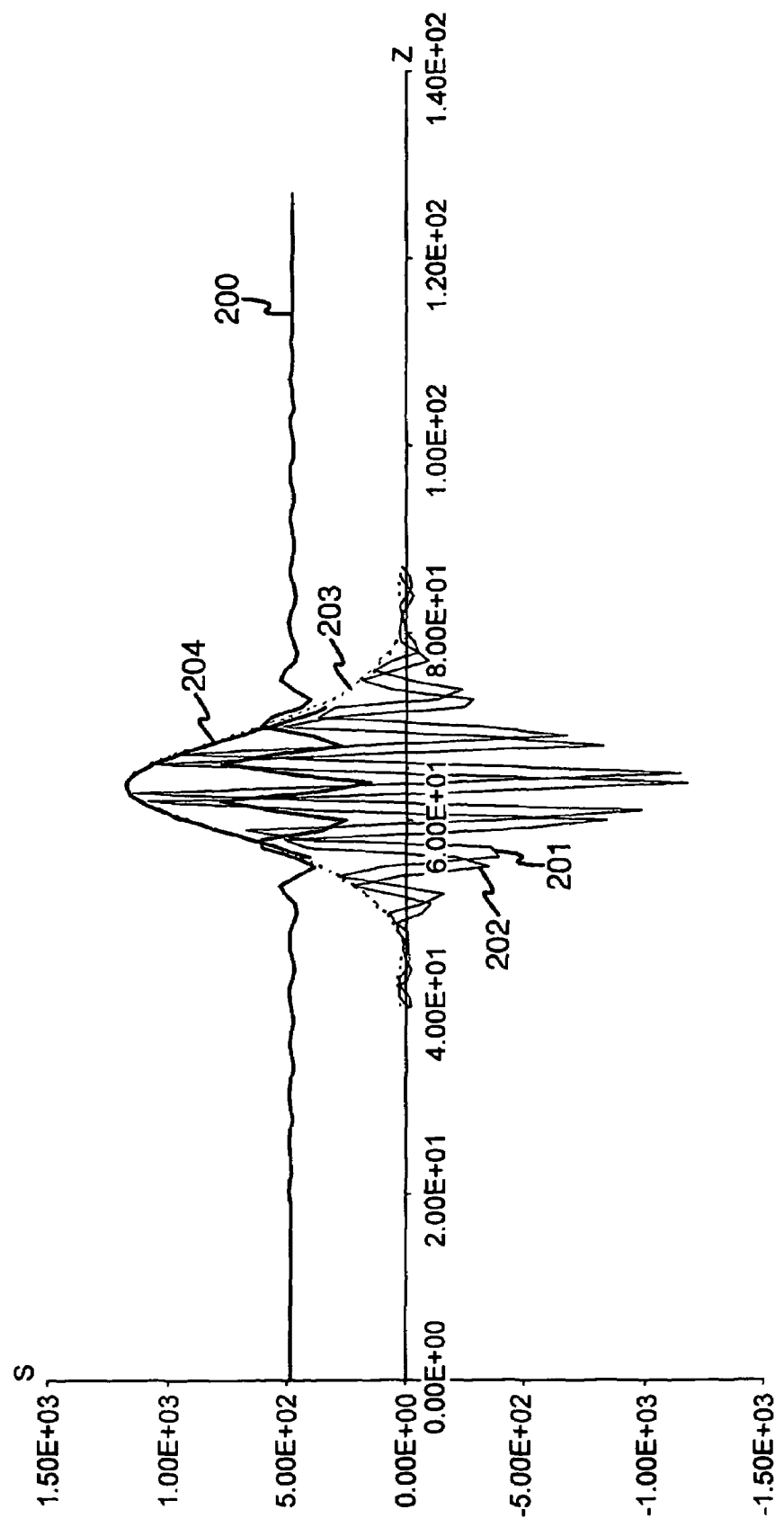
FIGS. 20a and 20b show graphs illustrating results obtained using the data processor shown in FIG. 7 with FIG. 20a showing determination of the Z position of the coherence peak and FIG. 20b showing determination of the Z position of zero correlation phase.
Figure 20B:
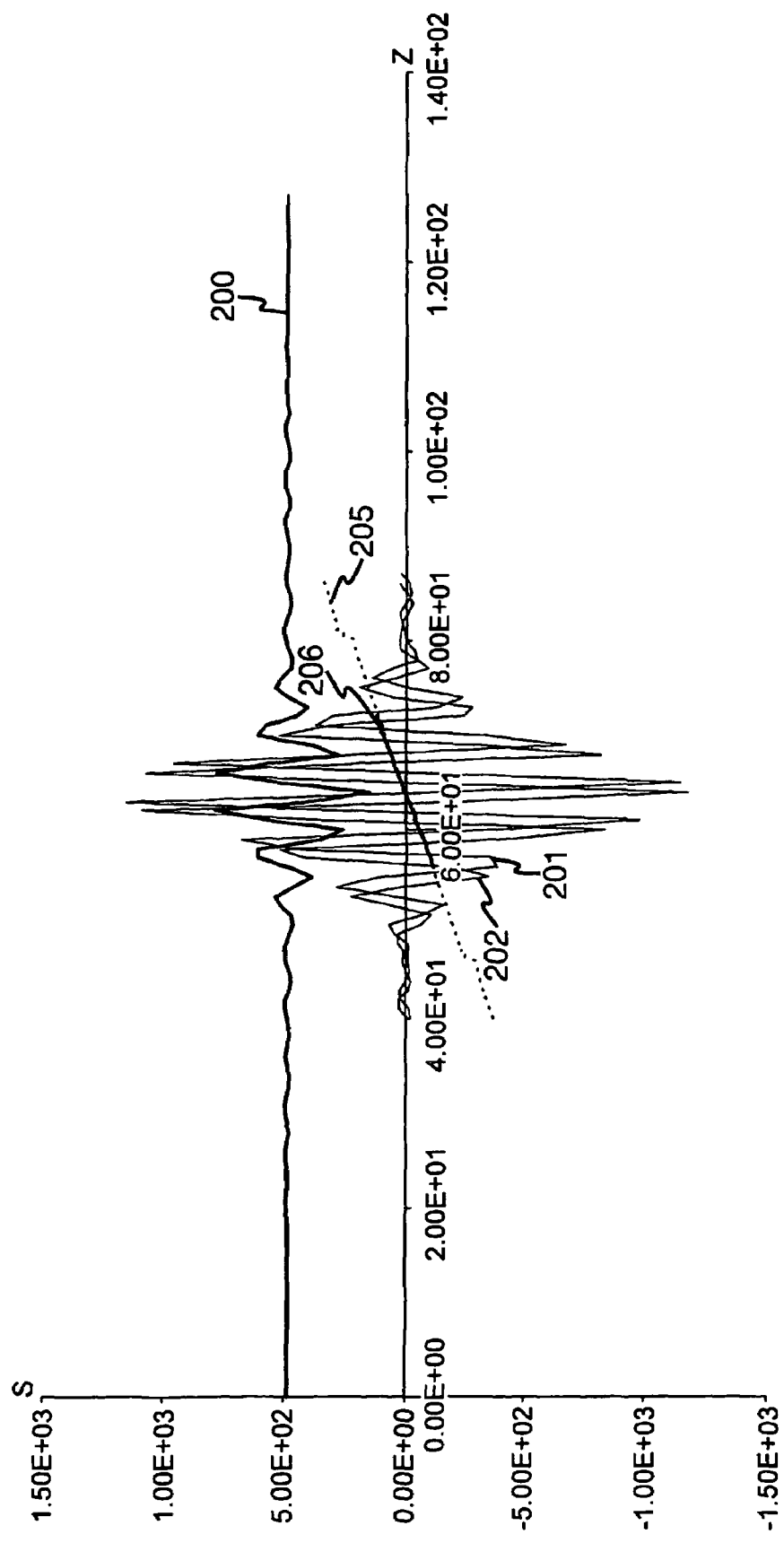
Figure 20C:
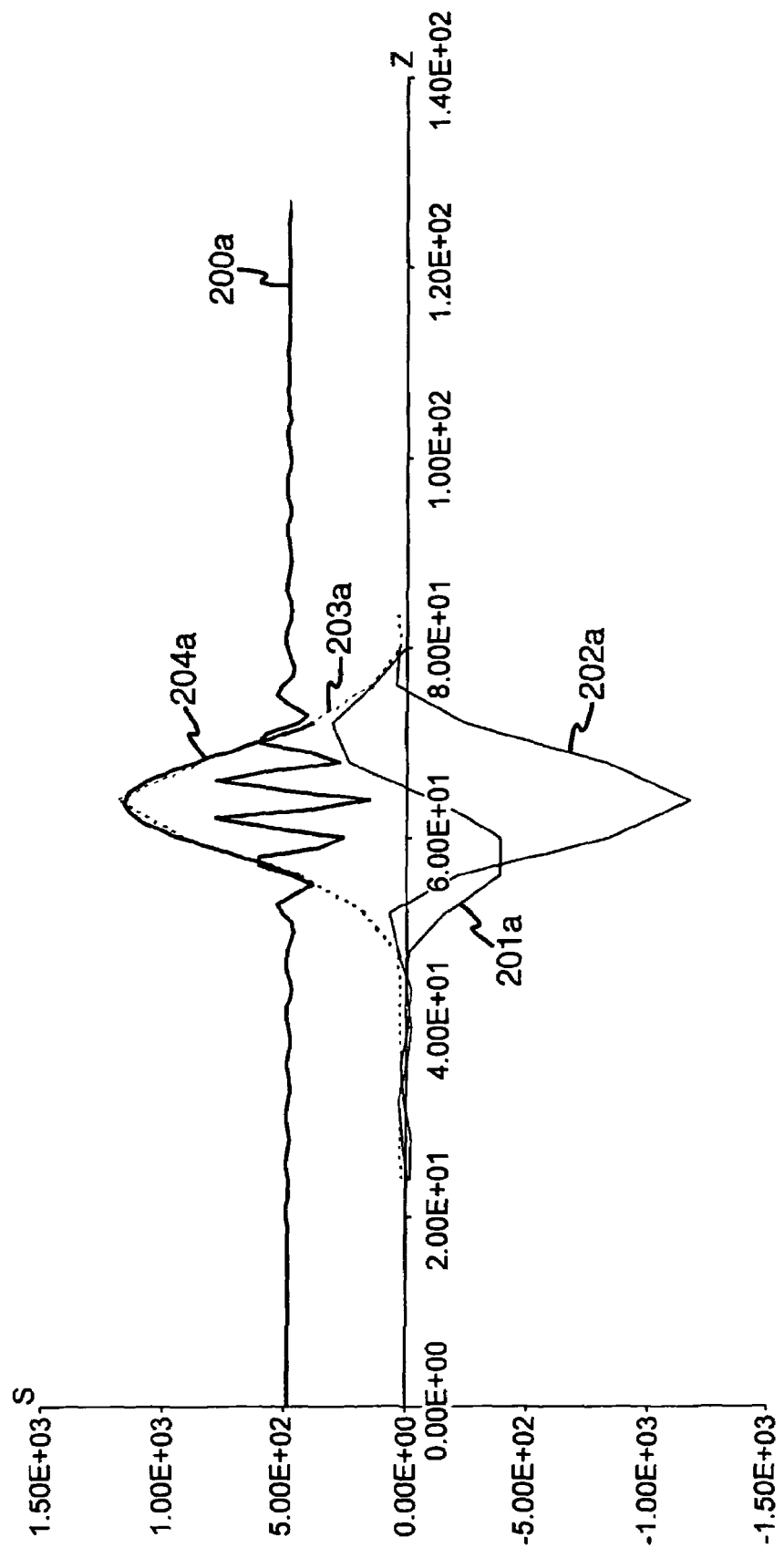
Figure 20E:
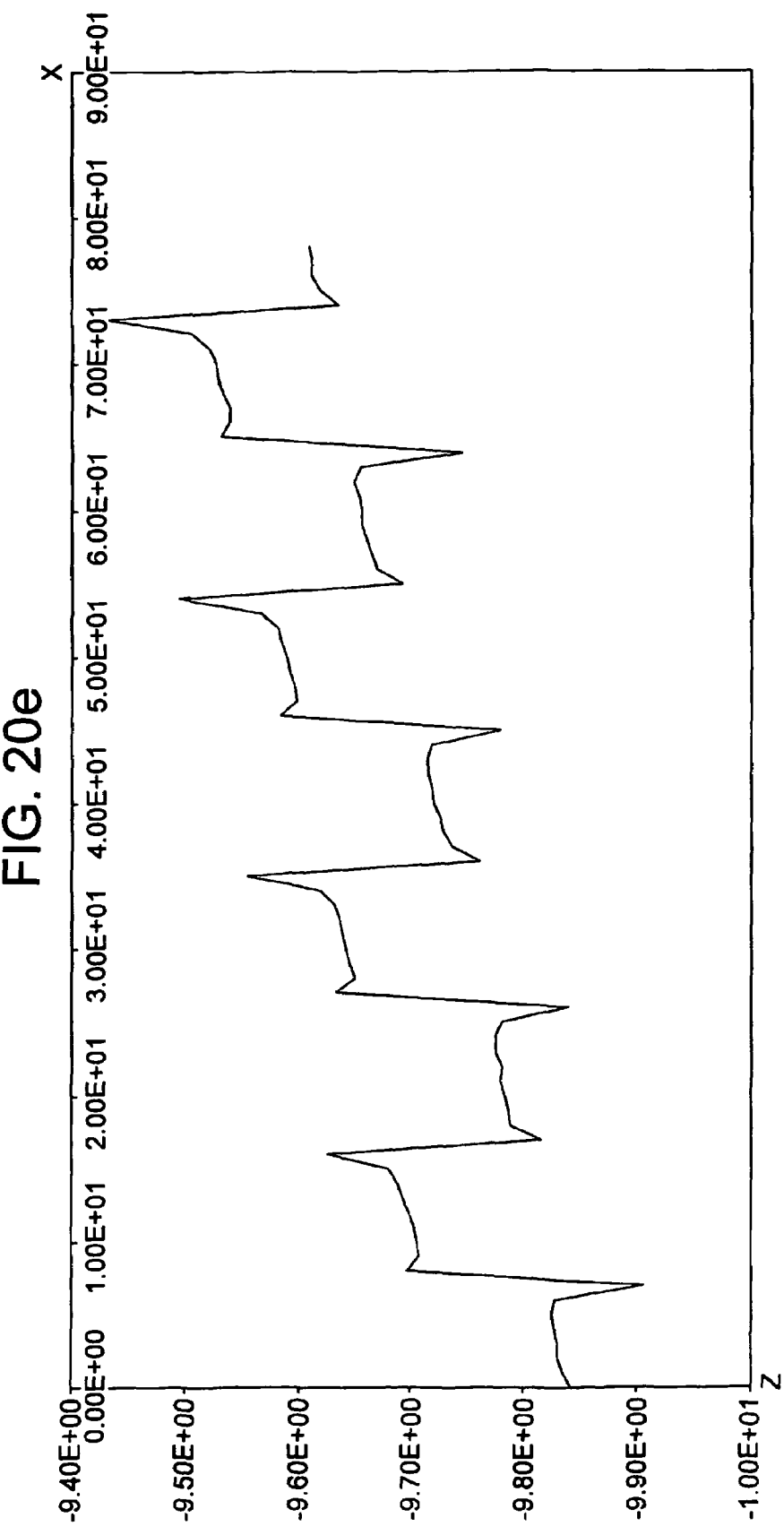
Figure 20F:
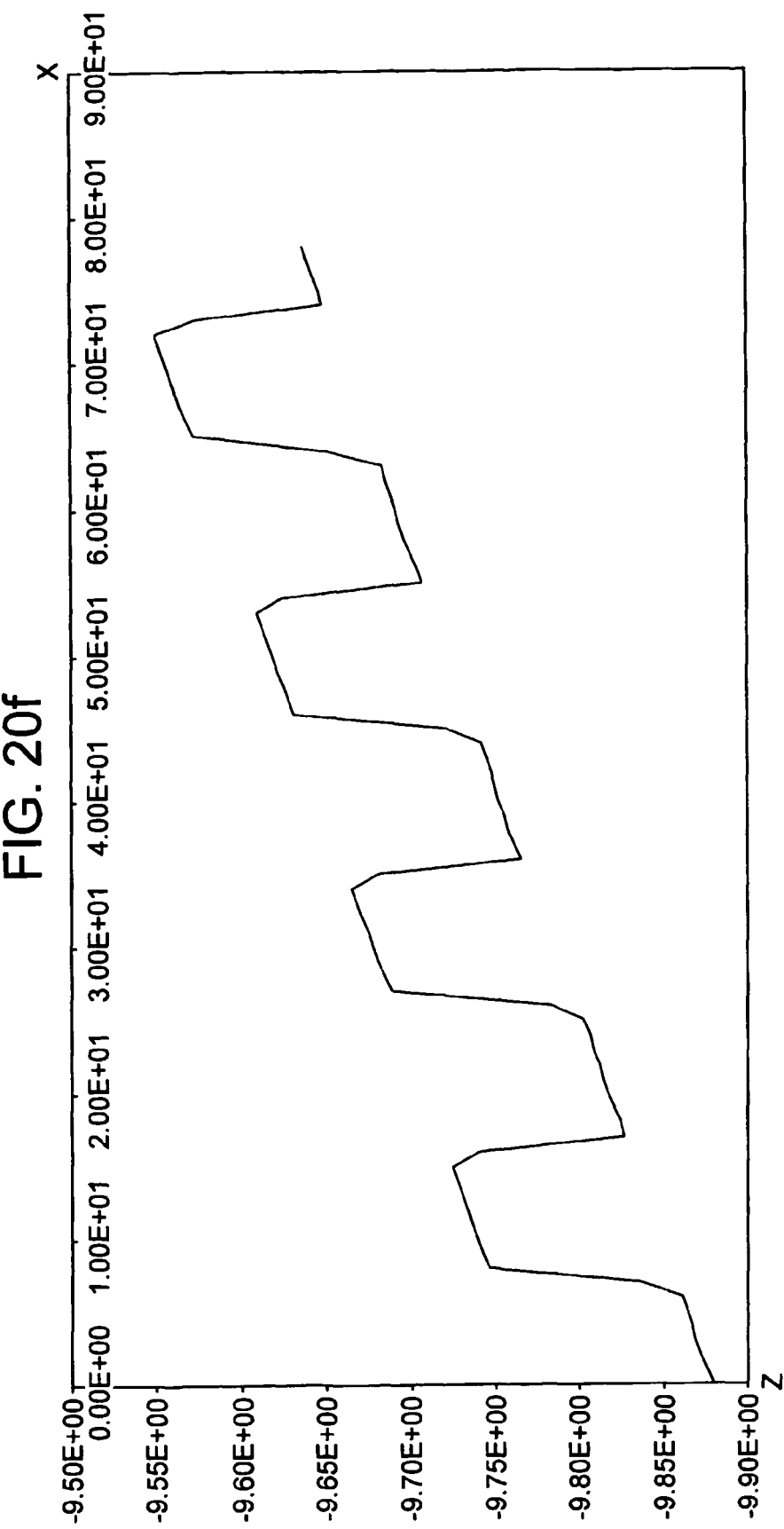

FIGS. 20c and 20d show graphs illustrating results obtained using the data processor shown in FIGS. 17a and 17b with FIG. 20c showing determination of the Z position of the coherence peak and 20d showing determination of the Z position of zero correlation phase; and FIGS. 20e and 20f show graphs representing the determined surface for a 100 nanometre grating with FIG. 20e showing the results obtained where the surface height is determined as the position of the coherence peak and FIG. 20f showing the results obtained where the surface height is determined as the position of zero correlation phase.

Referring now the drawings, the basic principles of surface profile or topography determination using broadband scanning or coherent scanning interferometry techniques will first be described with reference to FIGS. 1 and 2.

Figure 1:
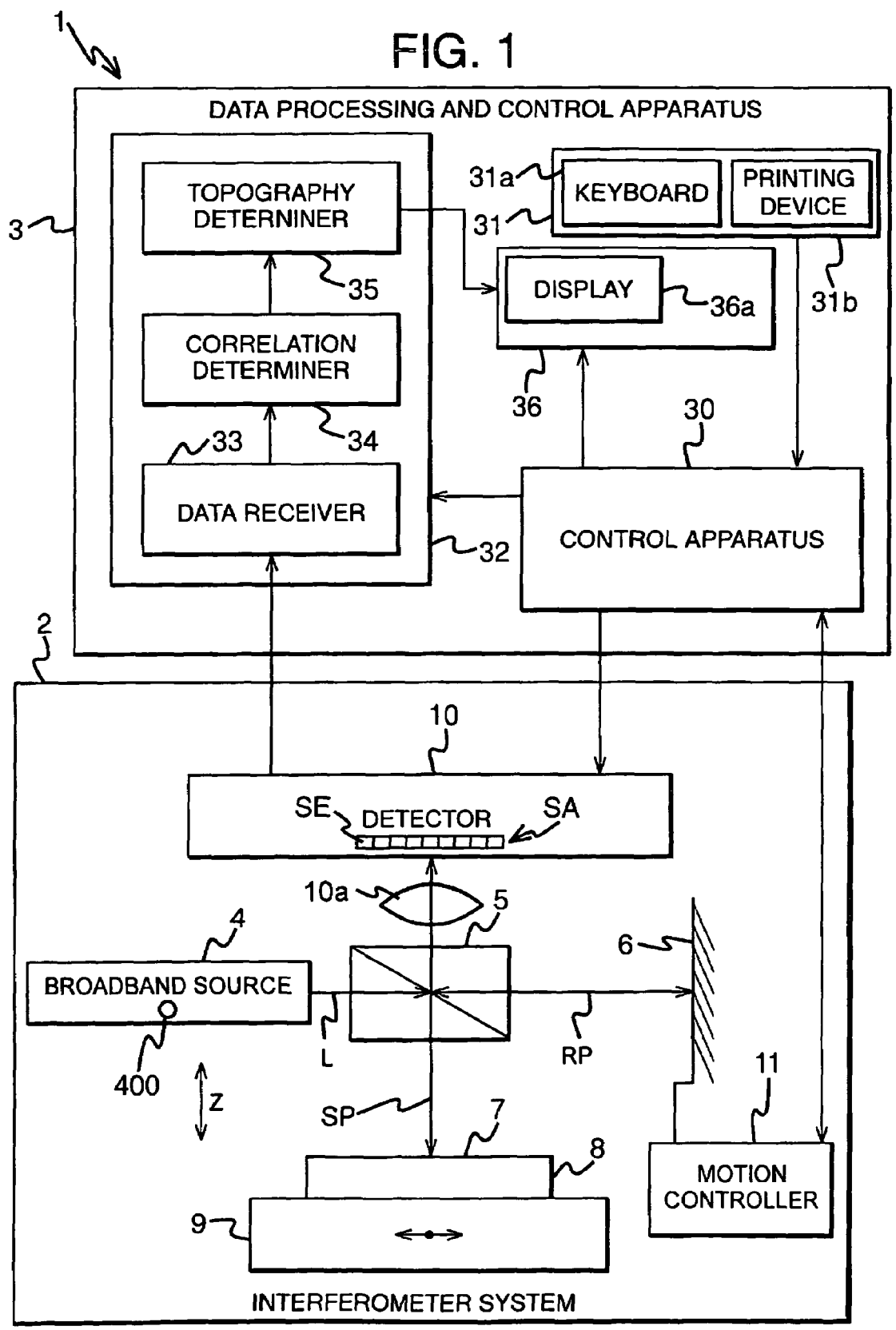
FIG. 1 shows a schematic block diagram of a surface profiling apparatus using a coherence scanning or broadband scanning interferometer.
Figure 2:
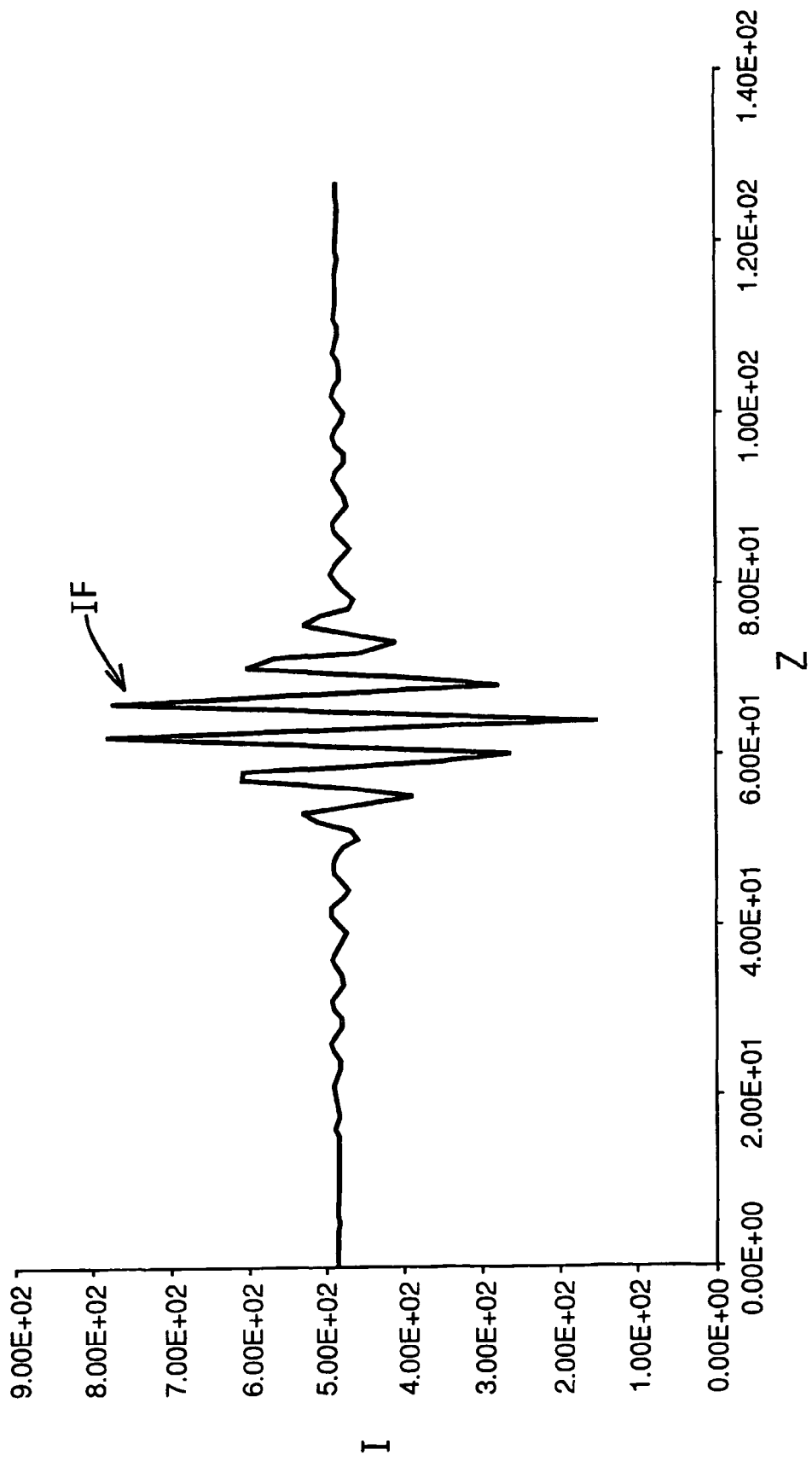
FIG. 2 shows a graph of intensity against position Z to illustrate the interference fringes for a sample surface region around a coherence peak or interference region.

FIG. 1 shows a simplified schematic block diagram of a surface profiling apparatus 1 which has a broadband or coherence scanning interferometer system 2 and data processing and control apparatus 3.

The broadband scanning interferometer system 2 is based on a conventional interferometer but, as discussed in the introduction, instead of having a monochromatic spatially coherent light source, the broadband scanning interferometer system 2 has a broadband source 4 which may be, for example, a white light source such as a quartz halogen lamp coupled to a regulated DC power supply having a light intensity output user control 400 provided in the form of a user-rotatable knob.

The broadband source 4 provides broadband light L which is split by a beam splitter (illustrated in FIG. 1 as a single beam splitting prism) 5 into a first light beam which is directed along a reference path RP towards a reference mirror 6 and a second light beam which is directed along a sample path SP towards a surface 7 of a sample 8 mounted on a sample support stage 9. Light reflected from the reference mirror 6 returns along the reference path RP to the beam splitter 5 where it interferes with light reflected from the sample surface 7 back along the sample path SP. A focussing element 10a is provided to focus an image of the region of interference onto a detector 10.

Typically, the interferometer has, for example, a Mirau, Michelson or Linnik configuration.

In this embodiment, the detector 10 has, as shown very diagrammatically in FIG. 1, a 2D (two-dimensional) array SA of image sensing elements SE. The array images an area of the sample surface 7 falling within the field of view of the detector 10. Each individual sensing element of the 2D sensing array of the detector 10 detects the portion of the interference pattern falling within the acceptance cone of that element and resulting from a corresponding surface region or pixel of the area of the sample surface 7 so that effectively the imaged area of the surface can be considered as a 2D array of surface regions or pixels. In this example, the detector 10 is a CCD (Charge Coupled Device) digital camera, for example, a Vosskühler GmbH:CCD 1300 CCD digital camera.

A motion controller 11 is provided to effect relative movement between the sample surface 7 and the reference mirror 6 so as to change the difference in the lengths of the paths travelled by light reflected from the reference mirror 6 and light reflected from the sample surface 7. As shown in FIG. 1, the motion controller 11 is arranged to move the reference mirror 6 along the reference path RP. This is equivalent to moving the sample surface 7 along a scan path in the Z direction shown in FIG. 1.

The detector 10 is arranged to capture or sense the light intensity (ie the interference pattern) at intervals as the reference mirror 6 is moved. In this example, the detector captures or senses the light intensity at intervals corresponding to movement of the reference mirror 6 by 75 nm. 2D image or frame data representing the intensity pattern for the field of view of the detector 10 is acquired by the detector 10 at each interval.

The intensity of the illumination sensed by one sensing element of the 2D sensing array (that is the portion of the interference pattern provided by light reflected from the corresponding region or surface pixel of the sample surface 7 imaged on that sensing element) varies as the path length difference changes with movement of the reference mirror 6, resulting in a series of fringes which have a coherence peak at the position along the scan path corresponding to zero path length difference. FIG. 2 shows a graph of light intensity against position Z to illustrate the change in intensity of the light sensed by a sensing element of the 2D sensing array of the detector 10 (and thus the interference fringe region) as the relative positions of the reference mirror 6 and sample surface 7 change. The envelope of the intensity distribution is the Fourier transform of the spectral distribution of spatial frequencies in the broadband source.

As is well known in the art of surface metrology, although the surface 7 may be nominally flat, the surface may have some surface form and surface roughness so that different regions or surface pixels of the surface have different heights. The position or point along the scan path at which the coherence peak occurs will be different for surface pixels at different heights. Accordingly, the surface profile or topography of an area of a surface imaged by the detector 10 can be determined by conducting a measurement operation during which the motion controller 11 causes effective movement along the scan path and images are captured at intervals by the detector 10, and by then analysing the results to determine the coherence peaks for each surface region or pixel imaged by the detector 10. Generally, to provide sufficient data for analysis, the scan path will extend beyond the actual measurement path, that is the scan path includes run up and run down regions for which data is acquired for use in the analysis of the data for the actual measurement path.

The data processing and control apparatus 3 has control apparatus 30 for controlling operation of the interferometer system 2, a data processor 32 for processing data received from the interferometer system 2 under the control of the control apparatus 30 and a user interface comprising a user input 31 and a user output 36 for enabling a user or operator to control operation of the control apparatus (and thus of the surface profiling apparatus) and for enabling the user or operator to be provided with a data output representing the results of processing by the data processor 32 of the data acquired during a measurement operation and also for enabling messages such as error messages to be communicated to the user. In the example shown in FIG. 1, the user input 31 comprises a keyboard 31*a* and a pointing device 31*b* such as a mouse while the user output device 36 comprises a display 36*a*.

The data processor 32 is arranged to process data provided by the detector 10 to determine the surface profile or surface typography of a surface imaged by the detector 10 by determining, for each surface pixel in the surface area imaged by the detector 10, the position along the scan path at which the coherence peak or a position having a predetermined relationship to the coherence peak (for example a position half way down the coherence peak curve from the actual peak) occurs.

Figure 3:
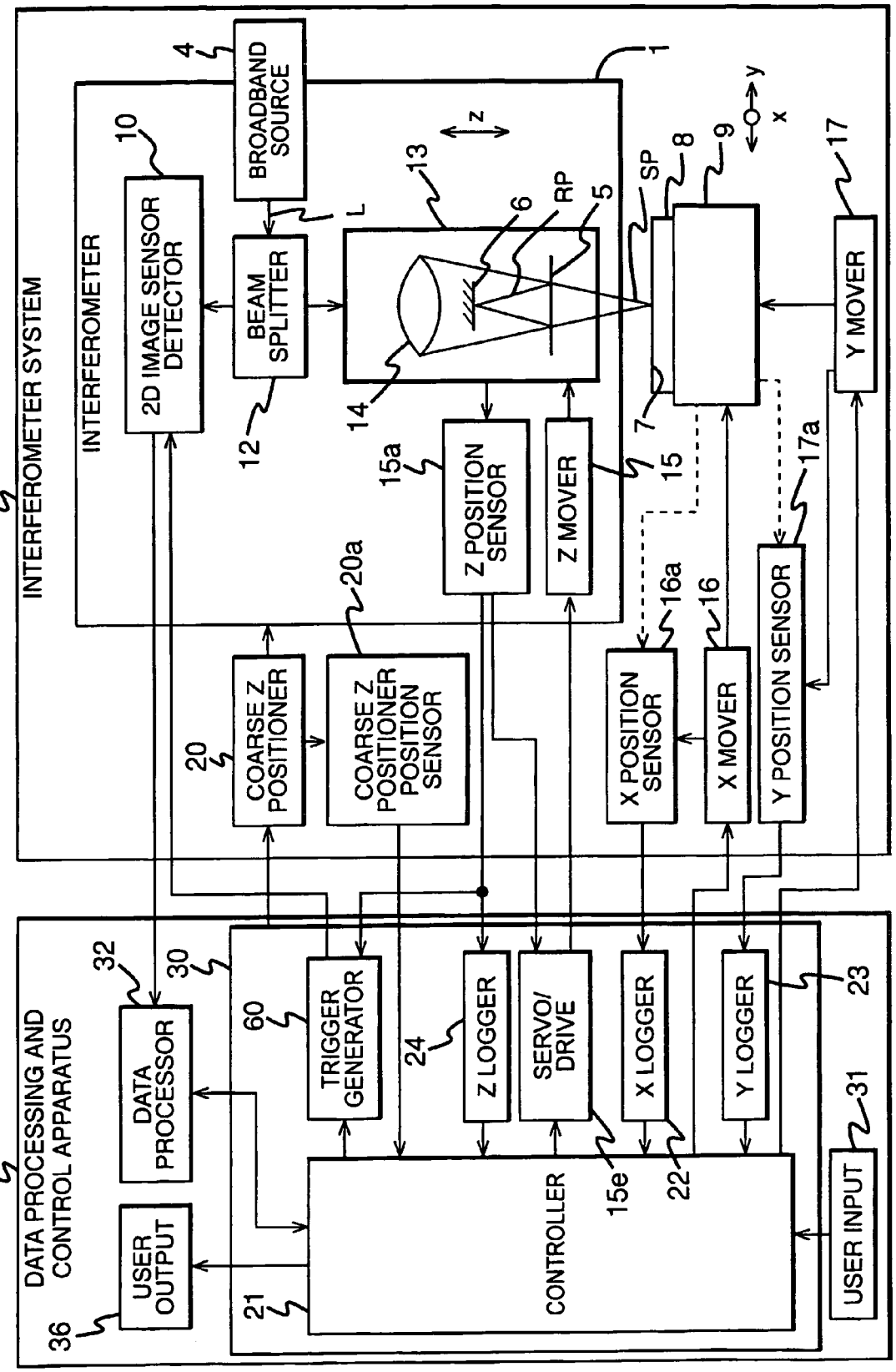
FIG. 3 shows a functional block diagram of surface profiling apparatus.
Figure 4:
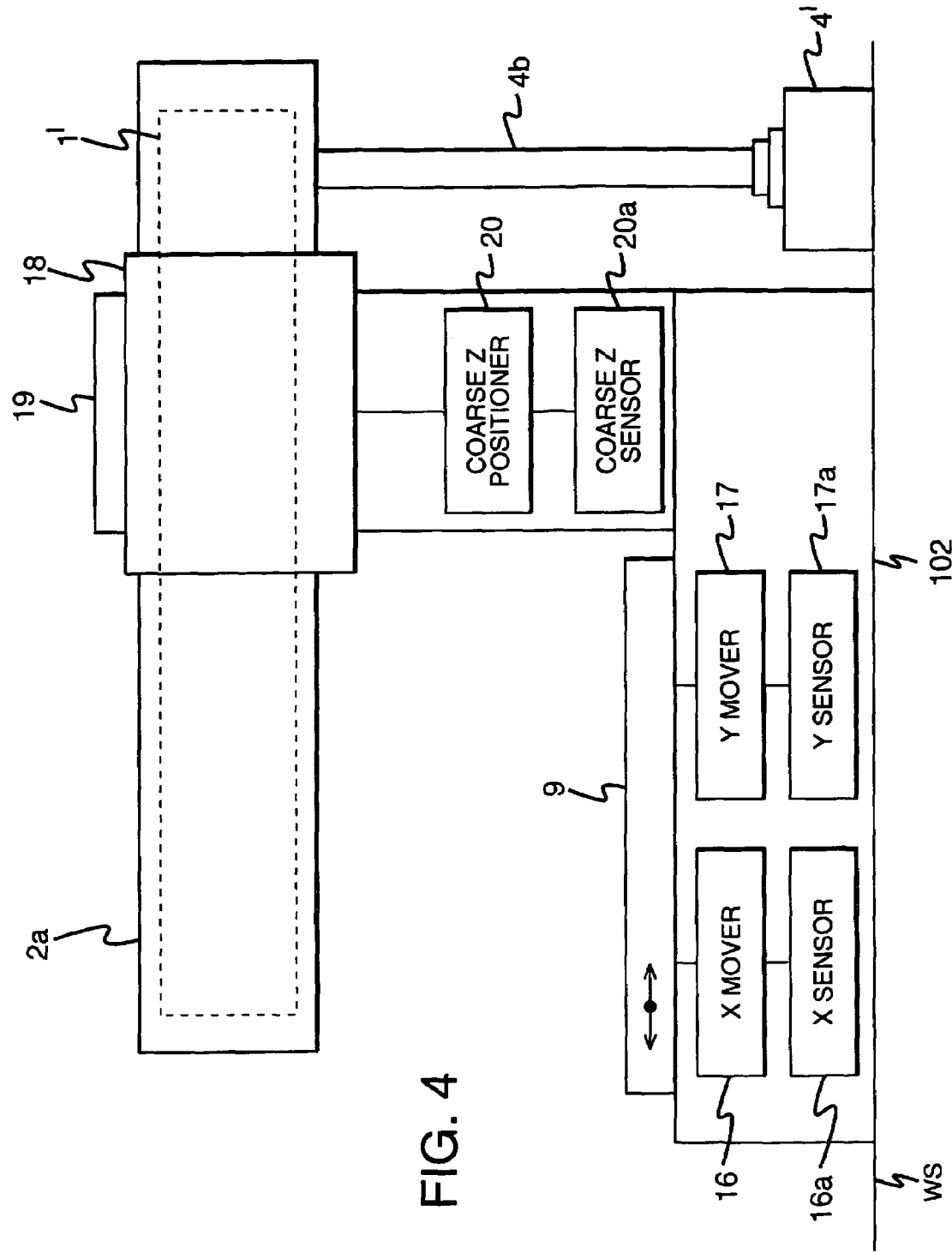
FIG. 4 shows a simplified side-elevational, part sectional view of the surface profiling apparatus shown in FIG. 3 but excluding the control apparatus.
Figure 5:
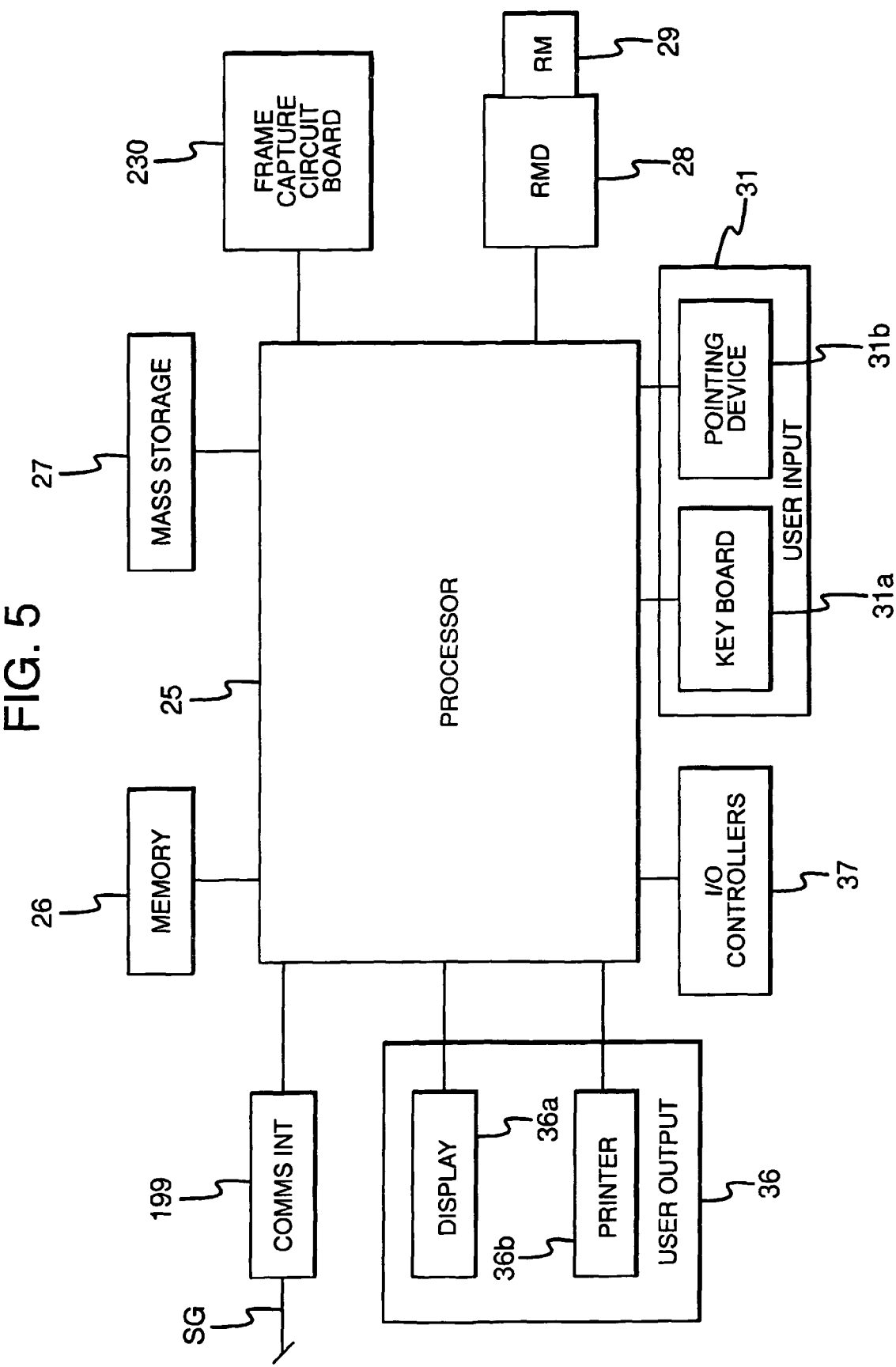
FIG. 5 shows a functional block diagram of computing apparatus that may be configured to provide the control apparatus shown in FIG. 3.
Figure 6:
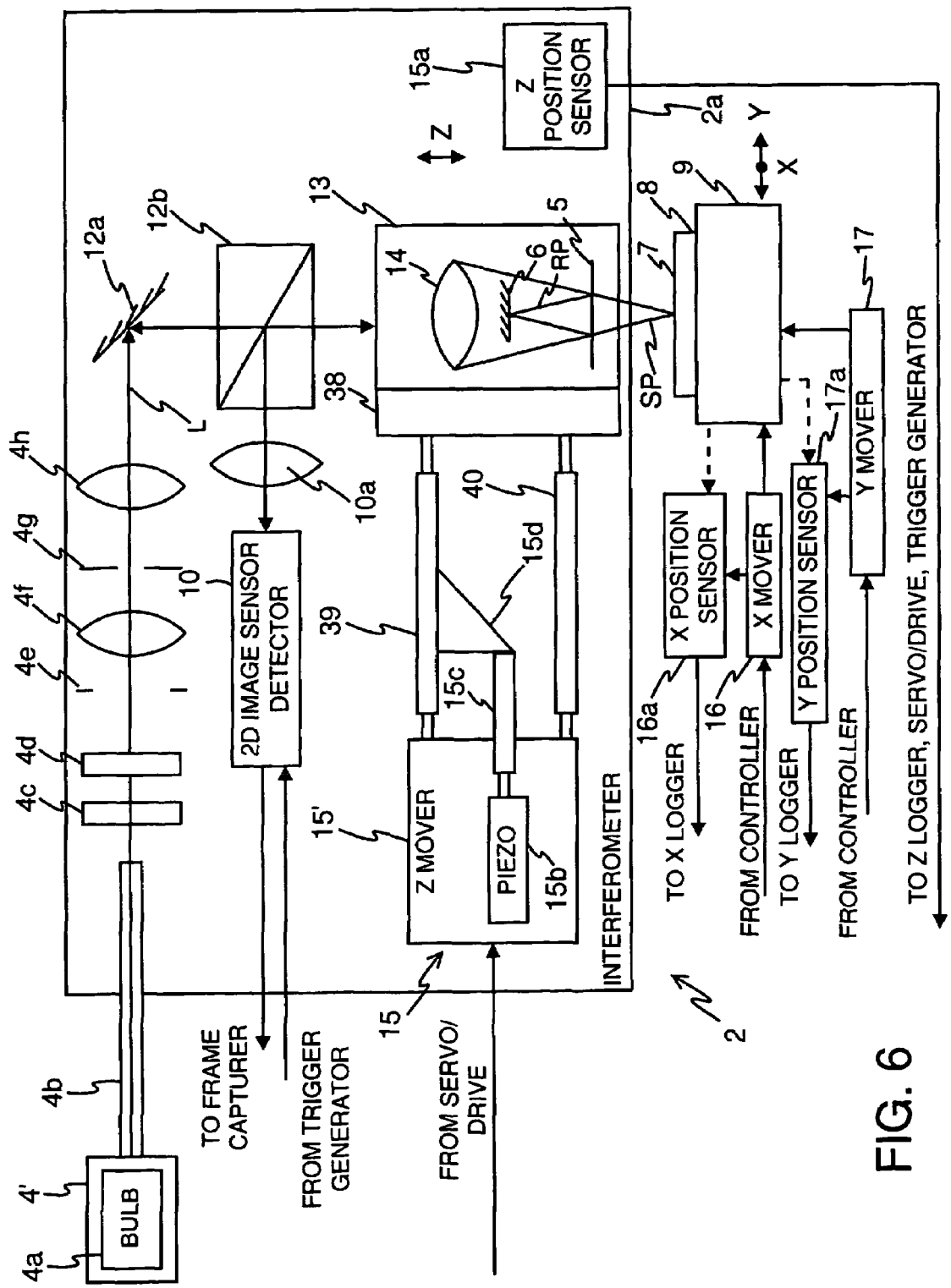
FIG. 6 shows a diagram illustrating one example of an interferometer that may be used in the surface profiling apparatus.
Figure 7:
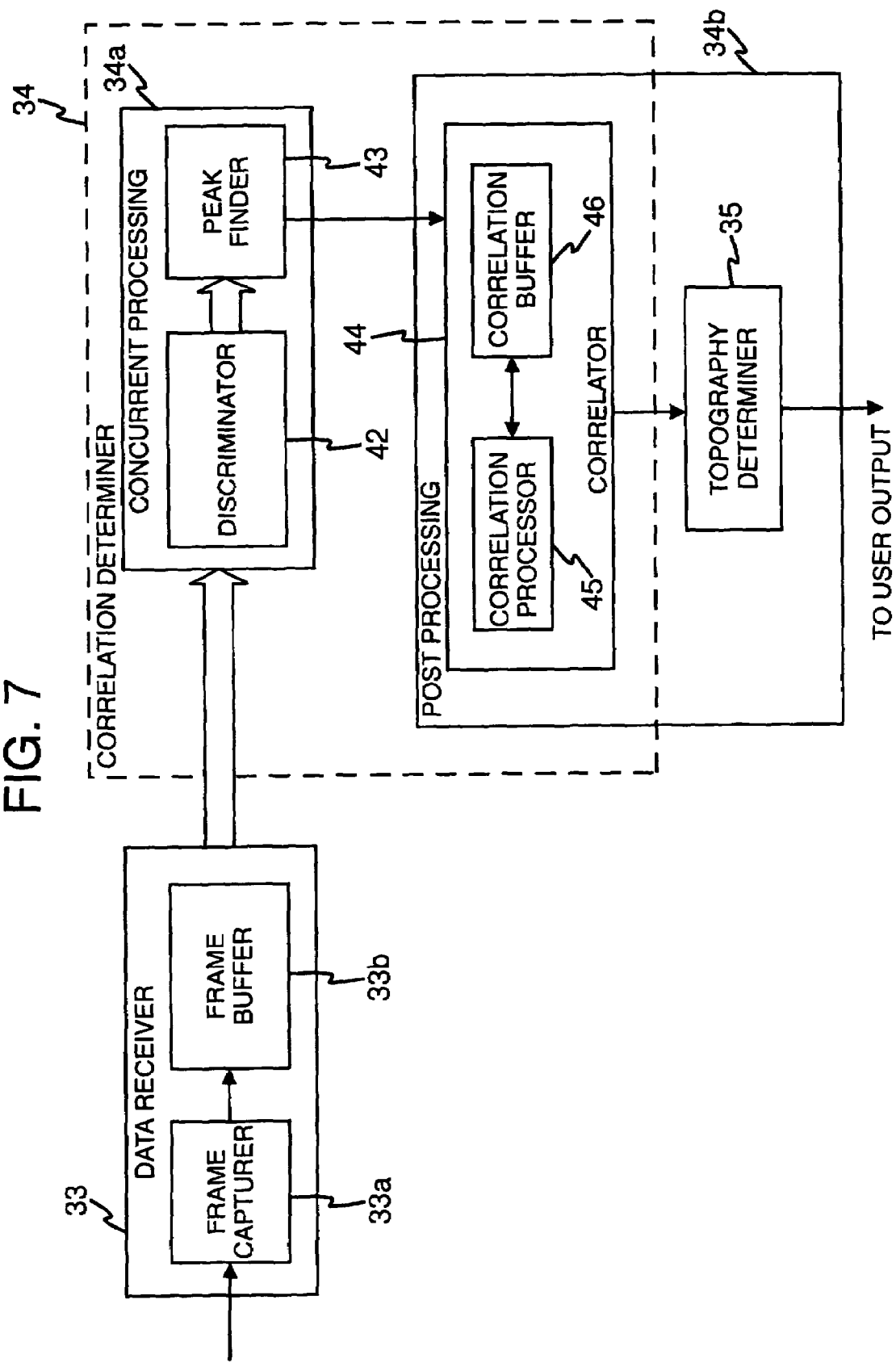
FIG. 7 shows a functional block diagram of one example of a data processor shown in FIG. 3.

One example of a surface profiling apparatus in which the interferometer has a Mirau configuration will now be described in detail with reference to FIGS. 3 to 7*b* in which FIG. 3 shows an overall functional block diagram of the surface profiling apparatus, FIG. 4 shows a simplified side elevational view of the apparatus, FIG. 5 shows a block diagram of computing apparatus suitable for providing the data processing and control apparatus 3, FIG. 6 shows a more detailed diagram of part of the broadband scanning interferometer system 2 and FIGS. 7*a* and 7*b* show an example of a broadband light source suitable for use in the interferometer system 2.

Referring firstly to FIG. 3, an interferometer I of the broadband scanning interferometer system 2 has a broadband source 4, typically comprising a quartz halogen lamp, which directs broadband light L via a beam splitter 12 to an objective lens assembly 13 which includes, in addition to an objective lens 14, the beam splitter 5 and the reference mirror 6. The beam splitter 5 splits the light beam provided by the beam splitter 12 into a first reference beam that is directed along the reference path RP and a second sample beam that is directed along the sample path SP from the interferometer I towards the surface 7 of the sample 8 mounted on the sample support stage 9.

The objective lens assembly 13, and thus the reference mirror 6, is movable in the Z direction by a Z direction mover 15, in this example a piezoelectric mover, under the control of servo/drive circuitry 15*e* of the control apparatus 30. The sample support stage 9 is movable in X and Y directions by an X mover 16 and a Y mover 17, respectively, to enable different areas of the sample surface 7 to be brought within the field of view of the detector 10.

FIG. 6 shows a diagram of part of the interferometer system to illustrate in greater detail one configuration for the broadband scanning interferometer I. In this example, the broadband source 4 comprises a quartz halogen projector bulb 4*a* (with associated reflector 4'*a*) optically coupled to an optical fibre cable 4*b* from which light is transmitted via a diffuser 4*c*, a changeable filter 4*d*, an aperture stop 4*e*, a lens 4*f*, a field stop 4*g* and a collimating lens 4*h* to provide an emergent light beam L.

The filter 4*d* may be a neutral density filter or a band pass filter, designed to restrict the wavelength range of the light emitted by the broadband source 4, such as a Helium-Neon laser line filter designed to pass light having a Helium-Neon laser line wavelength.

Typically the optical fibre cable 4*b* will be several feet long, in this case about 4 feet (about 1200 mm), allowing the projector bulb 4*a* to be placed in a separate housing 4' to facilitate changing of the bulb when necessary and more importantly keeping the heat source provided by the bulb 4*a* away from the remainder of the interferometer.

The light beam L emerging from the broadband light source is supplied to the beam splitter 12 which, in this case, consists of a mirror 12a arranged at 45° to the incident light beam and a beam splitting prism 12b through which light is directed towards the objective lens assembly 13. The mirror 12a may be replaced by a right angle prism. Light returned to the beam splitter 12b is reflected towards the detector by the beam splitter and focussed onto the detector 10 by lens 10a.

The objective lens assembly 13 is mounted on an objective support 38 coupled by parallel ligaments 39 and 40 to a Z mover housing 15' mounted to the interferometer housing 2a. In this case, the Z mover comprises a piezoelectric element (PIEZO) 15b coupled via a linkage 15c and a support 15d to one of the parallel ligaments 39 so that, when a voltage is applied to the piezoelectric element by the servo/drive circuitry 15e, the piezoelectric element changes shape causing the ligament 15c and support 15d to push the ligament 39 up or down causing the objective lens assembly 13 (and thus the reference mirror 6) to move along the scan path with the degree of movement being determined by the voltage applied to the piezoelectric element 15b.

As shown schematically in FIGS. 3, 4 and 6, the majority I' of the components of the interferometer I of the broadband scanning interferometer system 2 (apart from components of the light source prior to and including the optical fibre cable 4b) are mounted within a housing 2a mounted via a carriage 18 to a Z axis datum column 19. The fact that the components of the light source prior to and including the optical fibre cable 4b are outside the housing 2a is illustrated in FIG. 3 by showing the broadband source projecting from the housing 2a. The carriage 18 is coupled via a drive mechanism (not shown) such as a ball screw or lead screw drive mechanism to a coarse Z positioner 20 in the form of a manually operable control or, in this example, a DC motor that enables the carriage 18 and thus the interferometer I to be moved up and down the column 19 in the Z direction to enable the interferometer to be moved to different scanning start positions.

The components of the broadband source subsequent to the optical fibre cable 4b are provided within the housing 2a mounted via the carriage 18 to the z-axis datum column 19. The optical fibre cable 4b allows the remainder of the components of the broadband source to be provided in a separate light source assembly 4' which, as shown in FIG. 4, can be mounted on a work surface WS adjacent to the remainder of the apparatus so that the heat generating light bulb 4a is remote from the interferometer.

As shown in FIG. 4, a support 102 houses the X and Y movers 16 and 17 and supports the sample support stage 9. The X and Y movers 16 and 17 comprise in this example DC motors coupled to the sample support stage 9 by appropriate conventional drive mechanisms such as rack and pinion or ball screw drive mechanisms (not shown).

As shown in FIGS. 3 and 4, each of the Z, X and Y movers is associated with a corresponding position sensor 15a, 16a and 17a while the coarse Z positioner 20 may be associated with a coarse Z positioner position sensor 20a. The control apparatus 30 has a controller 21 that controls overall operation of the interferometer system 2 and communicates with the user input 31, data processor 32, user output 31 and other parts of the control apparatus 30 which, in this example, consist of the servo drive circuitry 15e and x, y and z loggers 22, 23 and 24, each of which receives the output of the corresponding position sensor 15a, 16a, and a trigger generator 60 for triggering operation of the detector 10 in response to the output of the Z position sensor 15a to capture images at the required intervals. The controller 21 also receives an output from the coarse Z positioner position sensor 20a, if provided. The controller 21 may be programmed in known manner to compensate for any error in the Z position due to the slight arcuate nature of the motion of the objective lens assembly 13.

In the case of the X or Y mover 16 or 17, where the mover is a motor, then the corresponding position sensor may be a linear grating encoder. The dashed lines between the support stage 9 and the X and Y position sensors 16a and 17a in FIG. 3 indicate that the position sensors may sense movement of the support stage 9 directly rather than by signals derived from the corresponding motor. Where the Z mover 15 is a piezoelectric mover, then the position sensor 15a may be, for example, an interferometric system, such as a grating system, or an LVDT that provides signals representing movement of the objective lens assembly 13 relative to the housing 2a of the interferometer. For example, the housing of the objective lens assembly 13 may carry a diffraction grating and a fringe detection interferometric system may be mounted within the housing 2a, providing a count of the fringes to the Z logger 24 as the objective lens assembly 13 moves relative to the housing 2a. As another possibility, a capacitive sensor may be used. As a further possibility a Michelson interferometer (with a corner cube attached to the housing 13) may be used.

In this embodiment, the beam splitter 5 may be a thin film beam splitter, in particular a Herpin filter, or a neutral density partially reflective metal filter, designed to have (over the required bandwidth and the expected angles of incidence) a reflectance of less than 50% so that a smaller proportion of the light is reflected than is transmitted. This should help compensate for the fact that, due to surface roughness or Fresnel reflectance, the reflectance of the sample surface 7 will generally be less than that of the reference mirror 6. Such a partially reflecting filter having a reflectance of about 20% should provide a good compromise in terms of signal-to-noise for surfaces having a reflectance in the range from about 1% to 100%, enabling the surface topography of, for example, of both glass and metal surfaces to be examined.

Figure 6A:
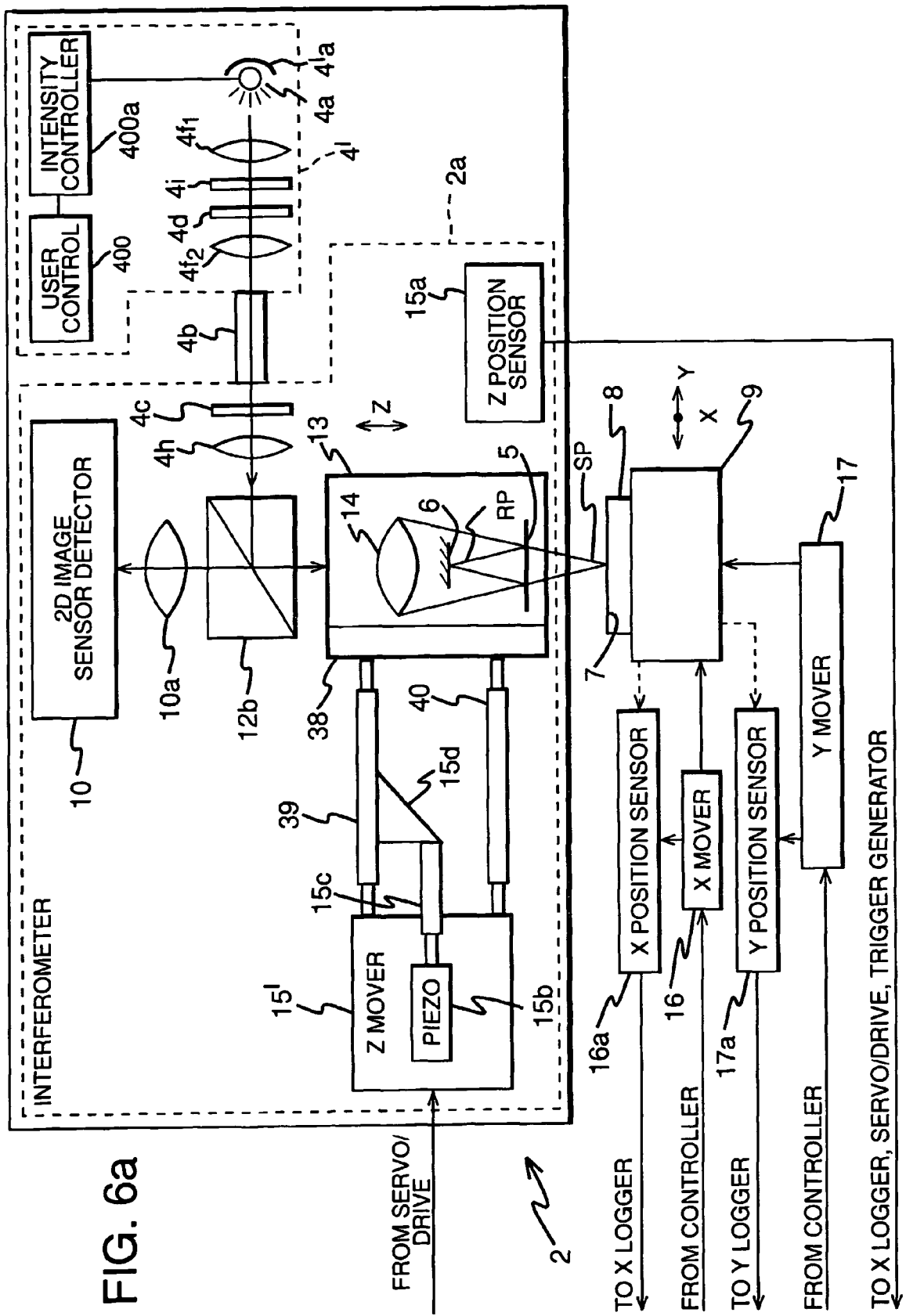
FIG. 6a shows a diagram for illustrating another example of an interferometer that may be used in the surface profiling apparatus.

FIG. 6a shows a diagram of part of the interferometer system to illustrate in greater detail another configuration for the broadband scanning interferometer I. This differs from that shown in FIG. 6 in that: the projector bulb 4a is coupled to an intensity controller 400a for controlling the light intensity output of the projector bulb 4a in response to operation of the user control 400; and the projector bulb 4a is optically coupled to the optical fibre cable 4b from which light is transmitted via an aspheric lens 4/1, a "hot mirror" 4i (that is a thin film dielectric filter designed to reflect infrared radiation back towards the light source and away from the remaining components of the interferometer), a filter assembly 4d comprising, as will be described in greater detail below with reference to FIGS. 6b and 6c, a set of exchangeable filters including a neutral density filter and one or more band pass filters designed to restrict the wavelength range of the light emitted by the broadband source, and a further aspheric lens 4f.

The light beam L emerging from the optical fibre cable 4b is supplied via a diffuser 4c and a further aspheric lens 4h to the beam splitter 12 which, in this case, consists of a beam splitting prism 12b.

Aspheric lenses 4/1, 4/2 and 4h are used in the example shown in FIG. 6a to improve the field of view. However, if this is not a concern, the lenses need not be aspheric.

In the example shown in FIG. 6a, the beam splitting prism 12b reflects light towards the objective lens assembly 13.

Light returned to the beam splitting prism 12b is directed through the beam splitting prism 12b towards the detector 10 and focussed onto the detector 10 by the lens 10a.

Figure 6B:
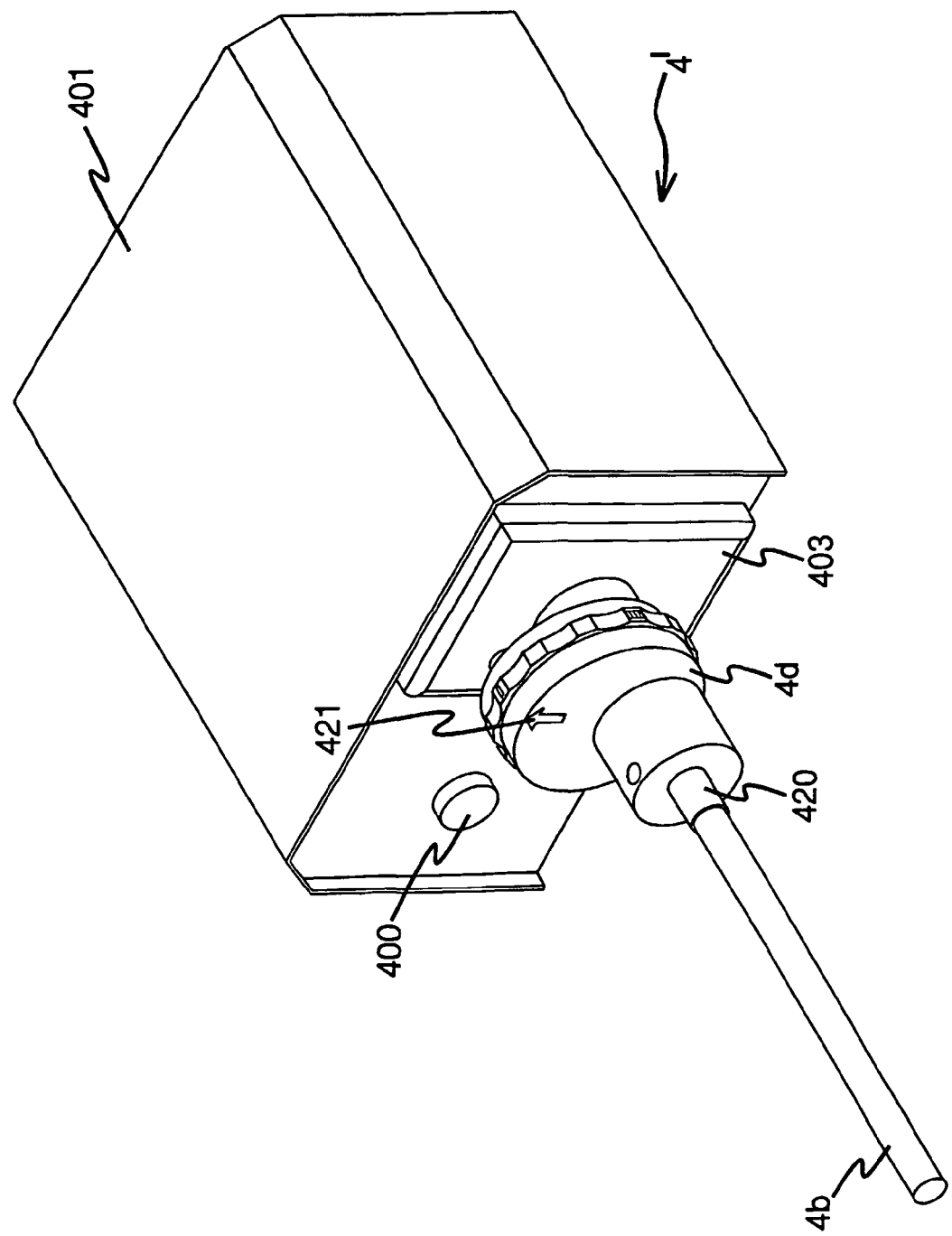
Figure 6C:
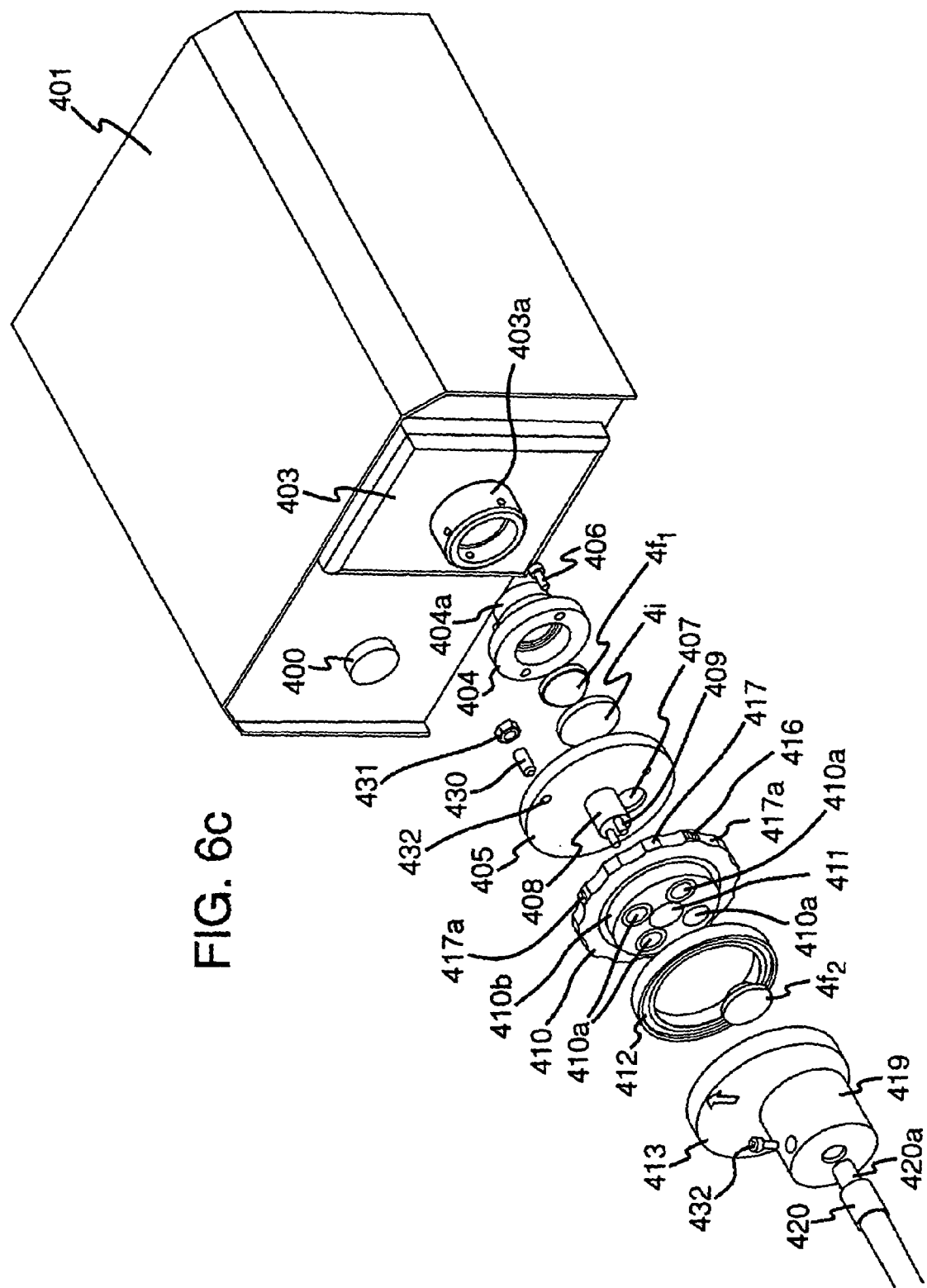
FIG. 6c shows a diagrammatic perspective view of the broadband source shown in FIG. 6b with a portion shown exploded apart to illustrate its component parts.

FIGS. 6b and 6c show diagrammatic perspective views illustrating one example of the light source assembly 4'. The light source assembly 4' has a housing 401 containing the light bulb 4a, associated reflector 4'a and drive circuitry (not shown) for controlling the light intensity of the output of the light bulb 4a in accordance with operation by the user of the light source intensity level control knob 400.

A support plate 403 is mounted to an outlet aperture of the light source housing 401. The support plate 403 has a mounting collar 403a that receives an annular coupling portion 404a of a lens mount 404 within which is mounted the aspheric lens 4f1.

The filter assembly 4d has a back plate 405 secured to a front flange 404b of the lens mount 404 by means of coupling screw 406 so that a filter window or aperture 407 of the back plate 405 is coaxial with the optical axis of the light source 4a. The hot mirror 4i is mounted in a countersunk bore (not visible in the Figures) in the back surface of the back plate 405.

A boss 408 projecting axially from a front surface 405a of the back plate 405 extends through an axial aperture 411 of a filter carrier disc or carousel 410.

The filter carrier disc 410 has a cylindrical projection 410b carrying, in this example, four filters 410a equally angularly spaced about the axial aperture 411 so that each filter 410a can be brought into registration with the filter aperture or window 407. In this example, the four filters comprise a neutral density filter, a 40 nanometre band pass filter, a 10 nanometre band pass filter and a 1 nanometre band pass filter. In this example, the filters are HeNe (Helium Neon) filters, that is the central wavelength of the pass band is 633 nm (nanometres). The latter extremely narrow wavelength range filter is provided, as will be described below, to facilitate focussing of the interferometer system 2.

A front plate 413 of the filter assembly carries a lens mount (not shown) for mounting the lens 4f2 on the optical axis. An annular bearing 412 is secured (for example glued) onto the cylindrical surface of the projection 410b and a cylindrical bore (not visible in FIG. 6c) in the front plate. The front plate 413 of the filter assembly is secured to the back plate by screws 409 passing through the boss 408 into the front plate 413 and the annular bearing 412 allows the filter carrier disc or carousel 410 to rotate relative to the front and back plates.

Although not visible in FIG. 6c, the back surface of the filter carrier disc 410 carries four v grooves or notches, one radially aligned with each filter. A spring biassed plunger 430 held in place by a nut 431 extends through an aperture 431 in the back plate so as to be biassed into engagement with a v groove or notch when aligned therewith. The filter carrier disc or carousel 410 thus has four indexed positions defined by the v grooves and spring biassed plunger 430. The filter carrier disc or carousel 410 can thus be manually rotated relative to the rear and front plates of the filter assembly 4d to bring each of the filters in turn into alignment with the aperture 407.

To assist the user in rotating the filter carrier disc 410 to bring a filter into registration with the filter window or aperture 407, a peripheral ring 414 of the filter carrier disc 410 has equally angularly spaced cut away portions 416 defining therebetween land portions 417 (twelve in this example) with every third land portion 417a being radially aligned with a corresponding filter 410a and being ridged or grooved so that a user can determine by touch a land portion corresponding with a filter.

The lands 417a radially adjacent the different filters 410a may be individually distinguishable, for example, the different lands may have different numbers of ribs or grooves so that a user can differentiate between the different lands by touch and can select a particular filter without having to look at the filter assembly. As another possibility or additionally, the different lands may be visually distinguishable, that is they be of different colours.

A front face of the front plate 413 of the filter assembly carries a coupling member 419 having a coupling aperture for receiving a coupling portion 420 of the optical fibre 4b and a cooperating Allen screw 432 and aperture for holding an end 420a of the optical fibre cable coupling portion 420 securely in place. As shown in FIG. 6b, the filter assembly may carry one or more indicia (a single arrow 421 is shown in FIGS. 6b and 6c) to enable a user to determine visually which filter is currently aligned with the filter aperture or window.

The light source assembly 4' described above and the filter assembly 4d in particular enable a user rapidly and easily to change from one filter to another so that, for example, the neutral density filter can be used for normal coherence or broadband scanning interferometry while the 40 nanometre and 10 nanometre band pass filters can be used for sub-Nyquist scanning and the very narrow bandwidth 1 nanometre filter can be used for focussing as will be described below without the user having to access any internal components of the interferometer system. Moreover, the peripheral surface of the filter assembly 4d enables a user rapidly to locate the required filter in front of the filter window or aperture 407 without having to look at the filter assembly so that the user can concentrate on images being displayed to him or her while adjusting the filter assembly 4d.

The control apparatus 30 may be implemented by programming computing apparatus, for example a personal computer. FIG. 5 shows a simplified block diagram of such computing apparatus. As shown, the computing apparatus has a processor 25 associated with memory 26 (ROM and/or RAM), a mass storage device 27 such as a hard disk drive, a removable medium drive (RMD) 28 for receiving a removable medium (RM) 29 such as a floppy disk, CDROM, DVD or the like, input and output (I/O) controllers 37 for interfacing with the components of the broadband scanning interferometer system to be controlled by the control apparatus (for example, the Z, X and Y movers 15 to 17, the coarse Z positioner 20 and the detector 10) to enable the processor 25 to control operation of these components, the user input 31 consisting, in this example of a keyboard 31a and a pointing device 31b, and the user output 36 consisting, in this example, of a display such as a CRT or LCD display 36a and a printer 36b. The computing apparatus may also include a communications interface (COMMS INT) 199 such as a modem or network card that enables the computing apparatus to communicate with other computing apparatus over a network such as a local area network (LAN), wide area network (WAN), an Intranet or the Internet. In this example, the data receiver 33 is provided as a dedicated frame capture circuit board 230 installed within the computing apparatus.

The processor 25 may be programmed to provide the control apparatus 30 shown in FIG. 3 by any one or more of the following ways:

1. by pre-installing program instructions and any associated data in a non-volatile portion of the memory 26 or on the mass storage device 27;
2. by downloading program instructions and any associated data from a removable medium 29 received within the removable medium drive 28; and
3. by downloading program instructions and any associated data as a signal SG supplied from another computing apparatus via the communications interface 199.

The computing apparatus, when programmed by program instructions to provide the control apparatus 30, enables a measurement operation to be controlled in accordance with instructions received by a user, and the resulting frame data supplied by the detector 10 to be analysed to determine the surface profile or topography of the area of the surface imaged onto the 2D array of the detector 10.

FIG. 7 shows a functional block diagram of one embodiment of the data processor 32.

As shown in FIG. 7, the data receiver 33 comprises a frame capturer 33*a* and a frame buffer 33*b* both provided by the dedicated frame capture circuit board 230 (FIG. 5). The frame buffer 33*b* stores frames of data received from the detector 10 and in this example has sufficient capacity to store frame data for all the frames to be processed by the correlation determiner 34.

In this example, the data processor has a concurrent processing section 34*a* that carries out processing operations in parallel on different pixels of a frame of image data and a post processing section 34*b* that carries out processing operations in series or sequentially on different pixels of a frame of image data. The broad arrows in FIG. 7 indicate parallel processing while the single line width arrows indicate serial processing.

The concurrent processing section 34*a* includes part of the correlation determiner, in particular a discriminator 42 and a peak finder 43, for monitoring or checking the incoming frames of data as they are supplied by the detector 10 to identify, for each surface pixel in parallel, which portion of the intensity data for that surface pixel is likely to contain the coherence peak. The peak finder 43 stores data identifying, for each surface pixel, the likely coherence peak data region.

The post-processing section comprises the remaining parts of the correlation determiner, namely a correlator 44 having a correlation processor 45 and a correlation buffer 46, and the topography determiner 35.

The correlator 44 is configured, once all of the frames of data for a measurement operation have been received, to access the intensity data flagged by the peak finder 43 as including the likely coherence peak region for a surface pixel, to carry out a correlation procedure to be described below on that data to determine the position of the correlation peak for that surface pixel and then to repeat the process for each of the remaining surface pixels of the area of the surface imaged by the detector 10.

The results of the correlation procedure for each surface pixel are supplied to the surface topography or profile determiner 35 that determines the surface profile or topography using the results obtained by the correlator 44 and outputs surface topography or profile data to the user output 31.

The operation of surface profiling apparatus having the data processor 32 described above with reference to FIGS. 3 and 7 will now be explained, assuming that the surface profiling apparatus has been calibrated by making measurements on a surface of known form and/or roughness.

Generally, the operator will instruct the controller 21 to cause the broadband scanning interferometer system 2 to carry out a measurement operation with a user-selected scan path length and scan step or interval between acquisition of images by the detector 10. When a measurement operation is initiated, the controller 21 instructs the Z mover 15 to commence movement of the objective lens assembly 13 (and thus the reference mirror 6) along the scan path at a specified speed, as determined by the pre-programmed routine, and the detector 10 senses the interference pattern at predetermined intervals when triggered by the trigger generator 60 and supplies the resultant image data to the data receiver 33 so that images or frames of the interference pattern are captured by the frame capturer 33*a* at the required intervals or scan steps along the scan path and are stored in the frame buffer 33*b* in association with data identifying the corresponding scan step or interval determined by the controller 21 from the signals logged by the Z logger 24 in accordance with the output of the Z position sensor 15*a*.

The operation of the data processor 32 shown in FIG. 7 will now be described in greater detail with the assistance of FIGS. 8 to 16.

FIG. 8 shows schematic representations of successive frames of data supplied by the data receiver 33. Each frame consists of a matrix of pixels with each pixel corresponding to a specific different surface pixel of the surface being measured. For ease of explanation and simplicity in the drawings, a 3×3 matrix of pixels P1 to P9 is shown. It will, however, be appreciated that in practice the number of pixels will be considerably greater. Typically, the detector 10 will have an array of sensing elements that enables the region of interest (ie the region of the sample surface processed by the data processor) to consist of a 256×256 sensing element array, a 512×512 or a 1024×1024 sensing element array.

The intensity data for the kth pixel in the ith frame is indicated in FIG. 8 as $I_i P_k$ so that, as shown, the intensity value for pixel P1 in frame 1 is $I_1 P_1$ while the intensity value for pixel P1 in the Nth frame is $I_N P_1$.

FIG. 9 shows a flow chart for illustrating the operation of the discriminator 42.

As illustrated by step S1, the discriminator 42 carries out processing operations in parallel on the intensity value data for all of the surface pixels (P1 to P9 in FIG. 8) imaged by the detector 10 as the frames of data F1, F2, F3 and so on are received. In order to increase the processing speed, the discriminator may examine only every Nth frame as it is received. The interval depends upon the frame interval (that is the interval between capture of images) and the mean wavelength and is in this example two so that the discriminator 42 examines every second frame, that is the first, third, fifth and so on frames, as they are received.

The procedure carried out by the discriminator will be described for a single surface pixel. The same procedure will be carried out in parallel for the other surface pixels.

The discriminator reads the intensity values for every Nth frame (step S2) and in order to determine the discrimination value $D_n$, the discriminator determines, at step S3, the mean of a set of intensity values $I_{n-4}, I_{n-2}, I_n, I_{n+2}, I_{n+4}$ consisting of the most recently read intensity value and the four previous most recently read intensity values. Then at step S4, the discriminator calculates the sum of squares of deviations of the set of intensity values, that is:

$$D_n = (I_{n-4}-M_n)^2 + (I_{n-2}-M_n)^2 + (I_n-M_n)^2 + (I_{n+2}-M_n)^2 + (I_{n+4}-M_n)^2 \tag{1}$$

and passes this to the peak finder as the discrimination value $D_n$. Then, at step S5 the discriminator adds this discrimination value to a sum of discrimination values, thereby accumulating the discrimination values. Then at step S5a, the discriminator checks if the last frame has been processed and, if not, repeats steps S2 to S5 for every second further intensity value so that the next set of intensity values for which the mean is determined is intensity value $I_{n-2}$, $I_n$, $I_{n+2}$, $I_{n+4}$, $I_{n+6}$ and the sum of squares of deviations for those intensity values provides the discrimination value $D_{n+2}$ which is passed to the peak finder. This is repeated until all of the intensity values for the pixel have been processed.

The operation of the peak finder will now be described with reference to FIG. 10a to 10d.

The peak finder has a number of different states with the current state and switching between different states being determined by changes in the discrimination values.

In this example, the peak finder 43 has an initial state which exists for the first discrimination value, a low state which exists when the discrimination value is below a threshold, a found state which exists when the discrimination value is above a threshold, a saturated state which exists if the light level is too high and so the discrimination value is out-of-range, that is above a highest possible maximum, and an optional early state which exists if the discrimination value falls after the initial value. The peak finder is configured to move from the initial to the low state if the received discrimination value is below the threshold, to move from the initial state to the early state if the discrimination value is above the threshold value, to move from the low state to the found state if the discrimination value rises above the threshold value, and to move from the early state to the low state if the discrimination value falls below the threshold value.

FIG. 10a shows a top level flow chart illustrating the steps carried out by the peak finder 43. Again, as illustrated by step S6, the peak finder 43 carries out processing operations in parallel for all of the surface pixels.

When, at step S7, the peak finder receives a first discrimination value from the discriminator then, at step S8, the peak finder 43 sets the state as initial and the current discrimination value as the maximum value. At step S9, the peak finder 43 compares the current discrimination value with a threshold and sets the state as low if the discrimination value is below the threshold or as early if the discrimination value is equal to or greater than the threshold. At step S10, the peak finder continues to monitor the discrimination values as they are received in accordance with the set state until all discriminations values for a pixel have been checked.

Figure 10B:
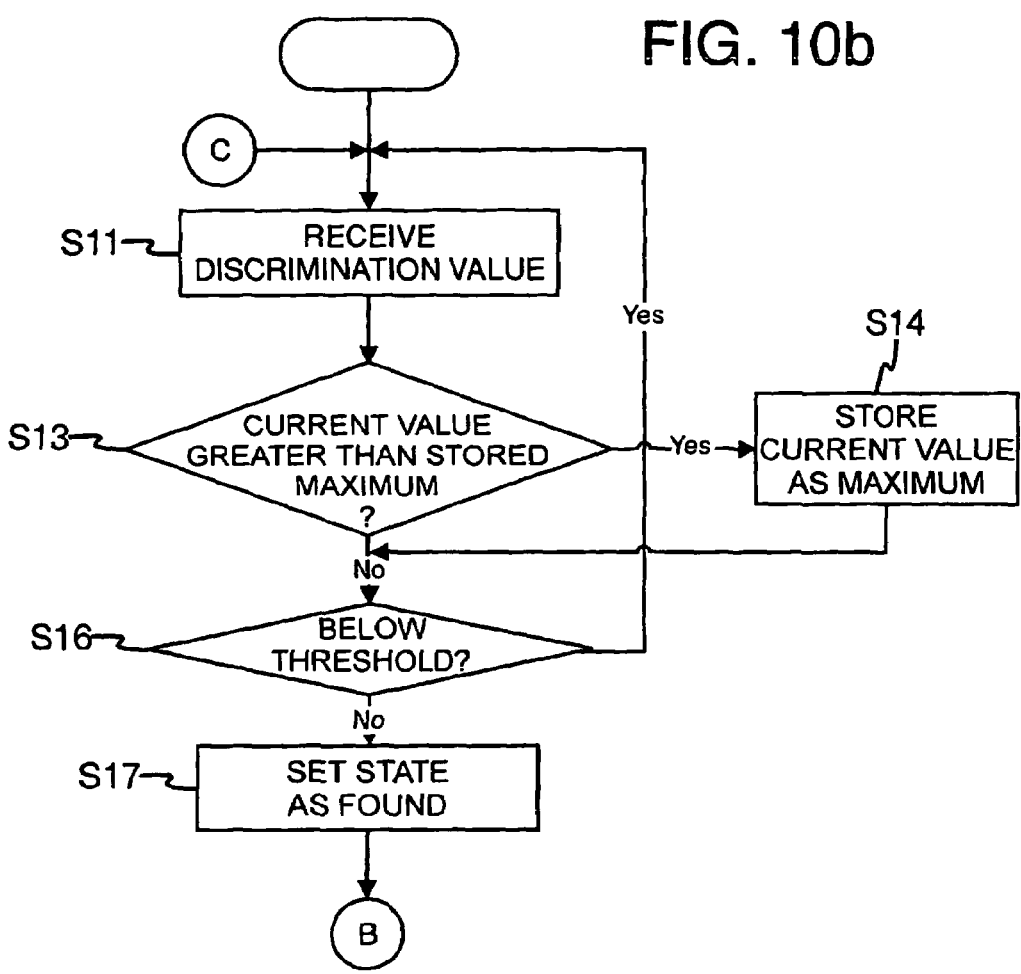
Figure 10C:
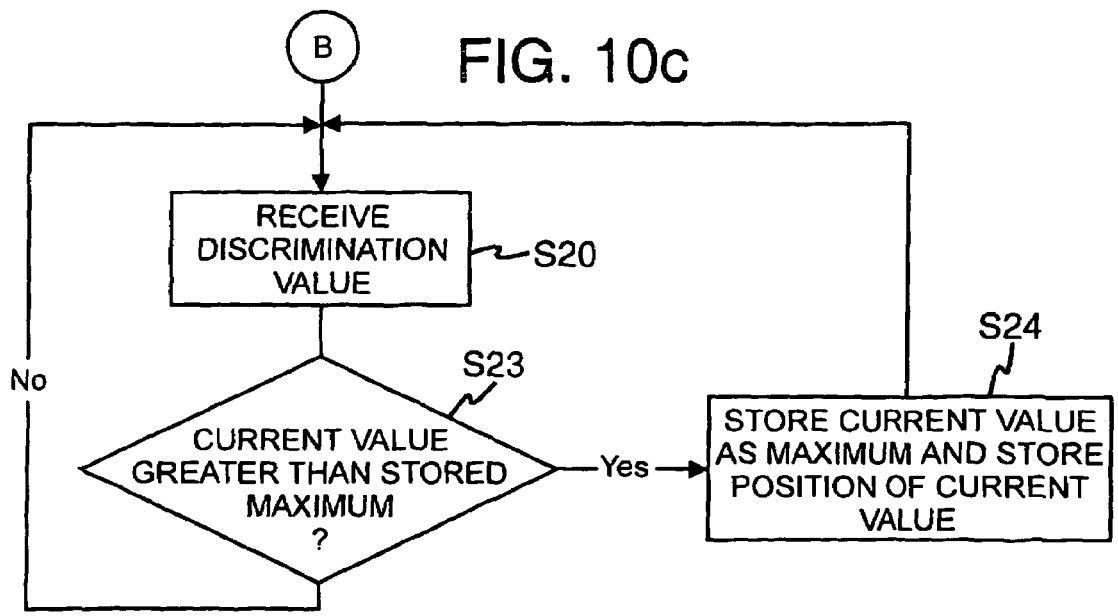
Figure 10D:
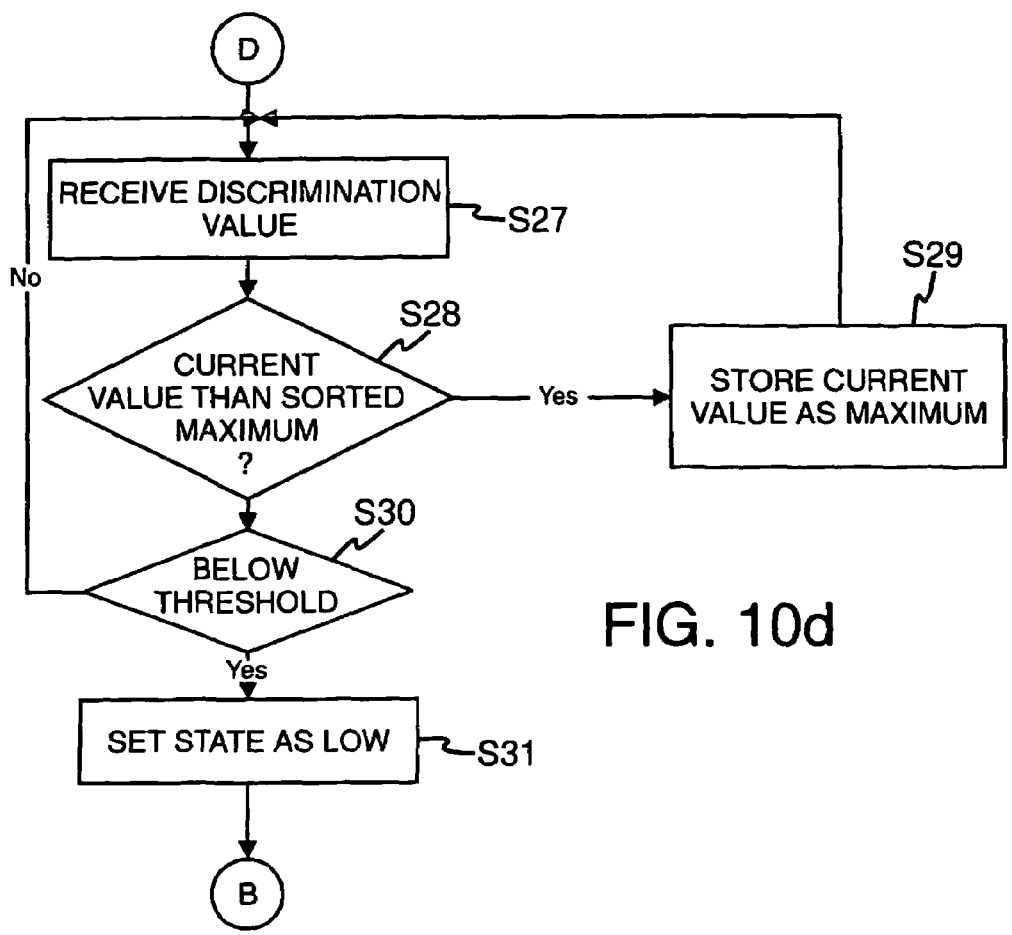
Figure 11:
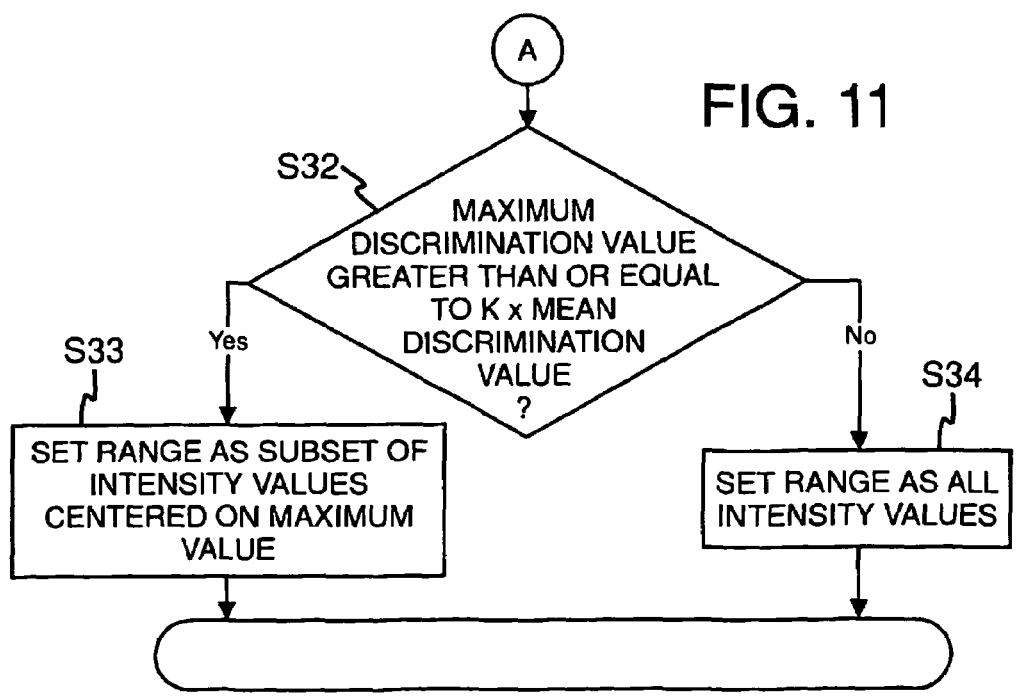
FIG. 11 shows a flow chart for illustrating further steps carried out by the discriminator shown in FIG. 7.

FIGS. 10b to 10d show flow charts illustrating operations carried out by the peak finder in the low, found and early states, respectively.

If, at step S9 in FIG. 10a the peak finder enters the low state then, at step S11 in FIG. 10b, when the peak finder receives a discrimination value, the peak finder checks at step S13 whether the current discrimination value is greater than the stored maximum and, if so, stores the current value as the maximum at step S14. After step S13 (or step S14 if the answer at step S13 is yes) then, at step S16, the peak finder checks to see whether the discrimination value is still below the threshold and, if so, returns to step S11. If, however, the discrimination value is no longer below the threshold, then the peak finder sets the state as found at step S17.

FIG. 10c shows operations carried out by the peak finder in the found state. Thus, when at step S20 the peak finder receives a discrimination value in the found state, the peak finder checks at step S23 whether the current discrimination value is greater than the stored maximum value and, if so, stores the current value as the new maximum and the Z position of the new maximum at step S24 and returns to step S20. If the answer at step S23 is no, then the peak finder returns to step S11 without storing the current value as the new maximum.

FIG. 10d shows steps carried out by the peak finder in the early state. Thus, when at step S27, the peak finder receives a discrimination value in this state then it checks at step S28 whether the current value is greater than the maximum and, if so, stores current value as the maximum at step S29 and returns to step S27. If, however, the answer at step S28 is no, then the peak finder checks at step S30 if the discrimination value has fallen below the threshold and if so, sets the state as low at step S31. The early state prevents a peak being found, if the signal level is initially above the threshold, until after the intensity value has dropped below the threshold.

When, at step S10, in FIG. 10a, the last discrimination value has been received, then the peak finder will set the peak as the currently stored maximum discrimination value and, in addition, will determine a mean discrimination value by dividing the accumulated discrimination value total by the number of discrimination values.

The discriminator then carries out, for each pixel, a test to determine whether the results of the peak finding procedure can be relied upon or whether the signal-to-noise ratio is too small for the peak finding procedure to be reliable. The test for a pixel is illustrated by the flow chart shown in FIG. 11.

Thus at step S32 the discriminator determines whether the maximum discrimination value is greater than or equal to the mean discrimination value multiplied by a threshold value k, which in this case is 10. If the answer is yes, then, at step S33, the discriminator 42 sets the range of intensity values to be processed by the correlator 44 as a sub-set of the intensity values centred on the frame corresponding to the maximum discrimination value and flags this data in the frame buffer. Typically, the range will be three times the length of the correlator, although it will depend upon the scanning speed. If, however, the answer is no, that is insufficient signal is found by the discriminator 42, then at step S34 the discriminator 42 sets the range of intensity values to be processed by the correlator 44 as the complete range of intensity values stored in the frame buffer 33b for that pixel. Thus, the discriminator ensures that the results of the peak finding procedure for a given pixel are only relied upon if the signal-to-noise ratio is sufficiently good that it can confidently be assumed that the peak finding procedure has correctly located the peak. Otherwise the entirety of the intensity data for that pixel will be passed to the correlator.

When the measurement operation has been completed, then the post processing section 34b can process the results of the discrimination and peak finding procedures carried out during the measurement operation.

The operation carried out by the correlator 44 of the post processing section will now be described with the aid of FIGS. 7, 12 and 13.

Figure 12:
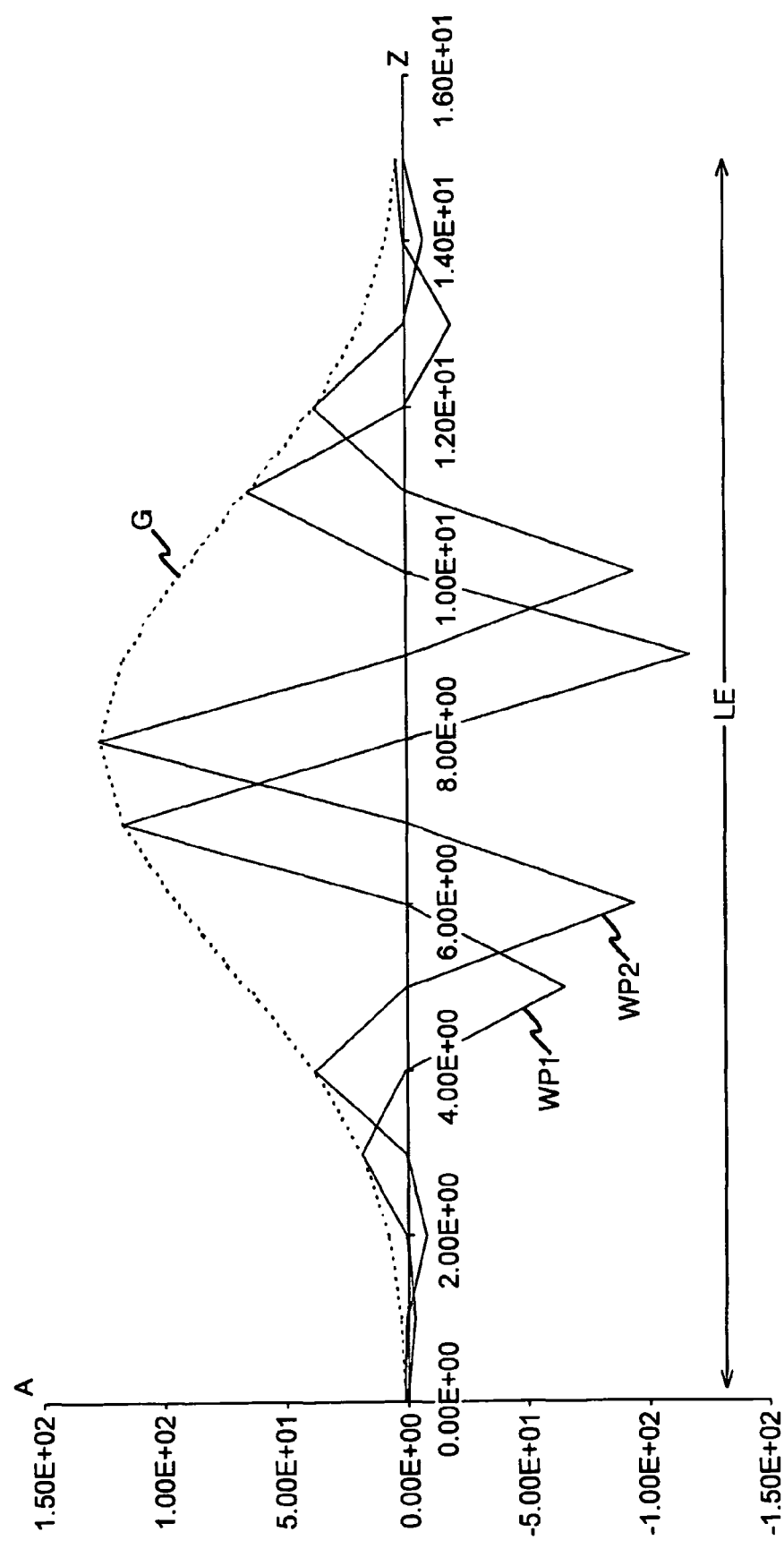
FIG. 12 shows a graphical representation of a correlation function used by a correlator shown in FIG. 7.

FIG. 12 shows a graph of amplitude A against position Z to illustrate the correlation function used by the correlator 44. This correlation function consists of two reference wave packets. The reference wave packets WP1 and WP2 have the functional form of a sine wave and a cosine wave, respectively, having a wavelength equal to the mean wavelength of the broadband source bounded by a Gaussian envelope G (shown in dashed lines) so that the Gaussian envelope is modulated by the cosine and sine waves and the correlation function has a length LE. The shape of the correlation function is equivalent to the Fourier transform for a Gaussian distribution broadband source.

Figure 13:
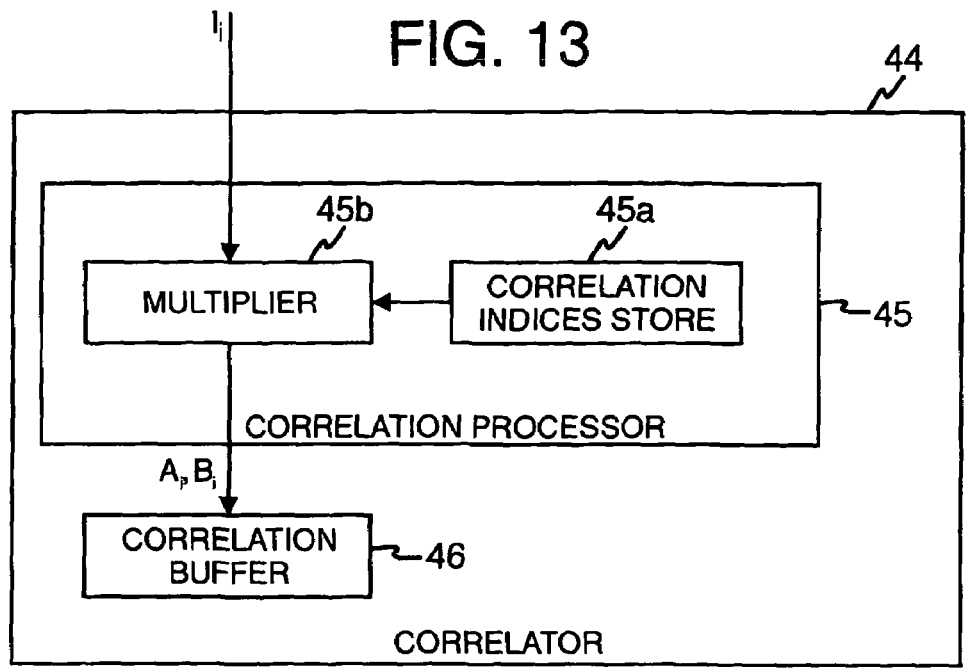
FIG. 13 shows a functional block diagram of the correlator shown in FIG. 7.

FIG. 13 shows a functional block diagram of the correlator 44. The correlation processor 45 includes a correlation indices store 45a which stores the correlation function as an array of pairs of correlation indices $a_i$, $b_i$, where $a_i$ represents the amplitude of the sine wavepacket at a point i along with the Z axis and $b_i$ represents the amplitude of the cosine wavepacket at the point i along the Z axis. The reference wave packets WP1 and WP2 shown in FIG. 12 are thus digitised into a number of pairs of indices. The actual number of pairs of indices will vary with the scanning interval, mean wavelength and spread or bandwidth of the broadband source. Typically, for a scanning interval of $\lambda/4$ (where $\lambda$ is the average wavelength of the broadband source and is typically 0.6 μm (micrometres)), the number of pairs of indices $a_i$, $b_i$ will be sixteen, although with increased computing power a greater number of points may be used.

The correlation processor 45 also includes a multiplier 45b that performs the correlation procedure using the indices in the correlation indices store 45a. In order to perform the correlation, the correlator 44 moves a window having a length equal to the number of pairs of correlation indices of the correlation function progressively through the range of intensity values set for a pixel by the discriminator and, at each position of the window, reads in successive ones of the intensity values $I_i$ within the window and multiplies each different intensity value $I_i$ within the window separately by each of a corresponding pair of coefficients $a_i$, $b_i$, then sums the results to obtain a pair of correlation elements $A_i$, $B_i$ for that position of the window and outputs the resultant correlation elements $A_i$, $B_i$ to the correlation buffer 46 for storage in a memory area or location allocated to that window position. In this embodiment, the window position is determined as the centre of the window.

In this example, the multiplier steps the window one intensity value at a time through the intensity value data for the pixel, repeating the multiplication process at each step until the window reaches the end of the intensity value data for that pixel at which time the correlation buffer will store a pair of correlation elements $A_i$, $B_i$ for each intensity value for the pixel apart from the end intensity values corresponding to half the length of the correlation to which the correlation function cannot be fully applied. At this stage the correlator will have produced and stored in corresponding memory areas in the correlation buffer 46 an array of pairs of correlation elements:

$$A_i = \sum_{j=0}^{j=n-1} I_{i-n/2+j} aj, \quad B_i = \sum_{j=0}^{j=n-1} I_{i-n/2+j} bj \quad (2)$$

where $I_0$ to $I_n$ are the intensity values that fall within the window for the corresponding intensity value and with each pair being associated with a corresponding scan step, that is a corresponding Z position.

As described above, the multiplier step, the window through the data one intensity value at a time. The multiplier may, however, omit some intensity values by using a step size greater than one.

Figure 14:
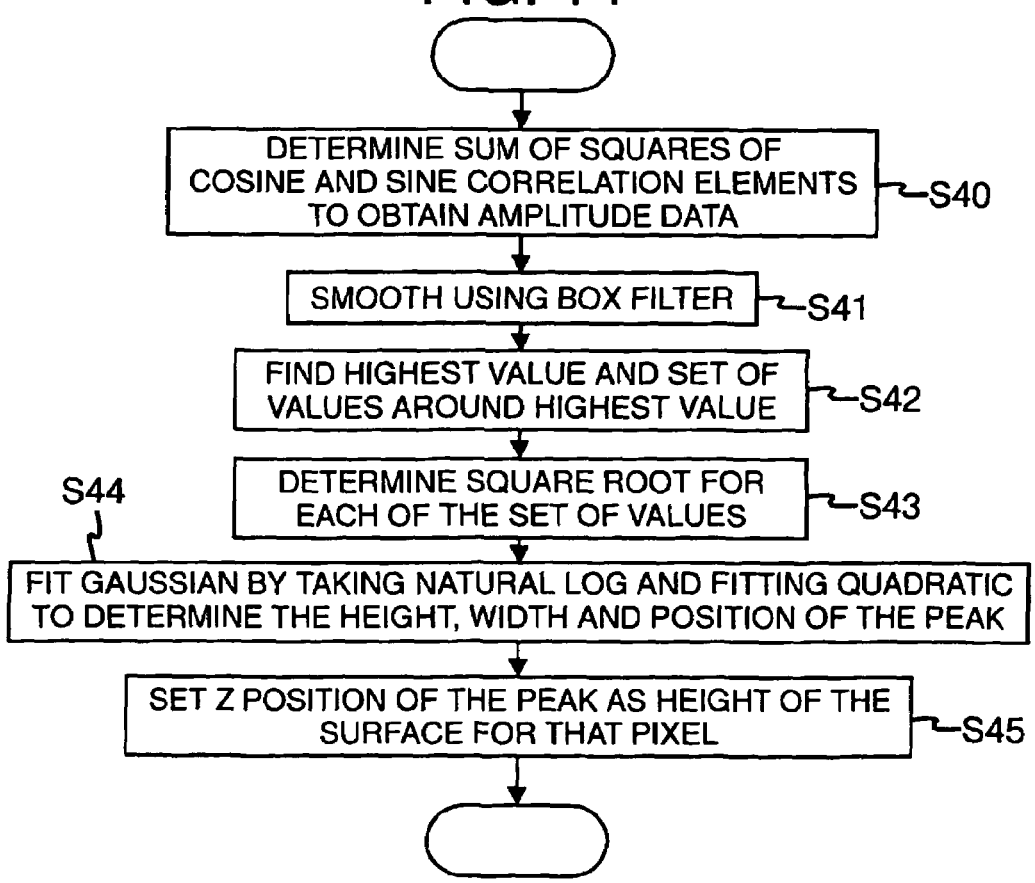
FIG. 14 shows a flow chart for illustrating steps carried out by a surface topography determiner shown in FIG. 7.

FIG. 14 illustrates the steps carried out by the surface topography determiner 35 of the post processing section. Thus when the surface topography determiner 35 is advised, by the correlator 44 that the correlation procedure for the set range of values for a pixel has been completed, then the surface topography determiner 35 determines the sum of squares of cosine and sine wavepacket correlation elements $A_i$ and $B_i$ to obtain squared amplitude data (step S40). At step S40, the surface topography determiner 35 may also accumulate the sum values, then determine the mean of the accumulated sums and compare the mean against a threshold to determine if the signal-to-noise ratio is sufficiently high. If the signal-to-noise ratio is too low then the surface topography determiner causes an indication to be provided to the operator that the measurement operation cannot be completed because the signal-to-noise ratio is too low.

The squared amplitude data may then be smoothed using a box filter at step S41. Then the highest value in the smoothed data is found and a range of values around the highest value selected (step S42).

The square root of each value within the range is then determined at step S43 and, at step S44, the surface topography determiner 35 fits a Gaussian to this data using a least squares fitting procedure by taking the natural logarithm and fitting a quadratic $Ax^2+Bx+C$ to the $\log_e$ values, from which the height, width and position of the peak can be obtained in accordance with the following formulas:

$$\text{Height} = e^{(C-B^2/4A)} \quad (3)$$

$$\text{Width} = \left(\sqrt{\frac{-1}{A}}\right)$$

$$\text{Position} = -\frac{B}{2A}$$

Then, at step S45, the surface topography determiner 35 sets the Z position associated with the amplitude peak as the height of the surface for that pixel.

The procedure described above with reference to FIG. 14 is effected for each pixel within the surface area imaged by the detector 10 in sequence as the correlation procedure is completed for a pixel. The surface topography determiner 35 thus obtains from the correlation element pairs $A_i$, $B_i$ data indicating the relative heights of different surface pixels in the area imaged by the detector. This data is supplied by the surface topography determiner 35 to the controller 21 which may output the topography data to the operator, for example by displaying it on the display as a two-dimensional height map and/or by providing a hard copy printout. The controller and/or the operator may also cause the resulting surface topography data to be supplied as a signal over the communications interface to another computing apparatus or downloaded onto a removable medium. The surface topography data may also be supplied to analysis software such as Taylor Hobson's Talymap software which may be installed on the control apparatus or on another computing apparatus to which the data is supplied as a signal over a network or by being downloaded from a removable medium.

Instead of using the position of the amplitude peak (that is the coherence amplitude data) as the height of the surface for that pixel, the data provided by the correlator may be further processed after step S45 to determine the Z position at which on the basis of the correlation data the phase is zero (that is the correlation phase is zero) and to produce a surface topography representation using the zero correlation phase position. Providing the facility to determine the height information using the correlation phase enables the operator to select the surface topography determination most appropriate for the surface being measured with the use of the coherence amplitude data to define the height being more appropriate for surfaces of relatively high roughness and the use of the correlation phase data to define the height being more appropriate for surfaces of relatively low roughness.

A method by which the surface topography determiner 35 may determine the Z position of zero correlation phase for each surface pixel will now be described with reference to FIG. 15. Thus, after steps S40 to S44 shown in FIG. 14 have been carried out (step S50), then, at step S51, the surface topography determiner 35 calculates the arctangent of the sine and cosine wavepacket correlation values to obtain the correlation phase.

Because of the sinusoidal nature of the intensity distribution, as is well known in the optical interferometry art, all phase measuring techniques deliver the phase to modulus $2\pi$. The absolute value of the phase angle is thus lost and the phase wraps round at each occurrence of $2\pi$. It is therefore necessary to recover the absolute value of the phase angle by unwrapping the correlation phase. In order to do this in the present case, at step S52, the surface topography determiner 35 determines the datum point (cosine/sine wavepacket correlation value) closest to the determined amplitude peak (which may lie between two datum points) and uses this and the correlation phase gradient determined from the scan speed to estimate the zero correlation phase position. Then, at step S53, the surface topography determiner 35 unwraps the correlation phase by using the correlation phase gradient to calculate the expected correlation phase for a datum point (cosine/sine wavepacket correlation value) and then adds or subtracts $2\pi$ to the correlation phase of the datum point until the difference from the expected phase is less than or equal to $\pi$.

Once the correlation phase has been unwrapped, then, at step S54, the surface topography determiner 35 performs a linear fit to the unwrapped correlation phase data, and at step S55 determines the actual zero correlation phase from the zero crossing point of the linear fit.

Then, at step S56, the surface topography determiner 35 sets the height of the surface pixel under consideration as the Z position of the determined zero correlation phase. This procedure is carried out for each of the pixels in the frame data in turn so that the surface topography determiner 35 provides to the controller 21 a two-dimensional zero correlation phase data map representing the surface height variations. The controller 21 may output the data to the operator, for example by displaying it on the display and/or by providing a hard copy printout. The controller and/or the operator may also cause the resulting surface topography data to be supplied as a signal over the communications interface to another computing apparatus or downloaded onto a removable medium. Again, the surface topography data may also be supplied to analysis software such as Taylor Hobson's Talymap software which may be installed on the control apparatus or on another computing apparatus to which the data is supplied as a signal over a network or by being downloaded from a removable medium.

Figure 16:
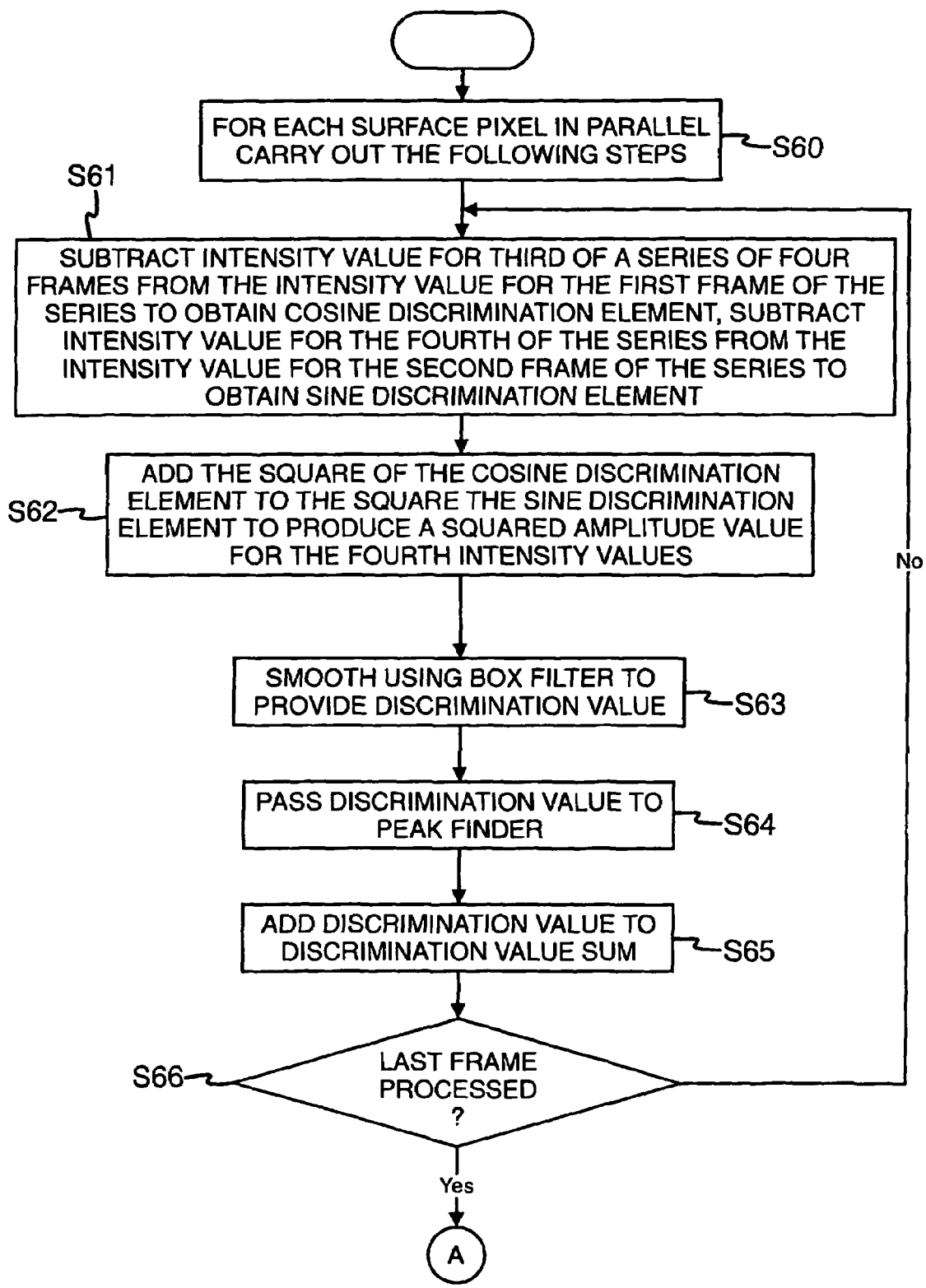
FIG. 16 shows a flow chart for illustrating operation of another example of a discriminator for use in the data processor shown in FIG. 7.

Another form of discriminator that may be used in the correlation determiner 34 shown in FIG. 7 will now be described with the aid of the flow chart shown in FIG. 16.

As can be seen from the graph representing the correlation function in FIG. 12, every other correlation index $a_i$ representing the amplitude of the sine wavepacket and every alternate other index $b_i$ representing the amplitude of the cosine wavepacket is close to zero. Choosing the frame interval (that is the interval between capture of images by the detector) to be an exact integer division of the mean wavelength $\lambda$ of the broadband source causes some of the indices $a_i$, $b_i$ to vanish to zero. In this embodiment, the frame interval is $\lambda/4$ and alternate indices $a_i$ and alternate indices $b_i$ vanish to zero. The same would apply for frame intervals of $\frac{3}{4}\lambda$, $\frac{5}{4}\lambda$ and so on. The fact that these indices vanish to zero means that multiplications for these indices need not be calculated by either the discriminator or the correlator, thereby saving processing time.

The discriminator to be described with reference to FIG. 16 has the form of a simplified correlator which consists of two sets of four indices $c_i$, $d_i$ representing, respectively, one cycle of a simple cosine wave and one cycle of a simple sine wave, wherein the word simple implies that there is no bounding envelope. Thus, the cosine indices will be +1, 0, -1, 0 while the sine indices will be 0, +1, 0, 1.

This discriminator is applied to intensity values in a manner similar to the correlator described above. In principle this would mean multiplying each of a set of four intensity values $i_0$ to $i_3$ by corresponding ones of the cosine indices and summing the results to produce a cosine discrimination element and multiplying each of the intensity values $i_0$ to $i_3$ by each of the sine indices and summing these to produce a sine discrimination element. However, because alternate indices are zero and the remaining indices are + or -1, then, as shown at step S61 in FIG. 16, the cosine discrimination element can be obtained simply by subtracting the third intensity value $i_2$ from the first intensity value $i_0$ of a series of intensity values from four frames for the pixel and the sine discrimination element can be obtained simply by subtracting the fourth intensity value $i_3$ from the second intensity value $i_1$.

Then, at step S62 the square of the cosine discrimination element is added to the square of the sine discrimination element to produce a squared amplitude value for the four intensity values. The square of amplitude values may be smoothed over five values using a box filter at step S63 and the smoothed value then passed to the peak finder at step S64 as the discrimination value. Then, at step S65, the discrimination value will be added to the discrimination value sum as described above with reference to FIG. 9 and steps S61 to S65 repeated until, at step S66, the discriminator determines that the last frame has been processed in which case the discriminator will proceed to carry out the steps shown in FIG. 11.

In this discriminator, the pairs of cosine and sine discrimination elements and the length of the discriminator (that is the length comparable to the length LE of the correlator shown in FIG. 12) can be adjusted simply by adding and squaring the cosine discrimination elements, adding and squaring the sine discrimination elements and summing the two. Thus, for example, the length of the discriminator may be increased from four intensity values to eight intensity values by producing the squared amplitude of value SA as follows:

$$SA = (\cos_1 + \cos_2)^2 + (\sin_1 + \sin_2)^2$$

where $\cos_1$ and $\cos_2$ are the cosine discrimination elements for the two successive sets of four intensity values and $\sin_1$ and $\sin_2$ are the sine discrimination elements for the two successive sets of four intensity values.

Thus, by storing pairs of cosine and sine discrimination elements for sets of four intensity values, longer discrimination length can easily be calculated to improve the discrimination of the frequency of interest. Also, such pairs can easily be added or subtracted to the box filter as required. To save required memory space, the cosine and sine discrimination element pairs may be stored in a circular buffer of the discriminator or the circular buffer of the correlator.

Figure 16A:
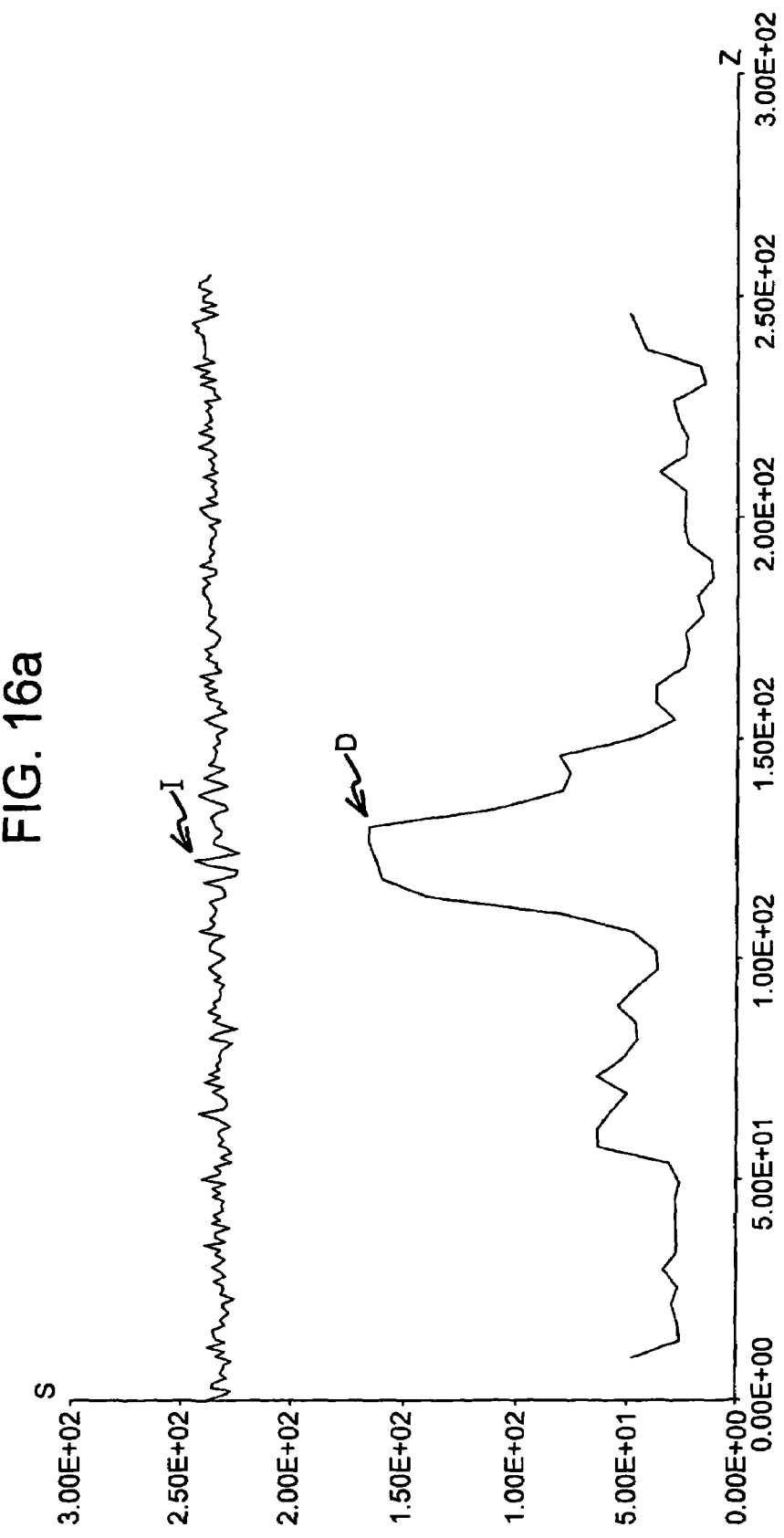
FIG. 16a shows a graph illustrating results obtained using the discriminator described with reference to FIG. 16.

FIG. 16a shows a graph of signal S against position Z illustrating the intensity values I and the corresponding signal D produced by this discriminator to illustrate that the discriminator can identify the coherence peak in low signal level data.

In the data processor shown in FIG. 7 and described above, discrimination and peak finding procedures are carried out on-the-fly, that is as the measurement operation is proceeding, and correlation is carried out as a post-processing procedure, that is after the measurement operation has been completed.

FIG. 17a shows a block diagram of another example of a data processor 320 that may be used in the surface profiling apparatus. As can be seen from a comparison of FIGS. 7 and 17a, the data receiver 33 is the same as show in FIG. 7 and the correlation determiner 340 again has a concurrent processing section and a post processing section. These differ from those shown in FIG. 7. Thus, in FIG. 17a, the concurrent processing section consists of a correlator 440. The correlator 440 has a correlation processor 450 with a multiplier 450b and a correlation indices store 450a. The correlator 440 also includes a correlation buffer 460 and a correlation buffer status register 461. The concurrent processing section 340 also includes a peak finder 430 and a copy buffer 470 while the post processing section consists simply of the topography determiner 350. Thus, in this example the discrimination is omitted and the correlation is itself carried out on-the-fly.

The correlator 440 operates in a somewhat different manner from that described above. Thus, although the correlator 440 again steps through the intensity value data and performs a correlation procedure on the intensity data to determine the pair of correlation elements $A_i$, $B_i$ for each intensity value $I_i$, the correlator 440 carries out the correlation procedure in parallel for different pixels rather than sequentially as described above and the manner in which the correlation is carried out is somewhat different. This will now be described with the assistance of FIGS. 17b and 18a to 18g.

FIG. 17b shows a diagrammatic representation of the correlation buffer 460. As shown in FIG. 17b, the correlation buffer 460 is divided into a number of sections one for each pixel (P1 to P9 are shown). Each section consists of an array of memory locations MO to MN with each memory location being arranged to store a corresponding pair of correlation elements $A_i$, $B_i$.

To reduce the amount of memory required to provide the correlation buffer 460, a circular buffer is used wherein, as is known is the art, the oldest entry is overwritten once the buffer becomes full. The size of the correlation buffer 460 is chosen such that data should not be overwritten before a correlation procedure requiring that data has been completed and, in this example, the correlation buffer provides memory locations for 43 pairs of correlation elements, per pixel. The copy buffer for each pixel may be in a part of memory adjacent the corresponding correlation buffer.

The status register 461 indicates the status of each memory location within the circular correlation buffer 460. Examples of status indicators are: "E" for empty, "F" for filling, "D" for done when that memory location stores the corresponding pair of correlation values $A_i$, $B_i$ and W for overwritten to indicate that the data has been overwritten before the correlation procedure requiring the data in that memory location has been completed.

FIGS. 18a to 18f show diagrammatic representations of part of a portion of the circular correlation buffer 460 allocated to one pixel to illustrate how the correlation procedure is carried out for a pixel. Although the processes for the two indices of a pair of correlation indices are carried out in parallel, for simplicity FIGS. 18a to 18f show the process for only one, $a_i$, of the two indices of each pair. Also, again for simplicity, the part of the array shown is represented as memory locations numbered from $M_{n/4-3}$ onwards and the intensity values being processed are represented as intensity values $I_n$ onwards.

Figure 18A:
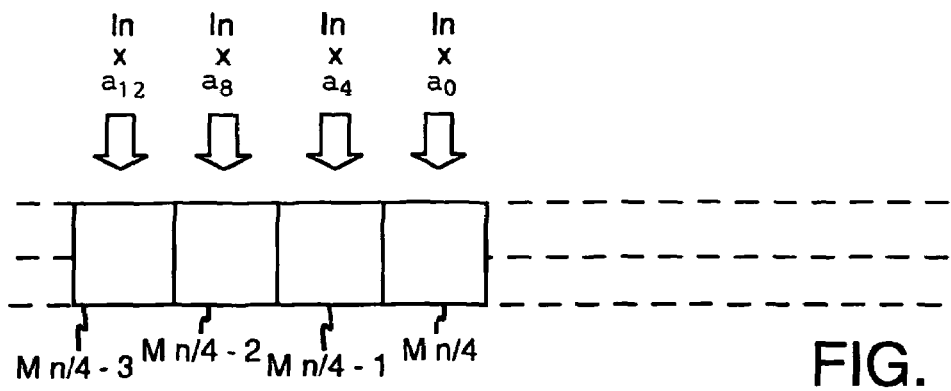
Figure 18B:
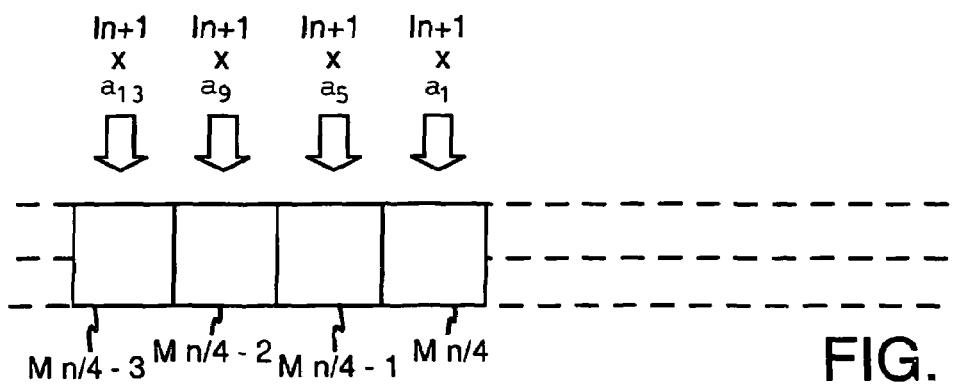

In this example, the correlation indices are stored in the correlation indices store 450a (FIG. 17a) as four groups:

Group 0: $a_0$, $a_4$, $a_8$, $a_{12}$; $b_0$, $b_4$, $b_8$, $b_{12}$
Group 1: $a_1$, $a_5$, $a_9$, $a_{13}$; $b_1$, $b_5$, $b_9$, $b_{13}$
Group 2: $a_2$, $a_6$, $a_{10}$, $a_{14}$; $b_2$, $b_6$, $b_{10}$, $b_{14}$
Group 3: $a_3$, $a_7$, $a_{11}$, $a_{15}$; $b_3$, $b_7$, $b_{11}$, $b_{15}$ As shown in FIG. 18a, when an intensity value $I_n$ is received by the correlator, the multiplier 450b multiplies it by each of the indices $a_0$, $a_4$, $a_8$, $a_{12}$ of Group 0 and adds each result to a corresponding memory location $M_{n/4-3}$, $M_{n/4-2}$, $M_{n/4-1}$, $M_{n/4}$. When the next intensity value $I_{n+1}$ is received the multiplier multiplies it by each of the indices $a_1$, $a_5$, $a_9$, $a_{13}$ of Group 1 and accumulates or adds each result to the corresponding memory location $M_{n/4-3}$, $M_{n/4-2}$, $M_{n/4-1}$, $M_{n/4}$ as shown in FIG. 18b.

Figure 18C:
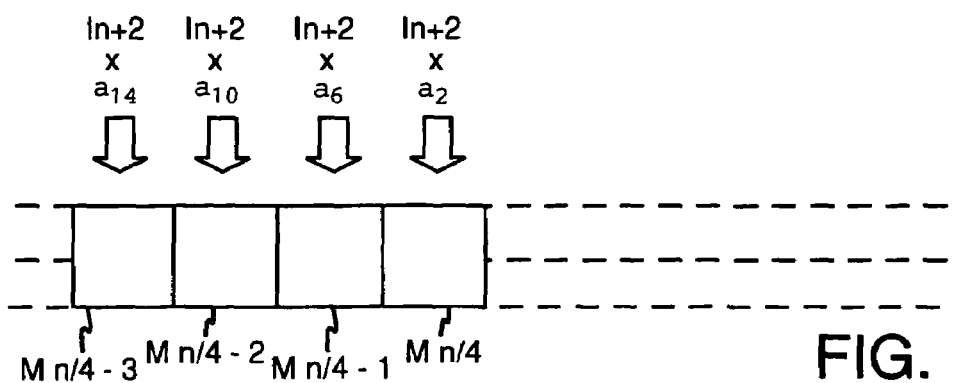
Figure 18D:
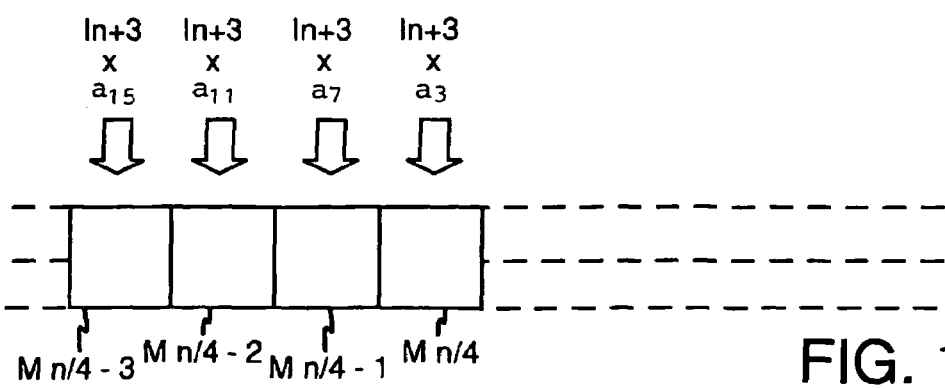

When the next intensity value $I_{n+2}$ is received the multiplier multiplies it by each of the indices $a_2$, $a_6$, $a_{10}$, $a_{14}$ of Group 2 and accumulates or adds each result to the corresponding memory location $M_{n/4-3}$, $M_{n/4-2}$, $M_{n/4-1}$, $M_{n/4}$ as shown in FIG. 18c. When the next intensity value $I_{n+3}$ is received the multiplier multiplies it by each of the indices $a_3$, $a_7$, $a_{11}$, $a_{15}$ of Group 3 and accumulates or adds each result to the corresponding memory location $M_{n/4-3}$, $M_{n/4-2}$, $M_{n/4-1}$, $M_{n/4}$ as shown in FIG. 18d.

Figure 18E:
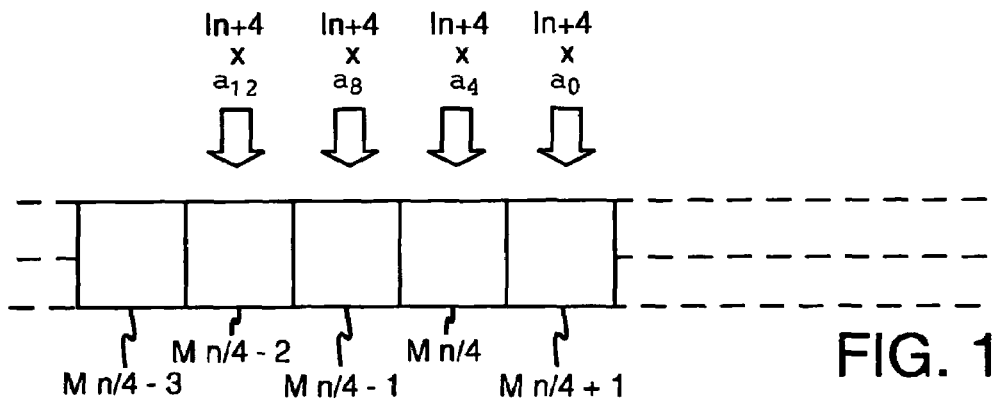

Then, as shown in FIG. 18e, the correlator moves along one memory location, resets the content of memory location $M_{n/4+1}$ to zero and when the next intensity value $I_{n+4}$ is received the multiplier multiplies it by each of the indices $a_0$, $a_4$, $a_8$, $a_{12}$ of Group 0 and adds each result to a corresponding memory location $M_{n/4+1}$ to $M_{n/4-2}$.

Although not shown, when the next intensity value $I_{n+5}$ is received, the multiplier 450b multiplies it by each of the indices $a_1$, $a_5$, $a_9$, $a_{13}$ of Group 1 and accumulates or adds each result to the corresponding memory location $M_{n/4+1}$ to $M_{n/4-2}$, when the next intensity value $I_{n+6}$ is received the multiplier multiplies it by each of the indices $a_2$, $a_6$, $a_{10}$, $a_{14}$ of Group 2 and accumulates or adds each result to the corresponding memory location $M_{n/4+1}$ to $M_{n/4-2}$ and when the next intensity value $I_{n+7}$ is received the multiplier multiplies it by each of the indices $a_3$, $a_7$, $a_{11}$, $a_{15}$ of Group 3 and accumulates or adds each result to the corresponding memory location $M_{n/4+1}$ to $M_{n/4-2}$.

Figure 18F:
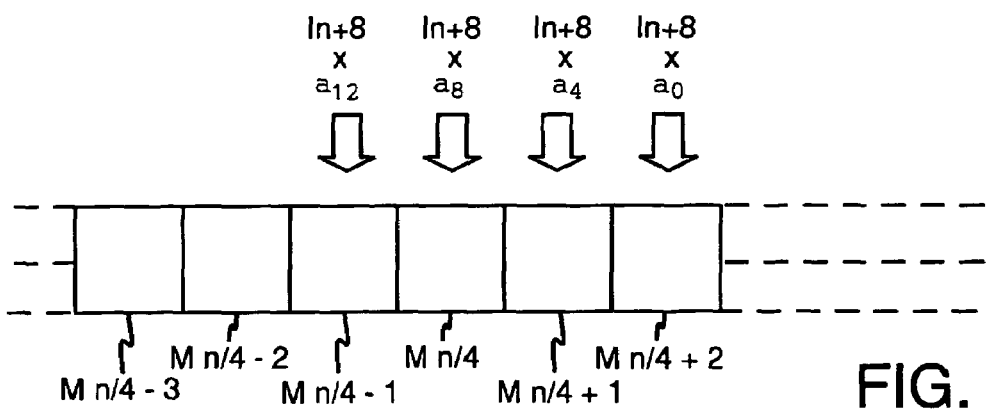

Then, as shown in FIG. 18f, the correlator moves along one memory location, resets the content of memory location $M_{n/4+2}$ to zero and, when the next intensity value $I_{n+8}$ is received, by the correlator, the multiplier 450b multiplies it by each of the indices $a_0$, $a_4$, $a_8$, $a_{12}$ of Group 0 and adds each result to a corresponding memory location $M_{n/4+2}$ to $M_{n/4-1}$.

Although the above refers only to one index of each pair of indices, it will be appreciated that the same multiplication process is carried out in parallel for the indices $b_0$ to $b_{15}$.

This procedure continues as intensity values are received with the group of indices used for the multiplication being changed each time a new intensity value is received (so that Groups 0, 1, 2, and 3 are used in sequence) and with the memory locations being advanced by one after receipt of every fourth intensity value. As the process proceeds successive memory locations (ignoring the first and last eight memory location (that is half the correlator length at each end)) will become filled with corresponding correlation elements $A_i$, $B_i$ having the form set out in equation (2) above for every fourth received intensity value $I_n$, $I_{n+4}$, $I_{n+8}$, .... The correlation is thus effected only for every fourth intensity value.

Figure 18G:
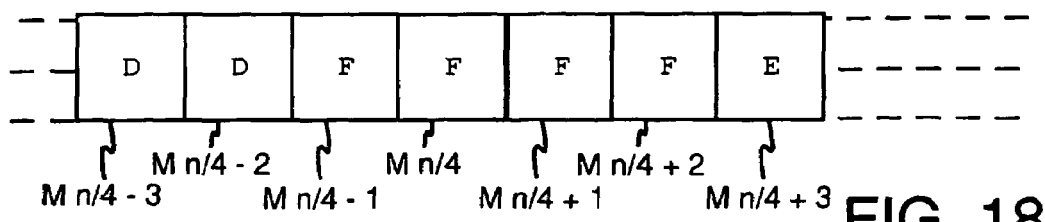

The status of a memory location in the correlation buffer status register 461 changes from "E" or empty to "F" or filling when the value obtained by multiplying a value by a first coefficient is stored in that memory location and from "F" to "D" or done when that memory location stores the corresponding pair of correlation elements $A_i$, $B_i$. FIG. 18g shows entries in the correlation buffer status register 461 after 18f. FIG. 18g shows that the memory locations $M_{n/4-3}$, $M_{n/4-2}$, are done ("D"), the memory locations $M_{n/4-1}$, $M_{n/4}$, $M_{n/4+1}$, $M_{n/4+2}$ are being filled ("F") and are not ready and the memory location $M_{n/4+3}$ is empty ("E"). When a memory location for a pixel becomes filled, then that memory locations will have the status "D", that is done or filled.

This correlation procedure has the advantage that it is not necessary to access intensity values more than once because all calculations requiring a particular intensity value are carried out at the same time, so facilitating correlation as the intensity values are received, that is correlation on-the-fly.

Changing the status of a memory location with status done ("D") in the correlation buffer status register 461 causes the peak finder 430 to use the correlation elements in that memory location in a peak finding procedure to determine the coherence peak as will now be described with reference to FIGS. 19a to 19f.

The peak finder 430 operates on the pair of correlation elements stored at a particular memory location when the correlation procedure has been completed for a number, in this case two, of memory locations ahead of that memory location. The peak finder 430 operates in a manner similar to the peak finder 43 discussed above in that it has a number of states. These states differ somewhat from those of the peak finder 43.

Thus, the peak finder 430 has an initial state that exists, for a given surface pixel, for a first amplitude value derived from a first pair of correlation elements, a low state that exists before the amplitude value rises above a threshold value, a rising state that exists when the amplitude value is rising, a falling state that exists when the amplitude value is falling, a found state that exists after the amplitude value falls to a fraction of the maximum, a saturated state that exists if the light level is too high and so the discrimination value is out-of-range, that exists if a maximum detected value is above the permissible highest maximum and an early state that exists if the amplitude value starts above the threshold. In addition, the peak finder has a late state that exists where the correlation buffer is a circular buffer and peak data has been overwritten.

FIG. 19a shows the overall operation of the peak finder 430. As set out at step S70, the peak finder carries out the peak finding procedure for the correlation element data for each surface pixel in parallel. Steps S71 to S74 show the steps carried out for each pixel in parallel. When, at step S71, the peak finder 430 determines that the status of a memory location is done, that is the pair of correlation elements have been calculated, then the peak finder determines the sum of squares combination of the correlation elements to obtain an amplitude value and at step S72 sets the state as initial and sets the current amplitude value as the current maximum. As will be appreciated this amplitude value is actually a squared amplitude value.

Then at step S73, the peak finder 430 sets the state as low if the amplitude value is below a threshold or as early if the amplitude value is equal to or greater than the threshold. As indicated by step S74 the peak finder continues to check the amplitude data in accordance with the status by, each time, the status of a memory location becomes "done", determining the sum of squares combination of the pair of correlation elements to obtain an amplitude value and checking the amplitude value in accordance with the set state until all amplitude values for a pixel have been checked.

Figure 19C:
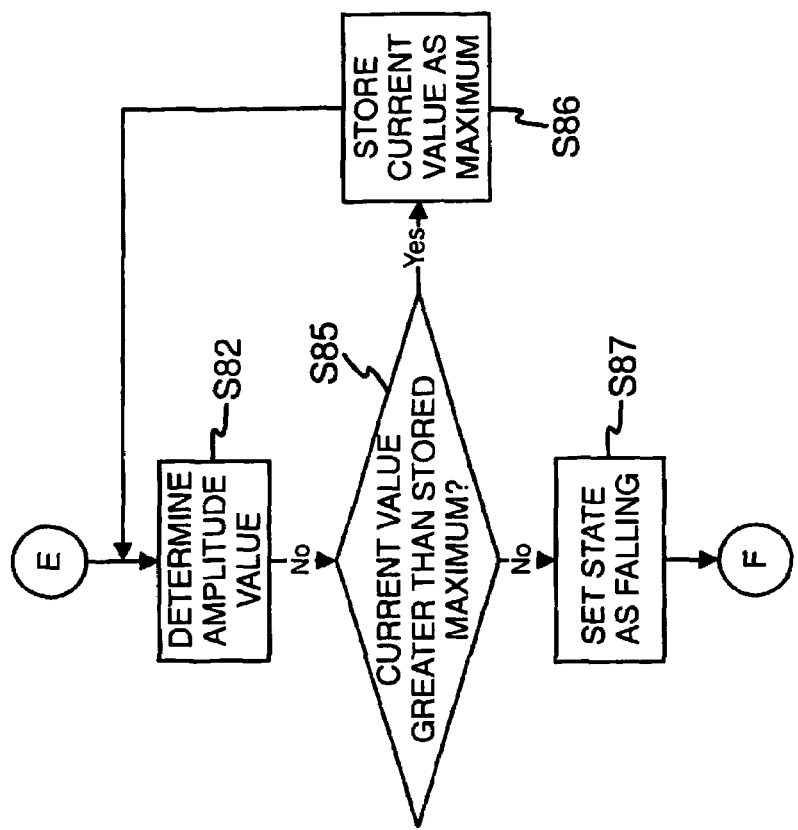
Figure 19B:
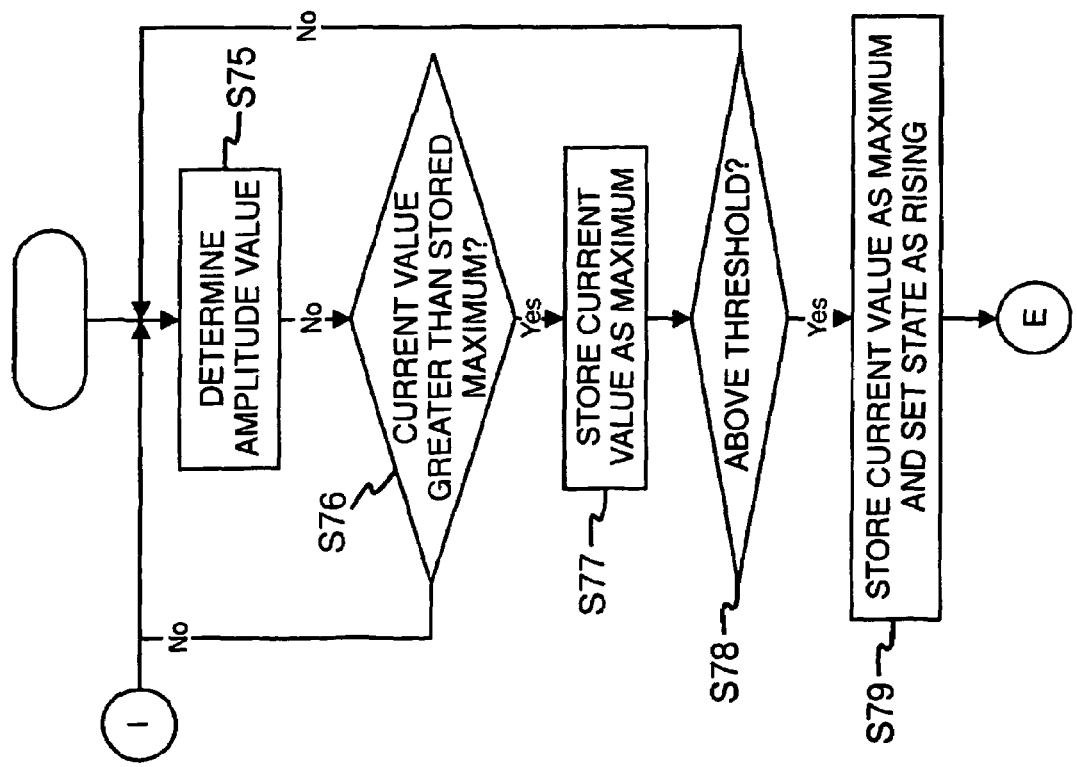

FIG. 19b shows the steps carried out by the peak finder when the current state is low. Thus, at step S75, the peak finder determines the amplitude value as set out in step S71 in FIG. 19a. Then, the peak finder checks at step S76 whether the current value is greater than the stored maximum and, if not, returns to step S75. If the answer at step S76 is yes, then the peak finder stores, at step S77, the current value as the maximum. Then the peak finder checks at step S78 if the current value is above the threshold and, if so, sets the state as rising at step S78. If the current value is not above the threshold, then the peak finder returns to step S75.

FIG. 19c shows steps carried out by the peak finder when the state is set at rising at step S81 in FIG. 19b.

Step S82 in FIG. 19c corresponds to step S75 in FIG. 19b. However, in this case, the peak finder checks at step S85 whether the current value is greater than the stored maximum and if the answer is yes, stores the current value as the maximum at step S86 and returns to step S82. If, however, the answer at step S85 is no, then at step S87, the peak finder 430 sets the state as falling.

Figure 19D:
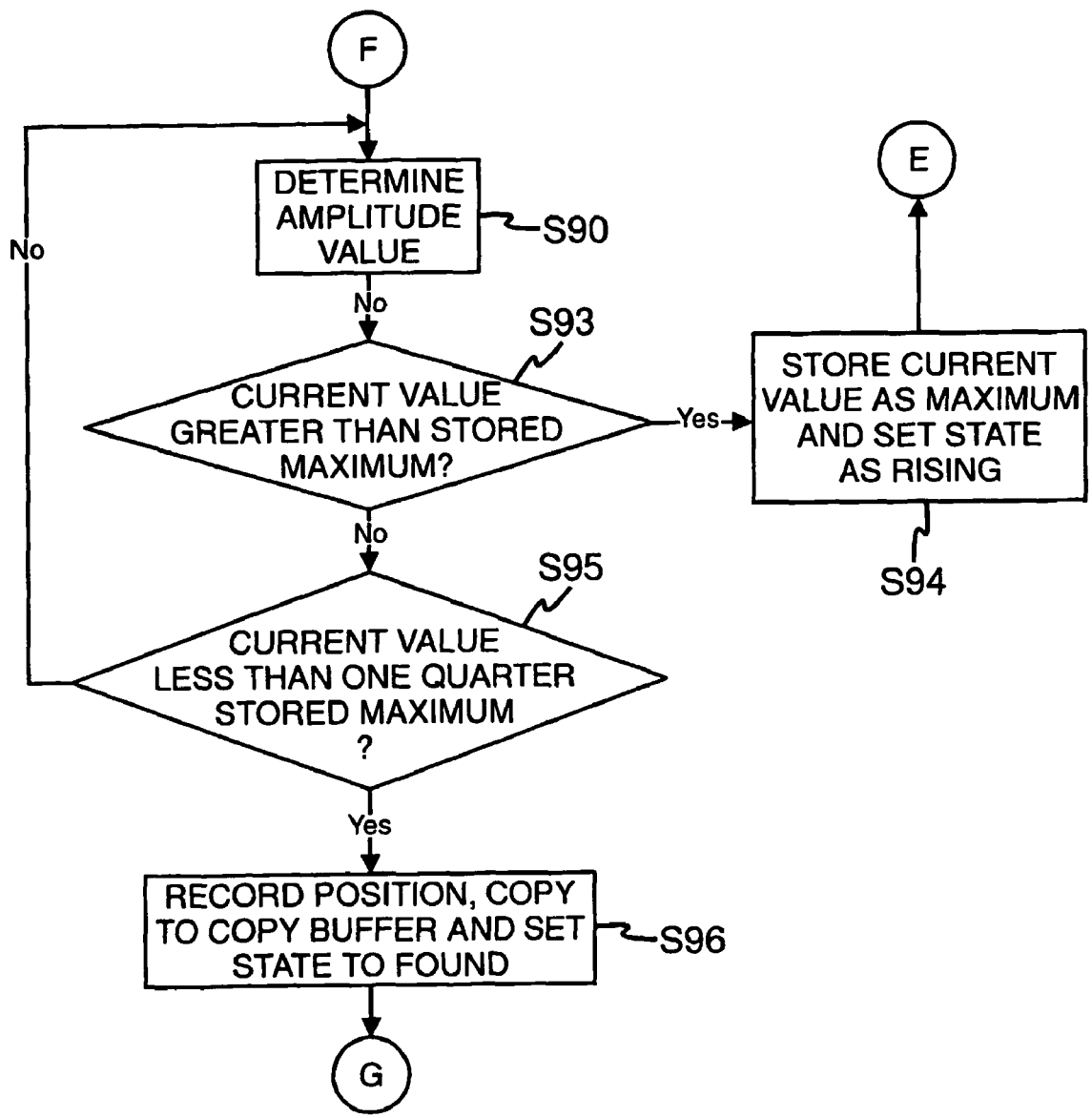

FIG. 19d shows steps carried out by the peak finder when the state is set as falling. Step S90 corresponds to step S75 in FIG. 19b. In this case, the peak finder checks at step S93 whether the current value is greater than the stored maximum and, if so, stores the current value as the maximum at step S94 and sets the state as rising. If, however, the answer at step S93 is no, then the peak finder checks at step S95 whether the current amplitude is less than one quarter of the stored maximum. If the answer is no, the peak finder 430 returns to step S90. If, however, the answer is yes, then this provides a peak trigger to the peak finder. Thus, the peak finder 430 determines that a peak has been found and, at step S96, records the Z position determined by the Z logger and copies a range of correlation elements encompassing the position of the determined peak to corresponding memory locations in the copy buffer 470. The peak finder 430 also sets the state as found at step S96.

Figure 19F:
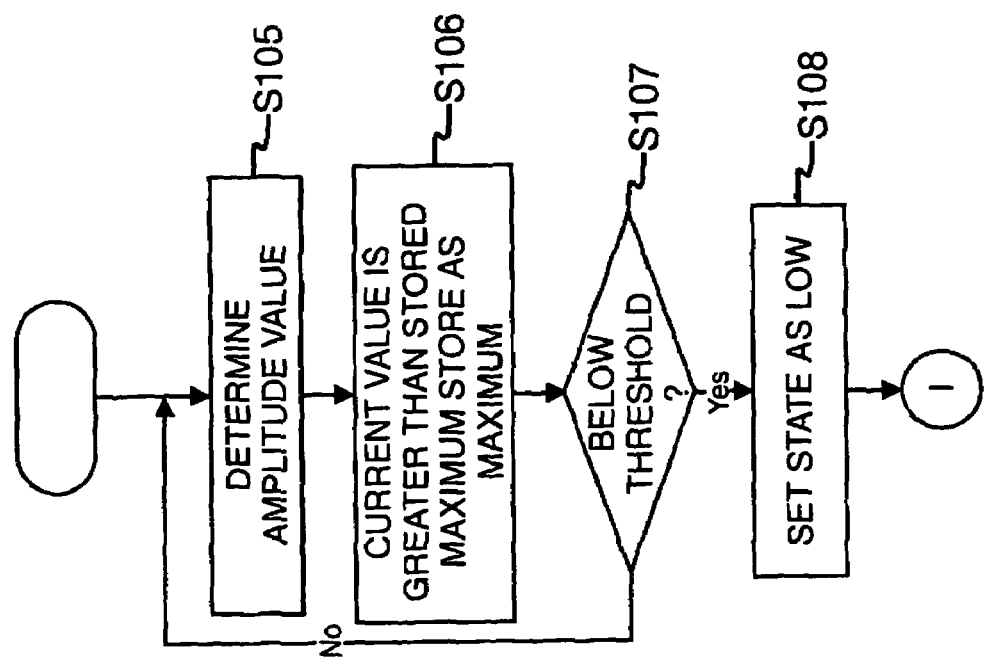
Figure 19E:
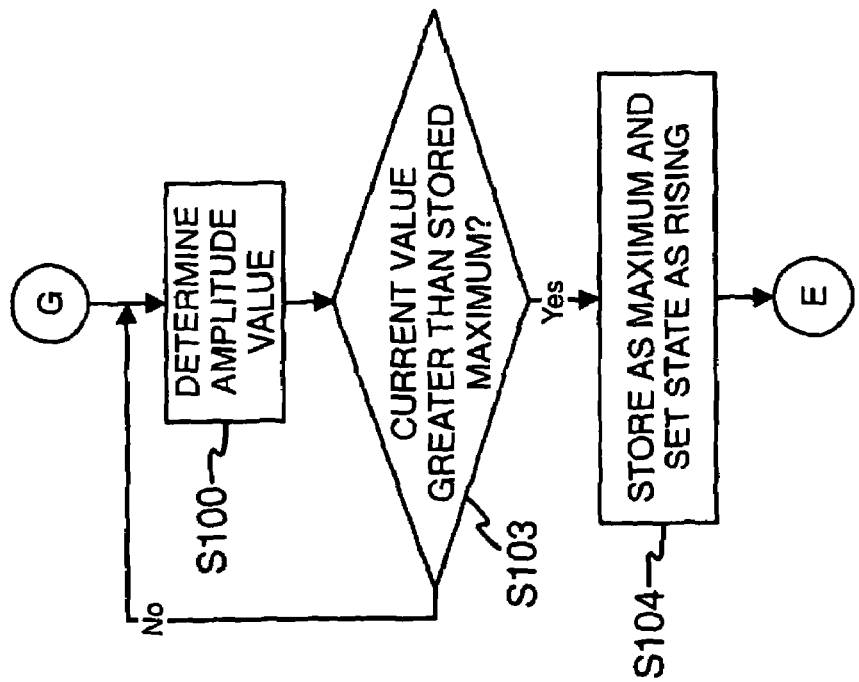

FIG. 19e shows steps carried out by the peak finder when the state is set as found. Step S100 corresponds to step S75 in FIG. 19b. At step S103, the peak finder 430 checks whether the current value is greater than the stored maximum and, if not, returns to step S100. If, however, the answer is yes, then the peak finder determines that the currently identified peak may not be the correct peak, stores the current value as the maximum and sets the state as rising at step S104.

FIG. 19f shows steps carried out by the peak finder 430 when the state is set at early at step S73 in FIG. 19a. At step S105, the peak finder 430 again determines the amplitude value for a pair of correlation elements and then at step S106 checks whether the current value is greater than the currently stored maximum and, if so, stores the current value as the maximum at step S106. Then at step S107, the peak finder checks whether the current amplitude value is below the threshold and, if not, returns to step S105. If, however, the answer at step S107 is yes, then, at step S108, the peak finder 430 sets the state as low and, when the next pair of correlation elements is ready for that pixel, returns to step S75 in FIG. 19b.

Thus, as explained above with reference to FIG. 19d each time the current amplitude value falls to less than, in this example, one quarter of the stored maximum, the peak finder determines that a peak has been found and copies a range of correlation elements including the correlation elements corresponding to the position of the peak to corresponding memory locations in the copy buffer 470. In this example, the range of pairs of correlation elements extends from thirteen before to two after the pair of correlation elements corresponding to the position of the peak trigger (as described at step S95 in FIG. 19d). The data in the copy buffer may be overwritten if, after correlation elements have been copied to the copy buffer, the peak finder subsequently finds a higher peak.

Although not shown, the copy buffer 470 is also divided into a number of sections one for each pixel. Each section again consists of an array of pairs of memory locations with each pair of locations being provided to store a corresponding pair of correlation elements $A_i$, $B_i$ with in this case the number of pairs of memory locations per pixel being equal to four times the correlation function length (which again is sixteen).

At the end of the measurement procedure, the copy buffer 470 should contain, for each surface pixel, the sub-range of correlation elements containing the coherence peak. The post processing can then be carried out by surface topography determiner 350 as will be explained below so that the correlation data for each pixel in turn is processed and the surface profile or topography obtained and supplied to the operator or another piece of software as described above.

The post-processing by the surface topography determiner can be carried out once the peak finder has completed the peak finding procedure. The surface topography determination may be commenced immediately or the data stored for subsequent processing. In this embodiment, the steps carried out by the surface topography determiner corresponds to steps S40 to S45 described above with reference to FIG. 14 or steps S50 to S56 described above with reference to FIG. 15.

FIGS. 20a to 20f are graphs of signal strength S against position Z with graphs 20a and 20b showing results obtained using the data processor shown in FIG. 7 with the discriminator operating as explained with reference to FIG. 16 and with FIG. 20a showing determination of the Z position of the peak and 20b determining the Z position of zero correlation phase.

In FIG. 20a line 200 represents the intensity values provided by the detector, lines 201 and 202 represent the sine and cosine wavepacket correlation elements $A_i$, $B_i$, dashed line 203 represents the amplitude determined from the correlation elements and line 204 represents the Gaussian fitted to the amplitude data. In FIG. 20b lines 200, 201 and 202 again represent the intensity values and the sine and cosine wavepacket correlation elements while dashed line 205 represents the unwrapped correlation phase and line 206 represents the results of the linear fitting procedure carried out at step S54 in FIG. 15 and shows the position of zero correlation phase as the zero crossing point on the Z axis.

FIGS. 20c and 20d shows results obtained using the data processor shown in FIGS. 17a and 17b with FIG. 20c showing determination of the Z position of the peak and FIG. 20 showing determination of the zero correlation phase position. In FIG. 20c, line 200a represents the intensity values, lines 201a and 202a represent the sine and cosine wavepacket correlation elements, dashed line 203a represents the amplitude values derived from the sine and cosine wavepacket correlation elements and line 204a represents the Gaussian fitted to the amplitude values. In FIG. 20d, lines 200a, 201a and 202a again represent the intensity values and sine and cosine wavepacket correlation elements, dashed line 205a represents the unwrapped correlation phase and line 206a represents the result of the linear fitting procedure showing determination of the Z position of zero correlation phase, that is the zero crossing point on the Z axis.

FIGS. 20e and 20f show the results of carrying out the processing described above with reference to FIGS. 17a to 19f (that is concurrent correlation) across a 100 nanometre grating where the X axis in FIGS. 20e and 20f represents the direction perpendicular to the grating lines. FIG. 20e shows the results obtained where the surface height is set as the Z position of the peak while FIG. 20f shows the results obtained where the surface height is set as the Z position of the actual zero correlation phase. In addition to showing the grating steps, FIGS. 20e and 20f show a slight overall tilt in the grating surface.

In the embodiment described with reference to FIG. 6, a specially designed piezoelectric Z mover is used. As another possibility, a commercially available Z mover may be used. Also a motor may be used.

In the above described embodiments, the Z mover 15 is driven at a largely constant rate either with a servo control or open loop with respect to the Z position sensor 15a. The Z position sensor 15a feeds the scan position to the trigger generator 60 and, each time a predetermined interval has been covered, the trigger generator produces a trigger for the detector 10. The detector must be capable of external asynchronous trigger. In this manner, images are taken at a constant position interval based only on the Z position sensor 15a and trigger generator 60 and not on the errors in the servo-control or largely constant scan speed. This is especially useful where the Z mover is a motor but can also be used where the Z mover is a piezo-electric mover.

As another possibility, the Z mover 15 may be servo-controlled with respect to the Z position sensor 15a and a series of command positions sent to the servo-controller at the desired frame interval so that the Z mover steps between the positions. The detector 10 can then be triggered by a time-based trigger generator and at a constant time interval. The scan then steps in between the exposure times of the detector. This is useful where the Z mover is a piezo-electric mover.

In the above described embodiments, it is assumed that the a real pixel resolution (that is effectively the sensing element pitch of the detector 10) is the same as the number of resolvable positions that can pass through the objective lens 14. However, often in interferometry, the a real pixel resolution of the camera or detector is not as great as the number of resolvable positions that can pass through the objective lens. Therefore, in order to cover the range from maximum field of view to maximum lateral resolution, a zoom lens or the option of extra lenses may be provided to enable the image to be magnified or reduced. As another possibility, the detector 10 may comprise a camera that has a larger a real pixel resolution than will normally be required and a smaller a real pixel resolution can then be achieved by taking only selected pixels, for example every other pixel, or by adding together the intensity data acquired by groups of adjacent pixels thus forming "super pixels". These super pixels may consist of, for example, 2×2, 4×4 or 8×8 square arrays of individual sensing elements. Also, a smaller a real pixel resolution may be achieved by selecting the sensing elements of only a portion of the overall array. These approaches enable the same a real pixel resolution to cover different fields of view and lateral resolutions, so providing an electronic zoom function.

A disadvantage of using a detector comprising a large a real pixel resolution camera is that the frame readout rate is reduced, typically proportionally to the number of lines of sensing elements, that is number of lines in the image. However, the detector may comprise a commercially available CCD camera such as the Vosskühler GmbH:CCD 1300B CCD camera having a vertical binning function in which groups of pixels over a number of lines are added together reducing the number of lines that need to be read and therefore increasing the read out rate and/or having a partial scanning function in which only some of the lines in the frame are read out, again increasing the read out rate. Both of functions enable electronic zoom to be achieved with high readout rates. The zoom function of the digital camera may also be used to zoom in or out to different areas of the field of view.

In the above described embodiments, the correlation function has a Gaussian envelope. Other peaked envelope forms such as a Lorentzian may be used. It is, however, desirable for the envelope used to be a smoothly varying function.

The discriminator 42 described with reference to FIG. 7 may carry out a correlation procedure in a similar manner to the correlator 440 shown in FIG. 16, but at a coarser scale, that is with the reference wave packets of the correlation function being digitized as a smaller number of points, for example, 4 points for each reference function. Also, such a discriminator may use an interval larger or smaller than four between the intensity values for which the correlation procedure is carried out. Also the concurrent correlator described with reference to FIGS. 17a and 17b may use an interval other than four. The correlators described above may, like the discriminator described with reference to FIG. 16, be configured not to carry out the multiplication steps where the indices $a_i$, $b_i$ are zero or substantially zero.

It may also be possible to use a discriminator that simply looks for the highest intensity value in the intensity value data for a pixel.

In the embodiments where correlation is a post processing procedure, then other methods of carrying out the correlation than that described may be used. For example, each set of intensity values may be multiplied by each index $a_i$ (and each index $b_i$) in turn and the sums or accumulated values stored in the corresponding memory locations before the next set of intensity values is processed by the correlator 44. As another possibility, the correlation procedure described above with reference to FIGS. 18a to 18g may be used.

In the embodiments described with reference to FIG. 14, the data for each surface pixel is processed in sequence by the correlator and the surface topographer. As another possibility, the correlator 44 may repeat the above process for each pixel in turn so that, at the end of the correlation process, the correlation buffer 46 stores, for each pixel, a corresponding array of pairs of correlation elements with each pair being associated with a corresponding scan step, that is a corresponding Z position logged by the Z logger and the surface topography determiner may then determine the surface topography.

A different frame interval for the correlation procedure than described above may be used with the frame interval being increased to speed up processing or reduced to increase accuracy. The frame interval may be selectable by the operator. As described in the paper entitled: "Three-Dimensional Imaging by Sub-Nyquist Sampling of White-Light Interferograms" by Peter de Groot and Leslie Deck published in Optics Letters Volume 18, No. 17, Sep. 1, 1993 at pages 1462 to 1464, under sampling or sub-Nyquist sampling may be used for increased speed, that is the frame interval may be greater than the mean wavelength. In this case, the bandwidth of the broadband source may be reduced to attain an interference signature similar to that described above so that the Gaussian fit remains appropriate. As examples of frame intervals that may be used are $n\lambda \pm \lambda_{/4}$ for example $\lambda_{/4}$, $3/4\lambda$, $5/4\lambda$, $n\lambda \pm \lambda_{/3}$ for example $\lambda_{/3}$, $n\lambda \pm \lambda_{/5}$, for example $\lambda_{/5}$.

If processing power is a consideration and speed is not an issue, then at any one or more point where data for different pixels is processed in parallel in the embodiments described above, that data may instead be processed serially for each pixel in turn. Alternatively, if processing power is not a consideration and speed is an issue, then at any one or more point where data for different pixels is processed in series in the embodiments described above, that data may instead be processed in parallel.

In the embodiments described above, the frame buffer stores all of the frames of data acquired during a measurement operation. This does, however, require a considerable amount of memory, especially if a relatively large number of frames of intensity data are to be processed and the number of pixels per frame is high, for example 1024 by 1024. In the embodiment described with reference to FIGS. 17a and 17b where the correlation is carried out concurrently, the frame buffer may be a circular buffer, so reducing the size of buffer required.

A circular buffer may also be used where the correlation is a post-processing procedure.

In the embodiments described where the correlation is carried out concurrently, a circular buffer is used for the correlation buffer. As another possibility, the correlation buffer may be sufficiently large to store all correlation elements.

Surface topography determination may be made for different areas of the sample surface. Surface height representations for these different areas may be supplied separately to the operator. As another possibility, the surface height determinations for different areas may be combined. This may be achieved by ensuring that the surface areas overlap and relating the surface height data in the overlap region determined from one area to the surface height data in the overlap region obtained for another area so as to ensure that the surface height data for the combined areas is all referred to a common reference. As another possibility the Z position data acquired by the controller 21 from the coarse Z position sensor 20a and the Z logger 24 may be used to provide a Z or height reference datum enabling the surface height data obtained for the different areas to be referenced to a common height datum.

In the examples described above, the post processing section is arranged to carry out processing as soon as the results from the concurrent processing section are available. This need not necessarily be the case and, for example, the post processing may be deferred until a later time or date, if desired. Thus, the concurrent processing may be carried out for a number of different regions of the surface or for a number of different surfaces and then stored on a removable medium 29 or on the mass storage device 27 and the post processing carried out only after all these have been completed.

In the example described above with reference to FIG. 7 the step of the window in the correlation procedure carried out by the correlator of the post-processing section is one, it may however be two or more, if potentially higher accuracy is less important than speed.

As described above, where the height is determined from the amplitude data it is determined to be the position of the peak. This need not necessarily be the case and the height may be determined to be another predetermined position on the Gaussian fit, such as the half height position on one side or the other. Also, as described above, where the height is determined from the correlation phase data it is determined to be the position of zero correlation phase. This need not necessarily be the case and the height may be determined to be at the position corresponding to a predetermined correlation phase other than zero.

Figure 15:
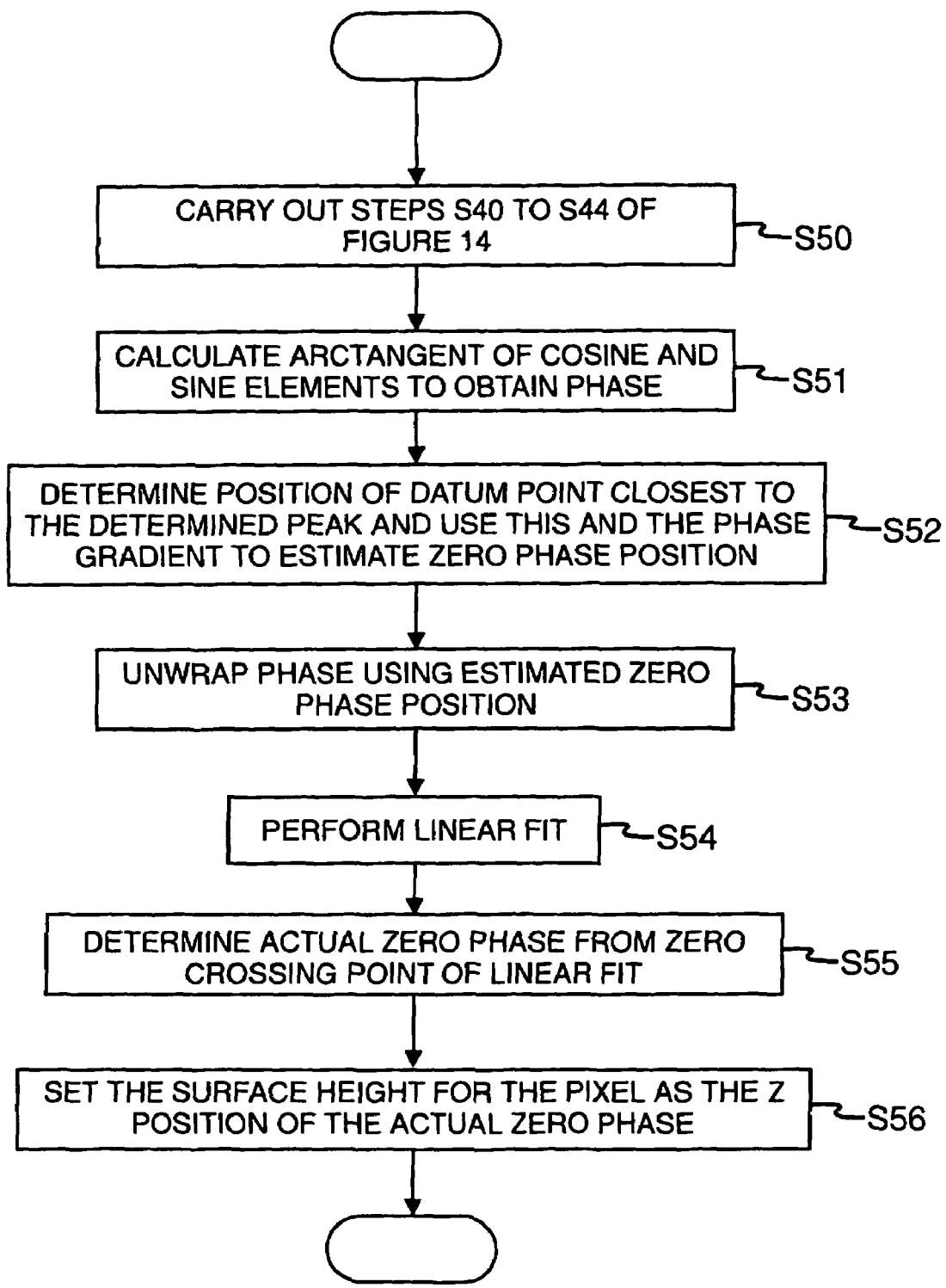
FIG. 15 shows a flow chart for illustrating further steps that may be carried out by the surface topography determiner shown in FIG. 7.

At step S53 in FIG. 15, the surface topography determiner 35 unwraps the correlation phase by using the correlation phase gradient to calculate the expected phase for a datum point (cosine/sine wavepacket correlation value)and then adding or subtracting $2\pi$ to the correlation phase of the datum point until the difference from the expected phase is less than $\pi$. As another possibility the actual correlation phase may be determined by scanning through the correlation phase data, detecting where the correlation phase jumps, considering the direction of the jump and integrating the correlation phase by adding or subtracting $2\pi$ at such jumps or discontinuities. Any other conventional phase unwrapping procedure may be used.

It will of course be appreciated that the above described procedure determines the correlation phase value from the results of the operation of the correlator, that is on the basis of the approximation that the power spectrum is Gaussian.

In the embodiments described above, the beam splitter 5 may have a reflectance of about 20% to reduce or avoid the possibility of light reflected by the sample being swamped by light reflected by the reference mirror. As another possibility the reference mirror 6, rather than the beam splitter 5, may be so tailored and may have a reflectance of about 20%. This would however, be less efficient because of the loss of light.

In the embodiments described above, the frame interval and width of the Gaussian envelope of the correlator may be selected so that the correlation indices add up to zero which enables correlation to be carried out for very low intensity value signal levels because there is no resultant offset.

In the embodiments described above with reference to FIG. 19d, the range of correlation elements is copied to a copy buffer. As another possibility this range may be frozen.

In the above described embodiments, the surface profiling apparatus is used to determine the surface profile or topography of a surface area. The present invention may, however, also be used to determine a step height, that is the relative height distance between two individual points or surface pixels on a surface or to determine the height of a single surface pixel relative to a fixed reference.

As described above, the discriminator is arranged to determine discrimination values for received intensity values as the intensity values are being received. AS another possibility, the discriminator may be arranged to operate only after all of the intensity values for a measurement operation or path have been received.

The correlator may be arranged to correlate intensity values with correlation function data after all of the intensity values for a measurement operation or path have been received or as the intensity values are being received with or without, in either case, the use of the discriminator.

The Z axis datum may be replaced by a gantry or microscope-style support.

The invention claimed is:

1. Surface profiling apparatus for obtaining surface profile data for a sample surface, the apparatus comprising:
   a light director operable to direct light along a sample path towards a region of a sample surface and along a reference path towards a reference surface such that light reflected by the region of the sample surface and light reflected by the reference surface interfere;
   a mover operable to effect relative movement between the sample surface and the reference surface along a measurement path;
   a sensor operable to sense light representing the interference fringes produced by a sample surface region during the relative movement;
   a controller operable to carry out a measurement operation by causing the mover to effect the relative movement while the sensor senses light intensity at intervals to provide a series of intensity values representing interference fringes produced by a region of a sample surface during the relative movement; and
   a data processor operable to process the intensity values, the data processor comprising:
   a receiver operable to receive intensity values from the sensor during a measurement operation;
   a first processor operable to carry out processing on intensity values as the intensity values are received by the receiver during a measurement operation to produce data indicating the position of a coherence peak; and
   a second processor operable to, after completion of a measurement operation, use the data produced by the first processor to obtain data indicative of a height of the surface region;
   wherein:
      the second processors comprises:
         a correlator operable to correlate intensity values with correlation function data representing a correlation function to provide correlation data for that sample surface region to enable a position of a coherence peak in the intensity values for a sample surface region to be identified, the correlation function having first and second periodically varying wave functions with the first and second wave functions being of different phase and being bounded by an envelope; and
         a surface height determiner operable to determine a height of a sample surface region from data related to the position of the coherence peak;
      the first processor comprises a determiner operable to determine a range of the intensity values that includes an intensity value representing a coherence peak and to identify that range of intensity values to the correlator; and
      the determiner comprises a further correlator.

2. Surface profiling apparatus for obtaining surface profile data for a sample surface, the apparatus comprising:
   a light director operable to direct light along a sample path towards a region of a sample surface and along a reference path towards a reference surface such that light reflected by the region of the sample surface and light reflected by the reference surface interfere;
   a mover operable to effect relative movement between the sample surface and the reference surface along a measurement path;

a sensor operable to sense light representing the interference fringes produced by a sample surface region during the relative movement;

a controller operable to carry out a measurement operation by causing the mover to effect the relative movement while the sensor senses light intensity at intervals to provide a series of intensity values representing interference fringes produced by a region of a sample surface during the relative movement; and a data processor operable to process the intensity values, the data processor comprising:

a receiver operable to receive intensity values from the sensor during a measurement operation;

a first processor operable to carry out processing on intensity values as the intensity values are received by the receiver during a measurement operation to produce data indicating the position of a coherence peak; and a second processor operable to, after completion of a measurement operation, use the data produced by the first processor to obtain data indicative of a height of the surface region;

wherein:

the controller is arranged to provide a measurement interval such that one of each pair of discrimination values is alternately zero;

the second processor comprises:

a correlator operable to correlate intensity values with correlation function data representing a correlation function to provide correlation data for that sample surface region to enable a position of a coherence peak in the intensity values for a sample surface region to be identified, the correlation function having first and second periodically varying wave functions with the first and second wave functions being of different phase and being bounded by an envelope; and a surface height determiner operable to determine a height of a sample surface region from data related to the position of the coherence peak;

the first processor comprises a determiner operable to determine a range of the intensity values that includes an intensity value representing a coherence peak and to identify that range of intensity values to the correlator; and the determiner comprises:

a discriminator operable to determine discrimination values for successive sets of received intensity values, the discriminator arranged to determine discrimination values by multiplying a set of intensity values by corresponding pairs of discrimination values; and a peak finder operable to find a peak in the discrimination values and to identify the peak as representing the coherence peak.

3. Apparatus according to claim 2, wherein the discriminating value pairs are: 0,1; 1,0; 0,−1; −1,0.

4. Surface profiling apparatus for obtaining surface profile data for a sample surface, the apparatus comprising:

a light director operable to direct light along a sample path towards a region of a sample surface and along a reference path towards a reference surface such that light reflected by the region of the sample surface and light reflected by the reference surface interfere;

a mover operable to effect relative movement between the sample surface and the reference surface along a measurement path;

a sensor operable to sense light representing the interference fringes produced by a sample surface region during the relative movement;

a controller operable to carry out a measurement operation by causing the mover to effect the relative movement while the sensor senses light intensity at intervals to provide a series of intensity values representing interference fringes produced by a region of a sample surface during the relative movement; and a data processor operable to process the intensity values, the data processor comprising:

a receiver operable to receive intensity values from the sensor during a measurement operation;

a first processor operable to carry out processing on intensity values as the intensity values are received by the receiver during a measurement operation to produce data indicating the position of a coherence peak; and a second processor operable to, after completion of a measurement operation, use the data produced by the first processor to obtain data indicative of a height of the surface region;

wherein:

the second processor comprises:

a correlator operable to correlate intensity values with correlation function data representing a correlation function to provide correlation data for that sample surface region to enable a position of a coherence peak in the intensity values for a sample surface region to be identified, the correlation function having first and second periodically varying wave functions with the first and second wave functions being of different phase and being bounded by an envelope; and a surface height determiner operable to determine a height of a sample surface region from data related to the position of the coherence peak;

the first processor comprises a determiner operable to determine a range of the intensity values that includes an intensity value representing a coherence peak and to identify that range of intensity values to the correlator; and the determiner comprises:

a discriminator operable to determine discrimination values for successive sets of received intensity values, the discriminator arranged to identify the range of intensity values in accordance with whether or not the peak in the discrimination values is higher than a predetermined threshold and to set the range as all of the intensity values supplied by the sensor for the sample surface region when the peak of the discrimination values does not exceed the predetermined threshold; and a peak finder operable to find a peak in the discrimination values and to identify the peak as representing the coherence peak.

5. Surface profiling apparatus for obtaining surface profile data for a sample surface, the apparatus comprising:

a light director operable to direct light along a sample path towards a region of a sample surface and along a reference path towards a reference surface such that light reflected by the region of the sample surface and light reflected by the reference surface interfere;

a mover operable to effect relative movement between the sample surface and the reference surface along a measurement path;

a sensor operable to sense light representing the interference fringes produced by a sample surface region during the relative movement;

a controller operable to carry out a measurement operation by causing the mover to effect the relative movement while the sensor senses light intensity at intervals to provide a series of intensity values representing interference fringes produced by a region of a sample surface during the relative movement; and a data processor operable to process the intensity values, the data processor comprising:

a receiver operable to receive intensity values from the sensor during a measurement operation;

a first processor operable to carry out processing on intensity values as the intensity values are received by the receiver during a measurement operation to produce data indicating the position of a coherence peak; and a second processor operable to after completion of a measurement operation, use the data produced by the first processor to obtain data indicative of a height of the surface region;

wherein:

the second processor comprises:

a correlator operable to correlate intensity values with correlation function data representing a correlation function to provide correlation data for that sample surface region to enable a position of a coherence peak in the intensity values for a sample surface region to be identified, the correlation function having first and second periodically varying wave functions with the first and second wave functions being of different phase and being bounded by an envelope; and a surface height determiner operable to determine a height of a sample surface region from data related to the position of the coherence peak;

the first processor comprises a determiner operable to determine a range of the intensity values that includes an intensity value representing a coherence peak and to identify that range of intensity values to the correlator; and the correlator is arranged to correlate intensity values with correlation function data comprising a set of pairs of first and second indices and is arranged to produce a pair of correlation elements for a given intensity value by multiplying each of a range of intensity values including the given intensity value by a corresponding one of the first indices and summing the results to produce a first one of the pair of correlation elements and by multiplying each of the range of intensity values by a corresponding one of the second indices and summing the results to produce the other one of the pair of correlation elements, the correlator being operable to store the pair of correlation elements in a memory area of a correlation buffer of the correlator.

6. Surface profiling apparatus for obtaining surface profile data for a sample surface, the apparatus comprising:

a light director operable to direct light along a sample path towards a region of a sample surface and along a reference path towards a reference surface such that light reflected by the region of the sample surface and light reflected by the reference surface interfere;

a mover operable to effect relative movement between the sample surface and the reference surface along a measurement path;

a sensor operable to sense light representing the interference fringes produced by a sample surface region during the relative movement;

a controller operable to carry out a measurement operation by causing the mover to effect the relative movement while the sensor senses light intensity at intervals to provide a series of intensity values representing interference fringes produced by a region of a sample surface during the relative movement; and a data processor operable to process the intensity values, the data processor comprising:

a receiver operable to receive intensity values from the sensor during a measurement operation;

a first processor operable to carry out processing on intensity values as the intensity values are received by the receiver during a measurement operation to produce data indicating the position of a coherence peak; and a second processor operable to, after completion of a measurement operation, use the data produced by the first processor to obtain data indicative of a height of the surface region;

wherein:

the first processor comprises a correlator operable to correlate intensity values with correlation function data representing a correlation function to provide correlation data for that sample surface region to enable a position of a coherence peak in the intensity values for a sample surface region to be identified, the correlation function having first and second periodically varying wave functions with the first and second wave functions being of different phase and being bounded by an envelope;

the second processor comprises a surface height determiner operable to determine a height of a sample surface region from data related to the position of the coherence peak;

the correlator has a correlation function provider operable to provide the correlation function data as a number of groups each consisting of a number of pairs of first and second indices and has a correlation buffer having an array of memory areas each for storing a pair of correlation elements for a corresponding intensity value; and the correlator is arranged:

to carry out a first step of multiplying a first intensity value of a series of intensity values for a surface region separately by the first index and by the second index of each of a first group of said pairs of indices to produce, for each of said pairs of indices, corresponding pairs of first and second multiplication elements and to accumulate each pair of multiplication elements in a corresponding different one of a series of the memory areas;

to carry out a second step of repeating the first step for each of a succession of said intensity values using a different group of said pairs of indices at each repetition;

to carry out a third step by moving the series of memory areas by a predetermined number of memory areas along the array and then repeating the first and second steps; and to carry out a fourth step by repeating the third step moving the series of memory areas by a predetermined number of memory areas along the array at each repetition until, at least for each of a number of the intensity values, a memory location corresponding to the intensity value contains first and second correlation elements with the first and second correlation elements representing the sum of the multiplication elements resulting from multiplying each of a sequence of said intensity values by a corresponding different one of the first and second indices, respectively.

7. Surface profiling apparatus for obtaining surface profile data for a sample surface, the apparatus comprising:
a light director operable to direct light along a sample path towards a region of a sample surface and along a reference path towards a reference surface such that light reflected by the region of the sample surface and light reflected by the reference surface interfere;
a mover operable to effect relative movement between the sample surface and the reference surface along a measurement path;
a sensor operable to sense light representing the interference fringes produced by a sample surface region during the relative movement;
a controller operable to carry out a measurement operation by causing the mover to effect the relative movement while the sensor senses light intensity at intervals to provide a series of intensity values representing interference fringes produced by a region of a sample surface during the relative movement; and
a data processor operable to process the intensity values, the data processor comprising:
a receiver operable to receive intensity values from the sensor during a measurement operation;
a first processor operable to carry out processing on intensity values as the intensity values are received by the receiver during a measurement operation to produce data indicating the position of a coherence peak; and
a second processor operable to, after completion of a measurement operation, use the data produced by the first processor to obtain data indicative of a height of the surface region;
wherein:
the first processor comprises a correlator operable to correlate intensity values with correlation function data representing a correlation function to provide correlation data for that sample surface region to enable a position of a coherence peak in the intensity values for a sample surface region to be identified, the correlation function having first and second periodically varying wave functions with the first and second wave functions being of different phase and being bounded by an envelope;
the second processor comprises a surface height determiner operable to determine a height of a sample surface region from data related to the position of the coherence peak;
the correlator has a correlation function provider operable to provide the correlation function data as four groups each having four pairs of first and second indices and has a correlation buffer having an array of memory areas each arranged to store a pair of correlation elements for a corresponding intensity value; and
the correlator is arranged:
to carry out a first step of multiplying a first intensity value of a series of intensity values for a surface region separately by the first index and by the second index of each of a first one of said groups of pairs of indices to produce four pairs of first and second multiplication elements and to accumulate each pair of multiplication elements in a corresponding different one of four of the memory areas;
to carry out a second step of repeating the first step for the next three intensity values using the second, third and fourth groups of said pairs of indices, respectively;
to carry out a third step by moving the series of memory areas by one and then repeating the first step for the next intensity value and the second step for the three following intensity values; and
to carry out a fourth step by repeating the third step moving the series of memory areas by one memory area along the array at each repetition until, for every fourth one of a number of the intensity values, a memory location corresponding to the intensity value contains first and second correlation elements with the first and second correlation elements representing the sum of multiplication elements resulting from multiplying each of a sequence of sixteen of said intensity values by a corresponding different one of the first and second indices, respectively.

8. Apparatus according to claim 5, wherein the correlation buffer is a circular buffer and a correlation buffer controller is provided to overwrite an oldest entry in the buffer when the buffer is full.

9. Apparatus according to claim 1, wherein the further correlator is arranged to use a coarser correlation function than the correlator.

10. Apparatus according to claim 1, wherein the further correlator is arranged to correlate intensity values with correlation function data comprising a set of pairs of first and second indices and is arranged to produce a pair of correlation elements for a given intensity value by multiplying each of a range of intensity values including the given intensity value by a corresponding one of the first indices and summing the results to produce a first one of the pair of correlation elements and by multiplying each of the range of intensity values by a corresponding one of the second indices and summing the results to produce the other one of the pair of correlation elements, the further correlator being operable to store the pair of correlation elements in a memory area of a correlation buffer of the further correlator.

11. Surface profiling apparatus for obtaining surface profile data for a sample surface, the apparatus comprising:
a light director operable to direct light along a sample path towards a region of a sample surface and along a reference path towards a reference surface such that light reflected by the region of the sample surface and light reflected by the reference surface interfere;
a mover operable to effect relative movement between the sample surface and the reference surface alone a measurement path;
a sensor operable to sense light representing the interference fringes produced by a sample surface region during the relative movement;
a controller operable to carry out a measurement operation by causing the mover to effect the relative movement while the sensor senses light intensity at intervals to provide a series of intensity values representing interference fringes produced by a region of a sample surface during the relative movement; and
a data processor operable to process the intensity values, the data processor comprising:
a receiver operable to receive intensity values from the sensor during a measurement operation;

a first processor operable to carry out processing on intensity values as the intensity values are received by the receiver during a measurement operation to produce data indicating the position of a coherence peak; and a second processor operable to, after completion of a measurement operation, use the data produced by the first processor to obtain data indicative of a height of the surface region;

wherein:
one of the first and second processors comprises a correlator operable to correlate intensity values with correlation function data representing a correlation function to provide correlation data for that sample surface region to enable a position of a coherence peak in the intensity values for a sample surface region to be identified, the correlation function having first and second periodically varying wave functions with the first and second wave functions being of different phase and being bounded by an envelope;

the second processor comprises a surface height determiner operable to determine a height of a sample surface region from data related to the position of the coherence peak;

a peak finder arranged to function in a number of different states with a switch from one state to the next being determined by the relationship of an intensity value, discrimination value or correlation element to a previous intensity value, discrimination value or correlation element or threshold; and the different states of the peak finder include:
an initial state;
a low state;
a found state; and
an early state; and the peak finder switches to:
the initial state for a first value of the intensity value, discrimination value or correlation element;
the low state when the value of the intensity value, discrimination value or correlation element is below a threshold value;
the found state when the value of the intensity value, discrimination value or correlation element is above the threshold value; and
the early state if the first value of the intensity value, discrimination value or correlation element is above the threshold value.

12. Surface profiling apparatus for obtaining surface profile data for a sample surface, the apparatus comprising:
a light director operable to direct light along a sample path towards a region of a sample surface and along a reference path towards a reference surface such that light reflected by the region of the sample surface and light reflected by the reference surface interfere;
a mover operable to effect relative movement between the sample surface and the reference surface alone a measurement path;
a sensor operable to sense light representing the interference fringes produced by a sample surface region during the relative movement;
a controller operable to carry out a measurement operation by causing the mover to effect the relative movement while the sensor senses light intensity at intervals to provide a series of intensity values representing interference fringes produced by a region of a sample surface during the relative movement; and a data processor operable to process the intensity values, the data processor comprising:
a receiver operable to receive intensity values from the sensor during a measurement operation;
a first processor operable to carry out processing on intensity values as the intensity values are received by the receiver during a measurement operation to produce data indicating the position of a coherence peak; and
a second processor operable to, after completion of a measurement operation, use the data produced by the first processor to obtain data indicative of a height of the surface region;

wherein:
one of the first and second processors comprises a correlator operable to correlate intensity values with correlation function data representing a correlation function to provide correlation data for that sample surface region to enable a position of a coherence peak in the intensity values for a sample surface region to be identified, the correlation function having first and second periodically varying wave functions with the first and second wave functions being of different phase and being bounded by an envelope;

the second processor comprises a surface height determiner operable to determine a height of a sample surface region from data related to the position of the coherence peak;

a peak finder arranged to function in a number of different states with a switch from one state to the next being determined by the relationship of an intensity value, discrimination value or correlation element to a previous intensity value, discrimination value or correlation element or threshold; and the different states of the peak finder include:
an initial state;
a low state;
a rising state;
a falling state;
a found state; and
an early state; and the peak finder switches to:
the initial state for a first value of the intensity value, discrimination value or correlation element;
the low state before the value of the intensity value, discrimination value or correlation element rises above a threshold value;
the rising state when the value of the intensity value, discrimination value or correlation element is rising;
a falling state when the value of the intensity value, discrimination value or correlation element is falling;
the found state when the value of the intensity value, discrimination value or correlation element falls below a predetermined proportion of a previous maximum value; and
the optional early state if the first value of the intensity value, discrimination value or correlation element is above the threshold value.

13. Surface profiling apparatus for obtaining surface profile data for a sample surface, the apparatus comprising:
a light director operable to direct light along a sample path towards a region of a sample surface and along a reference path towards a reference surface such that light reflected by the region of the sample surface and light reflected by the reference surface interfere;

a mover operable to effect relative movement between the sample surface and the reference surface along a measurement path;

a sensor operable to sense light representing the interference fringes produced by a sample surface region during the relative movement;

a controller operable to carry out a measurement operation by causing the mover to effect the relative movement while the sensor senses light intensity at intervals to provide a series of intensity values representing interference fringes produced by a region of a sample surface during the relative movement; and a data processor operable to process the intensity values, the data processor comprising:

a receiver operable to receive intensity values from the sensor during a measurement operation;

a first processor operable to carry out processing on intensity values as the intensity values are received by the receiver during a measurement operation to produce data indicating the position of a coherence peak; and a second processor operable to, after completion of a measurement operation, use the data produced by the first processor to obtain data indicative of a height of the surface region;

wherein:

one of the first and second processors comprises a correlator operable to correlate intensity values with correlation function data representing a correlation function to provide correlation data for that sample surface region to enable a position of a coherence peak in the intensity values for a sample surface region to be identified, the correlation function having first and second periodically varying wave functions with the first and second wave functions being of different phase and being bounded by an envelope; and the second processor comprises a surface height determiner operable to determine a height of a sample surface region from data related to the position of the coherence peak; and the surface height determiner is arranged to determine a signal-to-noise ratio for the values provided by the correlator and to abort the height determination if the signal-to-noise ratio is too low.

14. Surface profiling apparatus for obtaining surface profile data for a sample surface, the apparatus comprising:

a light director operable to direct light along a sample path towards a region of a sample surface and along a reference path towards a reference surface such that light reflected by the region of the sample surface and light reflected by the reference surface interfere;

a mover operable to effect relative movement between the sample surface and the reference surface along a measurement path;

a sensor operable to sense light representing the interference fringes produced by a sample surface region during the relative movement;

a controller operable to carry out a measurement operation by causing the mover to effect the relative movement while the sensor senses light intensity at intervals to provide a series of intensity values representing interference fringes produced by a region of a sample surface during the relative movement; and a data processor operable to process the intensity values, the data processor comprising:

a receiver operable to receive intensity values from the sensor during a measurement operation;

a first processor operable to carry out processing on intensity values as the intensity values are received by the receiver during a measurement operation to produce data indicating the position of a coherence peak; and a second processor operable to, after completion of a measurement operation, use the data produced by the first processor to obtain data indicative of a height of the surface region;

wherein:

one of the first and second processors comprises a correlator operable to correlate intensity values with correlation function data representing a correlation function to provide correlation data for that sample surface region to enable a position of a coherence peak in the intensity values for a sample surface region to be identified, the correlation function having first and second periodically varying wave functions with the first and second wave functions being of different phase and being bounded by an envelope;

the second processor comprises a surface height determiner operable to determine a height of a sample surface region from data related to the position of the coherence peak;

the correlator is arranged to correlate intensity values with correlation function data comprising a set of pairs of first and second indices to produce pairs of correlation elements;

the surface height determiner is arranged:

to determine amplitude values from the pairs of correlation elements and to determine a height of a sample region by fitting a Gaussian to amplitude values and by identifying the position of the coherence peak with a predetermined feature of the Gaussian fit such as the position of the peak of the Gaussian; and the surface height determiner is arranged to accumulate the squared amplitude values and to abort the height determination if the ratio between a maximum squared amplitude value and a mean of the accumulated squared amplitude values is below a threshold.

15. Surface profiling apparatus for obtaining surface profile data for a sample surface, the apparatus comprising:

a light director operable to direct light along a sample path towards a region of a sample surface and along a reference path towards a reference surface such that light reflected by the region of the sample surface and light reflected by the reference surface interfere;

a mover operable to effect relative movement between the sample surface and the reference surface along a measurement path;

a sensor operable to sense light representing the interference fringes produced by a sample surface region during the relative movement;

a controller operable to carry out a measurement operation by causing the mover to effect the relative movement while the sensor senses light intensity at intervals to provide a series of intensity values representing interference fringes produced by a region of a sample surface during the relative movement; and a data processor operable to process the intensity values, the data processor comprising:

a receiver operable to receive intensity values from the sensor during a measurement operation;

a first processor operable to carry out processing on intensity values as the intensity values are received by the receiver during a measurement operation to produce data indicating the position of a coherence peak; and a second processor operable to, after completion of a measurement operation, use the data produced by the first processor to obtain data indicative of a height of the surface region;

wherein:
one of the first and second processors comprises a correlator operable to correlate intensity values with correlation function data representing a correlation function to provide correlation data for that sample surface region to enable a position of a coherence peak in the intensity values for a sample surface region to be identified, the correlation function having first and second periodically varying wave functions with the first and second wave functions being of different phase and being bounded by an envelope;

the second processor comprises a surface height determiner operable to determine a height of a sample surface region from data related to the position of the coherence peak; and the surface height determiner further comprises a phase determiner operable to determine the intensity value having a predetermined phase and to determine a height of a sample surface region using a position on the measurement path corresponding to the determined intensity value.

16. Apparatus according to claim 15, wherein the phase determiner is operable to determine an estimate of the predetermined phase position using the intensity value closest to the coherence peak, then to unwrap the phase of the correlation values, and to determine the actual position corresponding to the predetermined phase using a linear fitting procedure.

17. Surface profiling apparatus for obtaining surface profile data for a sample surface, the apparatus comprising:

a light director operable to direct light along a sample path towards a region of a sample surface and along a reference path towards a reference surface such that light reflected by the region of the sample surface and light reflected by the reference surface interfere;

a mover operable to effect relative movement between the sample surface and the reference surface along a measurement path;

a sensor operable to sense light representing the interference fringes produced by a sample surface region during the relative movement;

a controller operable to carry out a measurement operation by causing the mover to effect the relative movement while the sensor senses light intensity at intervals to provide a series of intensity values representing interference fringes produced by a region of a sample surface during the relative movement; and a data processor operable to process the intensity values, the data processor comprising:

a receiver operable to receive intensity values from the sensor during a measurement operation;

a first processor operable to carry out processing on intensity values as the intensity values are received by the receiver during a measurement operation to produce data indicating the position of a coherence peak; and a second processor operable to, after completion of a measurement operation, use the data produced by the first processor to obtain data indicative of a height of the surface region;

wherein:
one of the first and second processors comprises a correlator operable to correlate intensity values with correlation function data representing a correlation function to provide correlation data for that sample surface region to enable a position of a coherence peak in the intensity values for a sample surface region to be identified, the correlation function having first and second periodically varying wave functions with the first and second wave functions being of different phase and being bounded by an envelope;

the second processor comprises a surface height determiner operable to determine a height of a sample surface region from data related to the position of the coherence peak; and a position determiner is provided to determine the position of said one of the sample surface and the reference surface on the measurement path and a triggerer is provided to trigger the sensor to sense light intensity to provide a set of intensity data signals in accordance with position data obtained by the position determiner.

18. Surface profiling apparatus for obtaining surface profile data for a sample surface, the apparatus comprising:

a light director operable to direct light along a sample path towards a region of a sample surface and along a reference path towards a reference surface such that light reflected by the region of the sample surface and light reflected by the reference surface interfere;

a mover operable to effect relative movement between the sample surface and the reference surface along a measurement path;

a sensor operable to sense light representing the interference fringes produced by a sample surface region during the relative movement;

a controller operable to carry out a measurement operation by causing the mover to effect the relative movement while the sensor senses light intensity at intervals to provide a series of intensity values representing interference fringes produced by a region of a sample surface during the relative movement; and a data processor operable to process the intensity values, the data processor comprising:

a receiver operable to receive intensity values from the sensor during a measurement operation;

a first processor operable to carry out processing on intensity values as the intensity values are received by the receiver during a measurement operation to produce data indicating the position of a coherence peak; and a second processor operable to, after completion of a measurement operation, use the data produced by the first processor to obtain data indicative of a height of the surface region;

wherein:
one of the first and second processors comprises a correlator operable to correlate intensity values with correlation function data representing a correlation function to provide correlation data for that sample surface region to enable a position of a coherence peak in the intensity values for a sample surface region to be identified, the correlation function having first and second periodically varying wave functions with the first and second wave functions being of different phase and being bounded by an envelope;

the second processor comprises a surface height determiner operable to determine a height of a sample surface region from data related to the position of the coherence peak; and the sensor comprises a two-dimensional array of sensing elements and a field-of-view controller is provided to control the field of view of the sensor by controlling combining or selecting of intensity data signals produced by sensing elements.

19. Surface profiling apparatus for obtaining surface profile data for a sample surface, the apparatus comprising:

a light director operable to direct light along the sample path towards a region of a sample surface and along a reference path towards a reference surface such that light reflected by the region of the sample surface and light reflected by the reference surface interfere;

a mover operable to effect relative movement along a measurement path between the sample surface and the reference surface;

a sensor operable to sense light representing the interference fringes produced by a sample surface region during said relative movement;

a controller operable to carry out a measurement operation by causing the mover to effect said relative movement while the sensor senses light intensity at intervals to provide a series of intensity values representing interference fringes produced by a region of a sample surface during said relative movement; and a data processor for processing the intensity values to obtain data indicative of a height of the surface region;

wherein a position determiner is provided to determine the position of said one of the sample surface and the reference surface on the measurement path and a trigger is provided to trigger the sensor to sense light intensity to provide a set of intensity data signals in accordance with position data obtained by the position determiner.

20. Surface profiling apparatus for obtaining surface profile data for a sample surface, the apparatus comprising:

a light director operable to direct light along the sample path towards a region of a sample surface and along a reference path towards a reference surface such that light reflected by the region of the sample surface and light reflected by the reference surface interfere;

a mover operable to effect relative movement along a measurement path between the sample surface and the reference surface;

a sensor operable to sense light representing the interference fringes produced by a sample surface region during said relative movement;

a controller operable to carry out a measurement operation by causing the mover to effect said relative movement while the sensor senses light intensity at intervals to provide a series of intensity values representing interference fringes produced by a region of a sample surface during said relative movement; and a data processor operable to process the intensity values to obtain data indicative of a height of the surface region;

wherein the sensor comprises a two-dimensional array of sensing elements and a field-of-view controller to control the field of view of the sensor by controlling combining or selecting of intensity data signals produced by sensing elements.

21. Data processing apparatus for processing intensity values, said data processing apparatus comprising:

a first processor operable to carry out processing on intensity values as the intensity values are received during a measurement operation to produce data indicating the position of a coherence peak; and a second processor operable to, after completion of a measurement operation, using the data produced by the first processor to obtain data indicative of a height of the surface region;

wherein;

the second processor comprises:

a correlator operable to correlate intensity values with correlation function data representing a correlation function to provide correlation data for that sample surface region to enable a position of a coherence peak in the intensity values for a sample surface region to be identified, the correlation function including sine and cosine wave functions bounded by a Gaussian envelope; and a surface height determiner operable to determine a height of a sample surface region from data related to the position of the coherence peak;

the first processor comprises a determiner operable to determine a range of the intensity values that includes an intensity value representing a coherence peak and to identify that range of intensity values to the correlator; and the correlator is arranged to correlate intensity values with correlation function data comprising a set of pairs of first and second indices and is arranged to produce a pair of correlation elements for a given intensity value by multiplying each of a range of intensity values including the given intensity value by a corresponding one of the first indices and summing the results to produce a first one of the pair of correlation elements and by multiplying each of the range of intensity values by a corresponding one of the second indices and summing the results to produce the other one of the pair of correlation elements, the correlator being operable to store the pair of correlation elements in a memory area of a correlation buffer of the correlator.

22. Data processing apparatus for processing intensity values, said data processing apparatus comprising:

a first processor operable to carry out processing on intensity values as the intensity values are received during a measurement operation to produce data indicating the position of a coherence peak; and a second processor operable to, after completion of a measurement operation, using the data produced by the first processor to obtain data indicative of a height of the surface region;

wherein:

the second processor comprises:

a correlator operable to correlate intensity values with correlation function data representing a correlation function to provide correlation data for that sample surface region to enable a position of a coherence peak in the intensity values for a sample surface region to be identified, the correlation function including sine and cosine wave functions bounded by a Gaussian envelope; and a surface height determiner operable to determine a height of a sample surface region from data related to the position of the coherence peak;

the first processor comprises a determiner operable to determine a range of the intensity values that includes an intensity value representing a coherence peak and to identify that range of intensity values to the correlator;

the determiner comprises a discriminator operable to determine discrimination values for successive sets of received intensity values and a peak finder operable to find a peak in the discrimination values and to identify the peak as representing the coherence peak; and the discriminator is arranged:
to identify the range of intensity values in accordance with whether or not the peak in the discrimination values is higher than a predetermined threshold; and
to use as the predetermined threshold a value related to the mean of the discrimination values.

23. A correlator for use in a data processing apparatus for processing intensity values, comprising:

a correlation function provider operable to provide the correlation function data as a number of groups each consisting of a number of pairs of first and second indices and having a correlation buffer having an array of memory areas each for storing a pair of correlation elements for a corresponding intensity value; and a correlation processor arranged:
to carry out a first step of multiplying a first intensity value of a series of intensity values for a surface region separately by the first index and by the second index of each of a first group of said pairs of indices to produce, for each of said pairs of indices, corresponding pairs of first and second multiplication elements and to accumulate each pair of multiplication elements in a corresponding different one of a series of the memory areas;
to carry out a second step of repeating the first step for each of a succession of said intensity values using a different group of said pairs of indices at each repetition;
to carry out a third step by moving the series of memory areas by a predetermined number of memory areas along the array and then repeating the first and second steps; and
to carry out a fourth step by repeating the third step moving the series of memory areas by a predetermined number of memory areas along the array at each repetition until, at least for each of a number of the intensity values, a memory location corresponding to the intensity value contains first and second correlation elements with the first and second correlation elements representing the sum of the multiplication elements resulting from multiplying each of a sequence of said intensity values by a corresponding different one of the first and second indices, respectively;

wherein:
the data processing apparatus comprises:
a first processor operable to carry out processing on intensity values as the intensity values are received during a measurement operation to produce data indicating the position of a coherence peak; and
a second processor operable to, after completion of a measurement operation, using the data produced by the first processor to obtain data indicative of a height of the surface region;
one of the first and second processors comprises a correlator operable to correlate intensity values with correlation function data representing a correlation function to provide correlation data for that sample surface region to enable a position of a coherence peak in the intensity values for a sample surface region to be identified, the correlation function including sine and cosine wave functions bounded by a Gaussian envelope; and the second processor comprises a surface height determiner operable to determine a height of a sample surface region from data related to the position of the coherence peak.

24. A correlator in accordance with claim 23, wherein there are four groups of correlation function data with each group each having four pairs of first and second indices and the correlation processor is arranged to carry out the first to fourth steps until, for every fourth one of a number of the intensity values, a memory location corresponding to the intensity value contains first and second correlation elements with the first and second correlation elements representing the sum of multiplication elements resulting from multiplying each of a sequence of sixteen of said intensity values by a corresponding different one of the first and second indices, respectively.

25. Surface profiling apparatus for obtaining surface profile data for a sample surface, the apparatus comprising:

a light director operable to direct light along a sample path towards a region of a sample surface and along a reference path towards a reference surface such that light reflected by the region of the sample surface and light reflected by the reference surface interfere;

a mover operable to effect relative movement along a measurement path between the sample surface and the reference surface;

a sensor operable to sense light representing the interference fringes produced by a sample surface region during said relative movement;

a controller operable to carry out a measurement operation by causing the mover to effect said relative movement while the sensor senses light intensity at intervals to provide a series of intensity values representing interference fringes produced by a region of a sample surface during said relative movement; and a data processor operable to processing the intensity values, the data processor comprising:

a receiver operable to receive intensity values from the sensor during a measurement operation;

a store operable to store received intensity values;

a discriminator operable to determine discrimination values for received intensity values such that intensity values in a region of interest are identified by their discrimination values, and a correlator operable to correlate identified intensity values with correlation function data representing a correlation function to provide correlation data for that sample surface region to enable a position of a coherence peak in the intensity values for a sample surface region to be identified.

26. Apparatus according to claim 25, wherein the discriminator is arranged to determine discrimination values for received intensity values as the intensity values are being received.

27. Apparatus according to claim 25, wherein the discriminator is arranged to determine discrimination values for received intensity values after all of the intensity values for a measurement operation or path have been received.

28. Apparatus according to claim 25, wherein the correlator is arranged to correlating intensity values with correlation function data after all of the intensity values for a measurement operation or path have been received.

29. Apparatus according to claim 25, wherein the correlator is arranged to correlating intensity values with correlation function data as the intensity values are being received.

30. Apparatus according to claim 25, wherein the correlator is arranged to correlate intensity values with correlation function data comprising a set of pairs of first and second indices to produce pairs of correlation elements.

31. Apparatus according to claim 25, wherein the correlator is arranged to store correlation data in a circular buffer.

32. Apparatus according to claim 25, wherein the correlator is arranged to correlate intensity values with correlation function data comprising a set of pairs of first and second indices and is arranged to produce a pair of correlation elements for a given intensity value by multiplying each of a range of intensity values including the given intensity value by a corresponding one of the first indices and summing the results to produce a first one of the pair of correlation elements and by multiplying each of the range of intensity values by a corresponding one of the second indices and summing the results to produce the other one of the pair of correlation elements, the correlator being operable to store the pair of correlation elements in a memory area of a correlation buffer of the correlator.

33. Apparatus according to claim 25, wherein:
the correlator has a correlation function provider operable to provide the correlation function data as a number of groups each consisting of a number of pairs of first and second indices and has a correlation buffer having an array of memory areas each for storing a pair of correlation elements for a corresponding intensity value; and
the correlator is arranged:
to carry out a first step of multiplying a first intensity value of a series of intensity values for a surface region separately by the first index and by the second index of each of a first group of said pairs of indices to produce, for each of said pairs of indices, corresponding pairs of first and second multiplication elements and to accumulate each pair of multiplication elements in a corresponding different one of a series of the memory areas;
to carry out a second step of repeating the first step for each of a succession of said intensity values using a different group of said pairs of indices at each repetition;
to carry out a third step by moving the series of memory areas by a predetermined number of memory areas along the array and then repeating the first and second steps; and
to carry out a fourth step by repeating the third step moving the series of memory areas by a predetermined number of memory areas along the array at each repetition until, at least for each of a number of the intensity values, a memory location corresponding to the intensity value contains first and second correlation elements with the first and second correlation elements representing the sum of the multiplication elements resulting from multiplying each of a sequence of said intensity values by a corresponding different one of the first and second indices, respectively.

34. Surface profiling apparatus for obtaining surface profile data for a sample surface, the apparatus comprising:
a light director operable to direct light along a sample path towards a region of a sample surface and along a reference path towards a reference surface such that light reflected by the region of the sample surface and light reflected by the reference surface interfere;
a mover operable to effect relative movement along a measurement path between the sample surface and the reference surface;
a sensor operable to sense light representing the interference fringes produced by a sample surface region during said relative movement;
a controller operable to carry out a measurement operation by causing the mover to effect said relative movement while the sensor senses light intensity at intervals to provide a series of intensity values representing interference fringes produced by a region of a sample surface during said relative movement; and
a data processor operable to process the intensity values, the data processor comprising:
a receiver operable to receive intensity values from the sensor during a measurement operation; and
a correlator operable to correlate intensity values with correlation function data representing a correlation function as the intensity values are received to provide correlation data for that sample surface region to enable a position of a coherence peak in the intensity values for a sample surface region to be identified, the correlation function data including a set of pairs of first and second indices to produce pairs of correlation elements;
wherein:
the correlator has a correlation function provider providing the correlation function data as a number of groups each consisting of a number of pairs of first and second indices and has a correlation buffer having an array of memory areas each for storing a pair of correlation elements for a corresponding intensity value; and
the correlator is arranged:
to carry out a first step of multiplying a first intensity value of a series of intensity values for a surface region separately by the first index and by the second index of each of a first group of said pairs of indices to produce, for each of said pairs of indices, corresponding pairs of first and second multiplication elements and to accumulate each pair of multiplication elements in a corresponding different one of a series of the memory areas;
to carry out a second step of repeating the first step for each of a succession of said intensity values using a different group of said pairs of indices at each repetition;
to carry out a third step by moving the series of memory areas by a predetermined number of memory areas along the array and then repeating the first and second steps; and
to carry out a fourth step by repeating the third step moving the series of memory areas by a predetermined number of memory areas along the array at each repetition until, at least for each of a number of the intensity values, a memory location corresponding to the intensity value contains first and second correlation elements with the first and second correlation elements representing the sum of the multiplication elements resulting from multiplying each of a sequence of said intensity values by a corresponding different one of the first and second indices, respectively.

35. Apparatus according to claim 33, wherein there are four groups of correlation function data with each group each having four pairs of first and second indices and the correlation processor is arranged to carry out the first to fourth steps until, for every fourth one of a number of the intensity values, a memory location corresponding to the intensity value contains first and second correlation elements with the first and second correlation elements representing the sum of multiplication elements resulting from multiplying each of a sequence of sixteen of said intensity values by a corresponding different one of the first and second indices, respectively.

36. Apparatus according to claim 31, wherein the correlation buffer is a circular buffer and a correlation buffer controller is provided to overwrite an oldest entry in the buffer when the buffer is full.

* * * * *